Nov. 4, 1969 W. J. MUELLER ET AL 3,476,995
MULTIPLE MODE MOTOR CONTROL WITH A CONSTANT TENSION MODE
AND A CONSTANT HORSEPOWER MODE
Filed Feb. 26, 1963 9 Sheets-Sheet 1

INVENTORS
WERNER J. MUELLER
NORMAN WOLFF
BY Rey Eilers
ATTORNEY.

INVENTORS
WERNER J. MUELLER
NORMAN WOLFF
BY
Rey Eilers
ATTORNEY.

INVENTORS
WERNER J. MUELLER
NORMAN WOLFF
BY Rey Eilers
ATTORNEY.

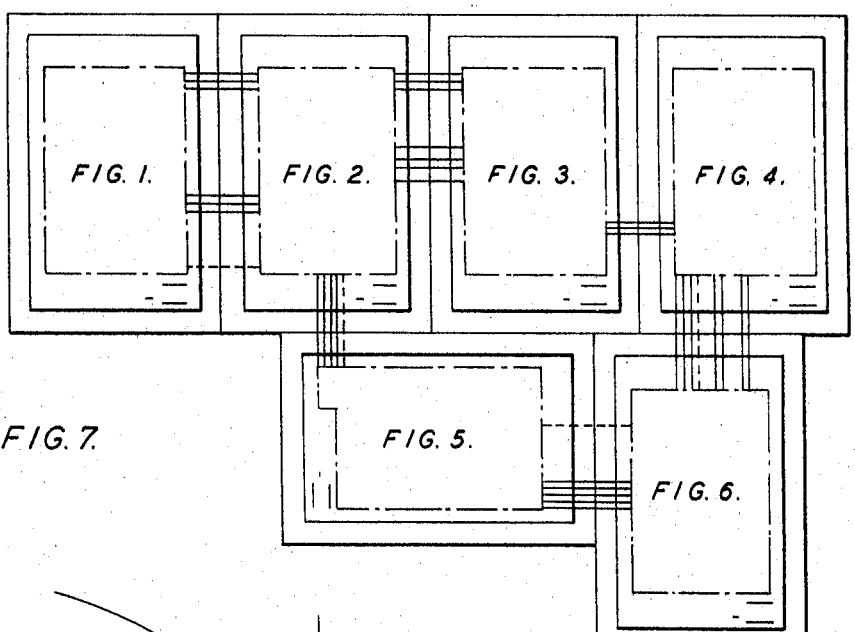
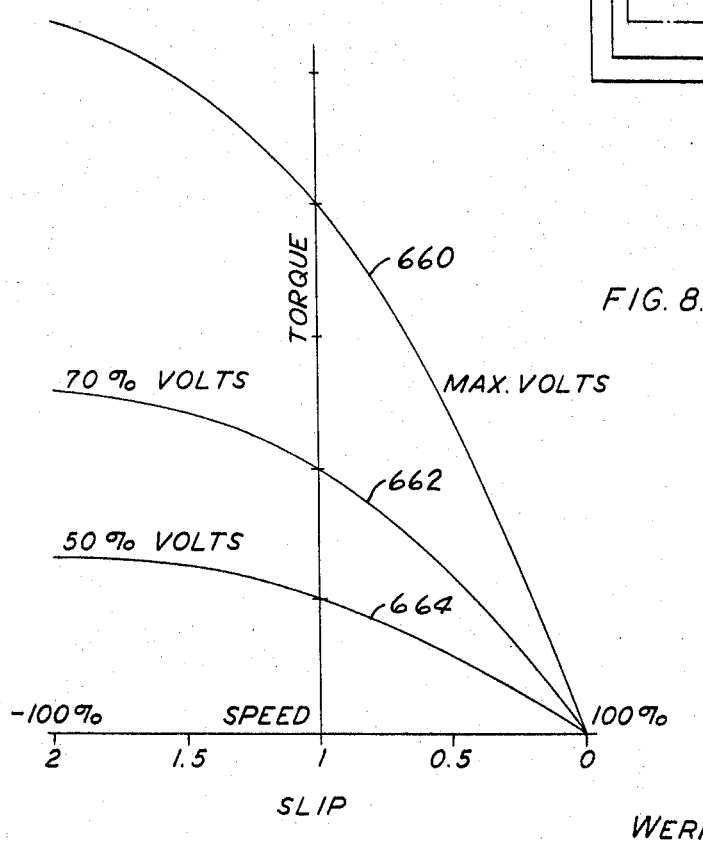

INVENTORS
WERNER J. MUELLER
NORMAN WOLFF

United States Patent Office 3,476,995
Patented Nov. 4, 1969

3,476,995
MULTIPLE MODE MOTOR CONTROL WITH A CONSTANT TENSION MODE AND A CONSTANT HORSEPOWER MODE
Werner J. Mueller, St. Louis County, and Norman Wolff, Olivette, Mo., assignors to Sperry Rand Corporation, a corporation of Delaware
Filed Feb. 26, 1963, Ser. No. 261,162
Int. Cl. H02k 7/00, 17/30
U.S. Cl. 318—6    25 Claims

ABSTRACT OF THE DISCLOSURE

A control system for a wound rotor, induction motor selectively enables that motor to apply constant tension to a load by connecting an inductance in parallel with the resistance of the rotor of that motor and by supplying values of negative voltage feed-back which are large enough to keep the voltage supplied to the stator of that motor substantially constant, and selectively enables that motor to apply constant horsepower to a load by multiplying the speed of the rotor of that motor by the voltage applied to the stator of that motor to provide voltage-modified speed-responsive negative feedback.

---

Figure 1:
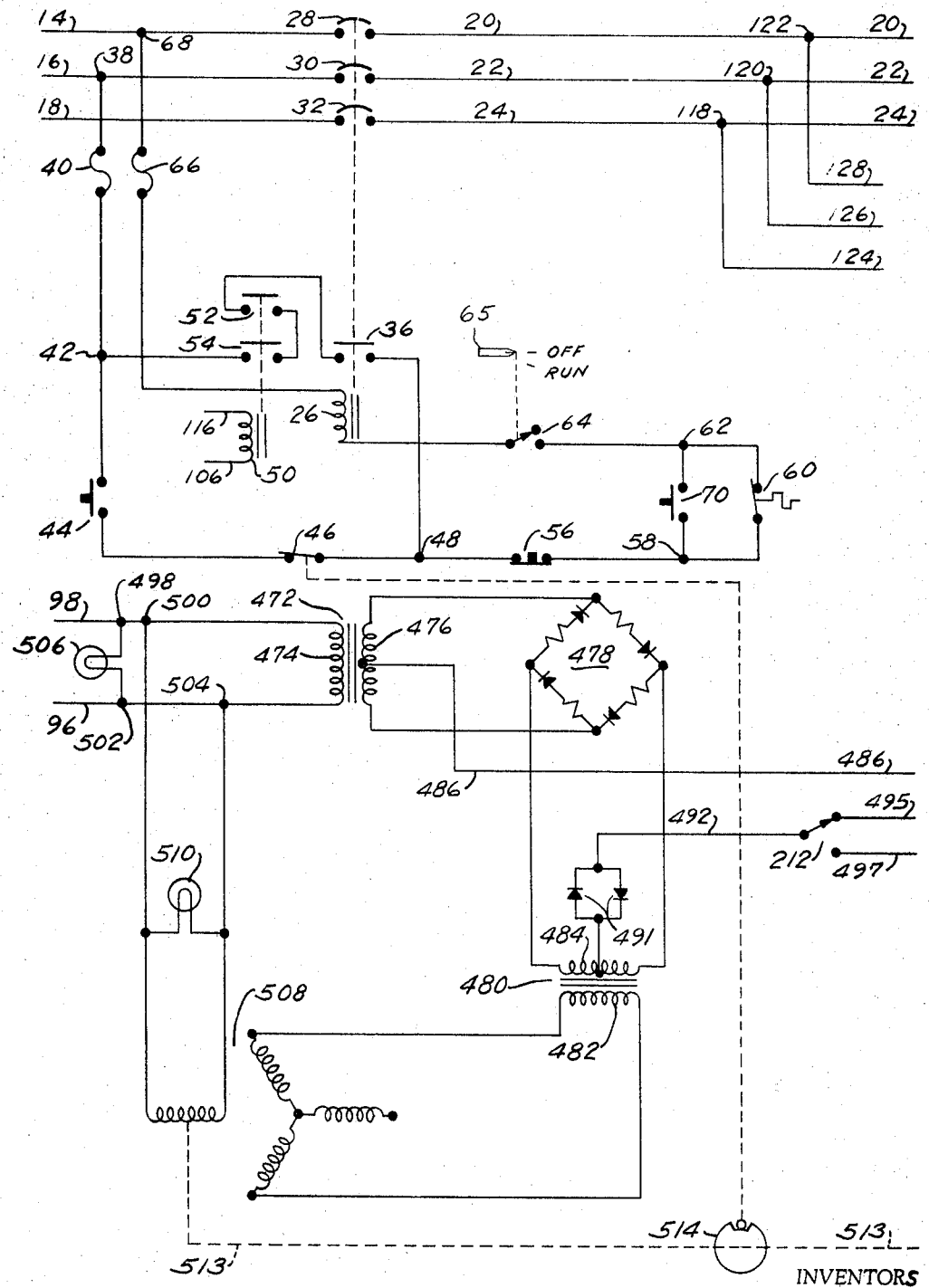

This invention relates to improvements in control systems. More particularly, this invention relates to improvements in control systems for electric motors.

It is therefore, an object of the present invention to provide an improved control system for electric motors.

Ocean-going vessels are customarily equipped with winches, and those winches are frequently driven by electric motors. Those winches are customarily used to hoist and lower cargo whenever those vessels are in ports; and, upon occasion, those winches are used to transfer cargo or personnel from one vessel to another while those vessels are at sea. The electric motors for those winches should be capable of providing smooth, step-less operation for those winches. Also, when those winches are being used to hoist and lower cargo in ports, the electric motors for those winches should be capable of operating those winches at different rates of speed. Further, when those winches are being used to transfer cargo or personnel from one vessel to another at sea, those electric motors should be capable of maintaining approximately constant tensions on the cables which extend between the two vessels. As a result, it would be desirable to provide a control system, for an electric motor that drives a winch aboard a vessel, which could enable that electric motor to provide smooth, step-less operation of that winch, which could vary and control the speed of that motor when that winch was being used to hoist and lower cargo in ports, and which could enable that winch to maintain an approximately constant tension on a cable extending between two vessels when cargo or personnel was being transferred at sea. The present invention provides such a control system; and it is, therefore, an object of the present invention to provide a control system, for an electric motor that drives a winch aboard a vessel, which enables that motor to provide smooth, step-less operation of that winch, which can vary and control the speed of that motor when that winch is being used to hoist and lower cargo in ports, and which can enable that winch to maintain an approximately constant tension on a cable between vessels at sea when cargo or personnel is to be transferred between those vessels.

When a winch aboard a vessel is being used to hoist cargo, the electric motor which drives that winch should be capable of applying approximately constant values of horsepower to that winch. The present invention enables an electric motor, which drives a winch aboard a vessel, to apply approximately constant values of horsepower to that winch when that winch is being used to hoist cargo. The present invention attains this important and desirable result by providing an induction motor with resistance in the rotor thereof, by using a tachometer driven by that motor to supply feedback to the voltage source for that motor, and by using variations in the voltage supplied to that motor to vary the gain of that tachometer and thereby modify that feedback. With such an arrangement, the control system of the present invention tends to act as a high gain closed loop; and the motor is enabled to apply approximately constant values of horsepower to the winch. It is, therefore, an object of the present invention to provide an induction motor with resistance in the rotor thereof, to provide a tachometer driven by that motor to supply feedback to the voltage source for that motor, and to use the voltage supplied to that motor to vary the gain of that tachometer and thereby modify that feedback.

When a winch is to be used to transfer cargo or personnel between vessels at sea, the electric motor which drives that winch should apply an approximately constant torque to that winch even when the relative motion of the vessel forces that winch to pay out cable at unpredictable rates and to pay out different lengths of cable. Also, that electric motor should apply an approximately constant tension to that winch when the relative motion of the vessels causes that winch to wind in cable at unpredictable rates and to wind in different lengths of that cable. Specifically, that electric motor should apply an approximately constant torque to that winch even when heavy seas cause the relative motion of the vessels to draw out significantly different lengths of cable and to draw out those different lengths of cable at significantly different rates of speed. Also, that electric motor should apply an approximately constant torque to that winch even when heavy seas cause the relative motion of the vessels to force that winch to pull in cable at different rates and to pull in significantly different lengths of cable. The present invention enables a motor to apply an approximately constant torque to a winch, even when that winch is forced to pull in and pay out cable at unpredictable rates and is forced to pay out or pull in differing lengths of that cable; and it does so by providing a wound rotor induction motor, by providing substantial resistive and inductive loads for the rotor windings of that motor, and by maintaining the steady-state voltage which is supplied to that motor substantially constant. Specifically, the present invention provides a wound rotor induction motor and provides a resistive load for the rotor windings of that motor which is large enough to substantially reduce the speed of that motor. Additionally, the present invention provides an inductive load, for those rotor windings, and maintains the steady-state voltage which is supplied to that motor substantially constant. As a result, the torque versus slip curves of the motor are generally linear from a value of five-tenths slip to a value of one and five-tenths slip. This means that the motor will apply an approximately constant torque to the winch even when that winch is forced to pull in and pay out cable at unpredictable rates and is forced to pay out and pull in differing lengths of that cable. It is, therefore, an object of the present invention to provide a wound rotor induction motor with a resistive load for the rotor windings of that motor which is large enough to substantially reduce the speed of that motor, to provide that motor with an inductive load for those rotor windings, and to maintain the steady-state voltage which is supplied to that motor substantially constant.

When a winch is being used to transfer cargo or personnel between vessels at sea, the motor which drives that winch should cause that winch to promptly take up any slack which the relative motion of the vessels might create in the cables between those vessels. The control system of the present invention enables the motor to cause the winch to promptly take up any slack in the cables by providing positive feedback from the tachometer, driven by the motor, to the voltage source for that motor. Specifically, when the rotor of the motor starts to rotate to cause the winch to take up any slack in the cables, the tachometer will provide positive feedback to the voltage source for that motor; and that voltage source will respond to that feedback to increase the voltage supplied to that motor. That motor will respond to that increase in voltage to increase its speed; and the tachometer will respond to that increase in speed to provide further feedback to the voltage source for the motor— with a consequent added increase in the voltage supplied to that motor, with a resulting further increase in the speed of that motor, and with still more feedback from the tachometer to the voltage source for the motor. As a result, the motor will accelerate rapidly and will cause the winch to promptly take up any slack in the cables. It is, therefore, an object of the present invention to provide a control system for an electric motor, that drives a winch, with a tachometer which provides positive feedback to the voltage source for that motor.

It would be undesirable for the positive feedback from the tachometer to the voltage source for the motor to be supplied on a continuous basis. Instead, it would be desirable for that positive feedback to be supplied to the voltage source only when the speed of the motor is changing. The present invention makes it possible to supply positive feedback to the voltage source for the motor only when the speed of that motor is changing by incorporating a rate network into the feedback loop of the control system. That rate network will ordinarily keep positive feedback from being supplied to the voltage source for the motor but will respond to changes in the speed of that motor to provide positive feedback. It is, therefore, an object of the present invention to provide a control system for an electric motor, which drives a winch, with a positive feedback loop that has a rate network therein.

When a winch is being used to lower cargo, the cargo can sometimes be so heavy that it tends to make the winch pay out cable more rapidly than is desired. Whenever this happens, the cargo is said to "overhaul" the winch; and any such overhauling of the winch should be prevented. The present invention prevents overhauling of the winch by providing a source of hoisting voltage for the motor, by providing a source of lowering voltage for that motor, and by causing that source of hoisting voltage to start supplying hoisting voltage to the motor whenever the cargo tends to overhaul the winch. With such an arrangement, the source of lowering voltage will usually determine the rate at which cargo is to be lowered, and the source of hoisting voltage will usually be inactive during the lowering of cargo. However, if the cargo should ever tend to overhaul the winch, the source of hoisting voltage would automatically supply hoisting voltage to the motor and thereby enable the motor to keep the lowering speed of the winch at the desired value. It is, therefore, an object of the present invention to provide a source of hoisting voltage for a motor, which drives a winch, to provide a source of lowering voltage for that motor, and to cause that source of hoisting voltage to start supplying hoisting voltage to the motor whenever the cargo tends to overhaul the winch.

When the winch is being used to transfer cargo or personnel between vessels at sea, the frictional forces in the motor, the frictional forces in the winch, the frictional forces in the gearing intermediate that motor and that winch, and the resistance of the cable to bending will result the pulling in of the cable and will also resist the paying out of that cable. The resistance to the paying out of the cable helps the motor keep relative motion of the vessels from creating slack in the cable; but the resistance to the pulling in of the cable constitutes a small additional load which the motor must overcome. That small additional load could, if not compensated for, cause a discontinuity in the torque versus slip curve of the motor; and such a discontinuity would be objectionable. The present invention obviates such a discontinuity by providing a small but finite increase in the power supplied to the motor whenever the winch is pulling in the cable to take up slack, and by providing a small but finite decrease in the power supplied to that motor whenever the winch is permitting the cable to be paid out to compensate for the relative movement of the vessels. Specifically, the control system provided by the present invention causes the tachometer, driven by the motor, to coact with the source of hoisting voltage to provide a small but finite increase in the power supplied to the motor whenever the winch is pulling in the cable to take up slack and to provide a small but finite decrease in power when the winch is permitting the cable to be paid out. It is, therefore, an object of the present invention to provide a small but finite increase in the power supplied to the motor whenever the winch is pulling in the cable to take up slack, and to provide a small but finite decrease in the power supplied to that motor whenever the winch is permitting the cable to be paid out to compensate for the relative movement of the vessels.

The control system provided by the present invention utilizes a synchro transmitter and a magnetic demodulator to control the hoisting voltage supplied to the motor and also to control the lowering voltage supplied to that motor. The combination of the synchro transmitter and the magnetic demodulator is desirable because it provides smooth and step-less control of both the hoisting voltage and the lowering voltage, and because it obviates all need of movable contacts. However, the point at which the combination of a synchro transmitter and a magnetic demodulator reverses the polarity of the signal which it supplies is not as readily determined as is the point at which a controller equipped with movable contacts reverses the polarity of the signal which it supplies. As a result, setting of the handle of the synchro transmitter could be critical; and a critical setting of that handle would be undesirable. The present invention keeps the setting of the handle of the synchro transmitter from being critical by providing a "dead" area on both sides of the point at which the combination of the synchro transmitter and the magnetic demodulator reverses the polarity of the signal which it supplies. Those "dead" areas will be narrow, and hence will not interfere with the control of the motor that drives the winch; but those "dead" areas will keep the setting of the handle for the synchro transmitter from being critical. It is, therefore, an object of the present invention to provide a "dead" area on both sides of the point at which the combination of the synchro transmitter and the magnetic demodulator reverses the polarity of the signal which it supplies.

Other and further objects and advantages of the present invention should become apparent from an examination of the drawing and accompanying description.

In the drawing and accompanying description, a preferred form of the present invention is shown and described but it is to be understood that the drawing and accompanying description are for the purpose of illustration only and do not limit the invention and that the invention will be defined by the appended claims.

Figure 9:
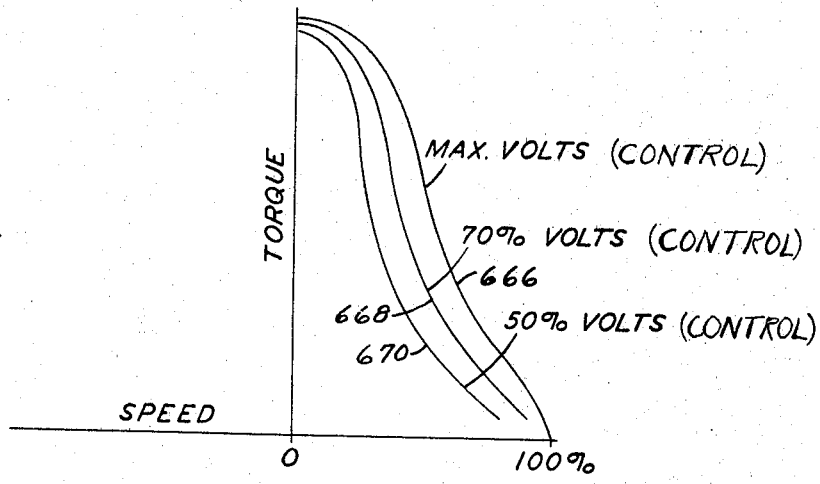
Figure 10:
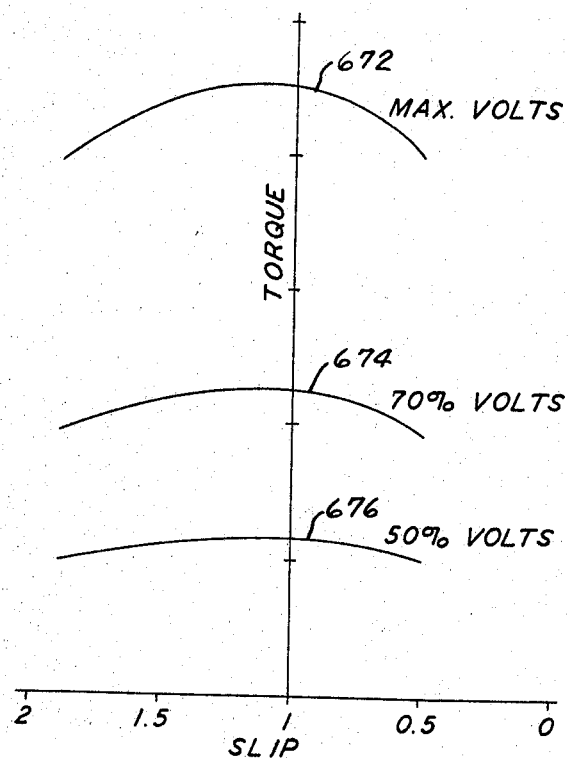
Figure 11:
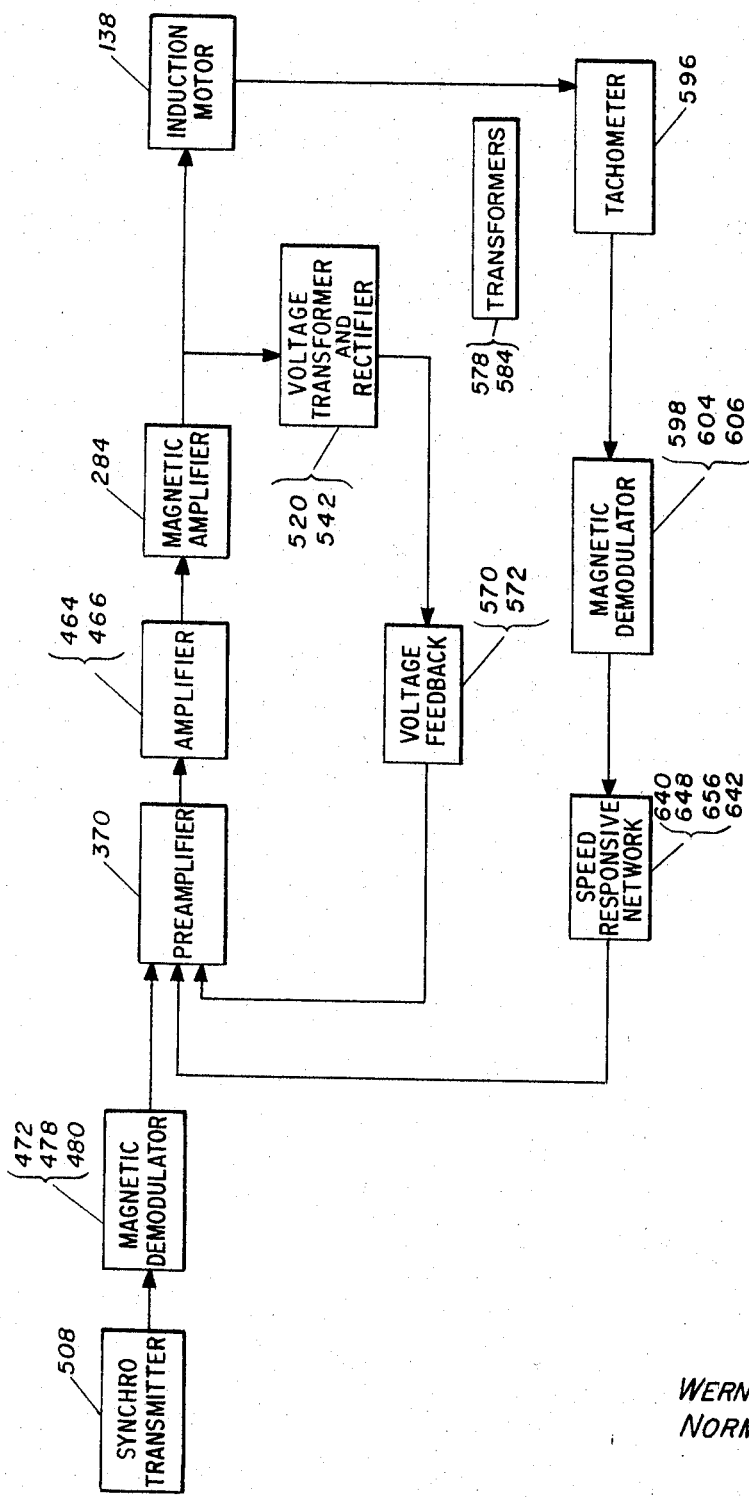

In the drawing, FIGURES 1–6 constitute a schematic diagram of a preferred form of control system of the present invention, FIGURE 7 is a diagram showing how FIGURES 1–6 are interrelated, FIGURE 8 is a graph showing how the torque of the winch-driving motor varies with the speed or slip when normal feedback is provided, FIGURE 9 is a graph showing how the torque of the motor varies with speed when modified feedback is provided and the motor is used to hoist cargo, FIG. 10 is a graph showing how the torque of the motor varies with slip when a substantially constant voltage is supplied and the motor is used to maintain an approximately constant tension on a cable that is transferring cargo or personnel between two vessels at sea, and FIG. 11 is a block diagram showing the control system as that control system maintains an approximately constant tension on a cable.

COMPONENTS OF CONTROL SYSTEM

Referring to the drawing in detail, the numerals 14, 16 and 18 denote conductors which can be suitably connected to a source of A.C. voltage. In the particular embodiment of control system shown, those conductors can be suitably connected to a source of three phase, sixty cycle, four hundred and forty volts. The numeral 26 denotes a relay coil; and that relay coil controls normally-open relay contacts 28, 30, 32 and 36. The relay contacts 28 can connect conductor 14 to a conductor 20, the relay contacts 30 can connect conductor 16 to a conductor 22, and the relay contacts 32 can connect conductor 18 to a tor 22, and the relay contacts 32 can connect conductor conductor 24. One terminal of relay coil 26 is connected to the conductor 14 by a fuse 66 and a junction 68. The other terminal of that relay coil is connectable to the conductor 16 by a switch 64, a junction 62, a temperature-responsive switch 60, a junction 58, a normally-closed push button 56, a junction 48, a switch 46, a normally-open push button 44, junction 42, a fuse 40, and a junction 38. That other terminal of relay coil 26 also is connectable to the conductor 16 by switch 64, junction 62, temperature-responsive switch 60, junction 58, normally-closed push button 56, junction 48, relay contacts 36, normally-open relay contacts 52, normally-open relay contacts 54, junction 42, fuse 40 and junction 38. The relay contacts 52 and 54 are controlled by a relay coil 50; and the terminals of that relay coil will be suitably connected to a source of D.C. voltage by conductors 106 and 116. The two sets of relay contacts 52 and 54 are provided to minimize arcing. That other terminal of relay coil 26 also is connectable to the conductor 16 by switch 64, junction 62, normally-open push button 70, junction 58, normally-closed push button 56, junction 48, switch 46, normally-open push button 44, junction 42, fuse 40, and junction 38. While the push buttons 44, 56 and 70 and the switch 46 are shown in FIG. 1, those push buttons and that switch will be disposed within a water-tight housing 153 in FIG. 4.

The switch 64 is provided with a suitable control knob 65; and that knob can be set in an upper or "OFF" position or can be set in lower or "RUN" position. Whenever that knob is in its upper position, the switch 64 will be open; but whenever that knob is in its lower position, that switch will be closed.

The normally-open push button 44 constitutes a "start" button for the control system provided by the present invention. The normally-closed push button 56 constitutes a "stop" button which can be used to de-energize the control system. The push button 56 will normally be used to de-energize the control system, but, where desired, the switch 64 can be used for that purpose.

The temperature-responsive switch 60 is physically mounted within the housing of the motor 138 which is controlled by the control system of the present invention and which has the output shaft thereof connected to a winch, not shown. That motor is shown schematically in FIG. 4. The switch 60 will respond to heating of the motor 138 to open its contacts; and, as a result, that switch can prevent overheating of that motor. The temperature-responsive switch 60 is of standard and usual design and it is not, per se, a part of the present invention. The normally-open push button 70 is connected in parallel with the temperature-responsive switch 60; and that push button could be used to effect the lowering of any cargo which might be in an elevated position at a time when the motor 138 became heated. This is desirable because it enables the control system provided by the present invention to lower cargo to a safe position on the deck of the vessel or on an adjacent dock even if the temperature-responsive switch 60 has responded to heating of the motor to open its contacts.

Where desired, a heater, not shown, could be mounted within the motor 138; and such a heater would be helpful in keeping the windings of that motor free from moisture which might otherwise tend to condense within the motor housing. That heater also would keep ice from forming on the motor housing and motor output shaft to a depth sufficient to prevent rotation of that output shaft. Such a heater should be connected so it was in operation whenever the switch 64 was in its upper position, and so it was de-energized whenever the switch 64 was in its lower position. Such an arrangement could easily be effected by adding a pair of normally-closed relay contacts to the armature of the relay which is operated by the relay coil 26 and by connecting those relay contacts in series with the electric heater.

The control system provided by the present invention will be housed within a suitable, water-tight housing; and interlock switches, not shown, will be provided for the doors of that housing. Such interlock switches will de-energize the control system, and will thereby avoid injury to persons working with that control system, whenever the doors of the housing are open. Furthermore, a switch, not shown, that was responsive to air pressure or to air flow, could be incorporated in the circuit of the control system provided by the present invention. Such a switch would normally be open, and would be closed only when the fan or blower 132 of FIG. 4 was driven rapidly enough by the fan or blower motor 130 to cause that switch to close. Furthermore, that air-responsive switch would remain closed only as long as that fan or blower maintained a minimum air pressure or a minimum air flow adjacent that switch. The interlock switches and the air-responsive switch could be conveniently connected intermediate the relay contacts 54 and the junction 42 in FIG. 1.

Figure 2:
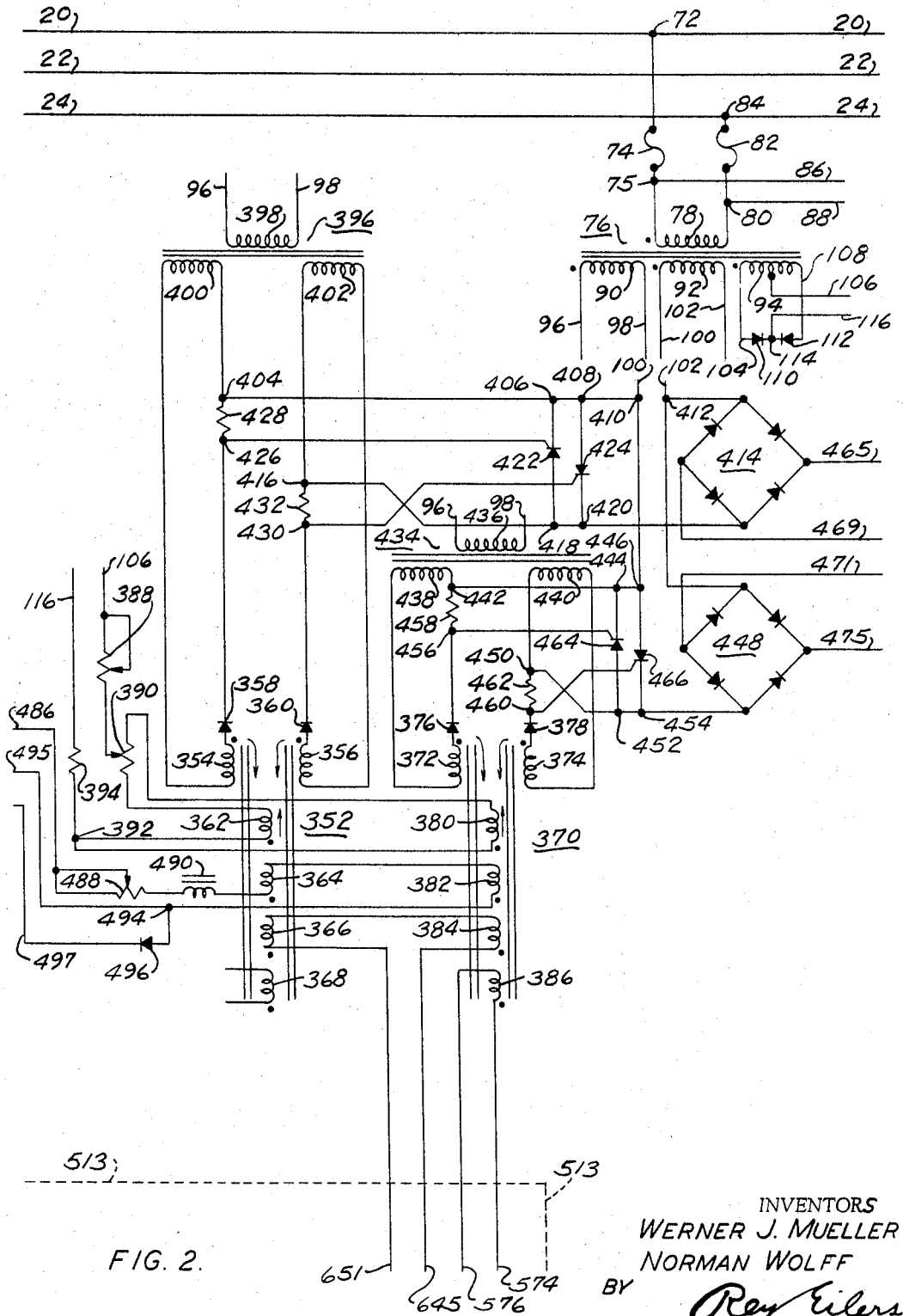

Referring to FIG. 2, the numeral 72 denotes a junction in the conductor 20; and a fuse 74 and a junction 75 connect that junction to one terminal of the primary winding 78 of a transformer 76. The other terminal of that primary winding is connected to the conductor 24 by a junction 80, a fuse 82, and a junction 84. Conductors 86 and 88 are connected to the junctions 75 and 80 thus can supply four hundred and forty volts A.C.

The transformer 76 has a secondary winding 90, a secondary winding 92, and a center-tapped secondary winding 94. The secondary winding 90 is wound to provide one hundred and twenty volts A.C., the secondary winding 92 is wound to provide forty-five volts A.C., and the center-tapped secondary winding 94 is wound to provide one hundred and twenty volts A.C., the secondary winding about twenty-five volts between the center-tap thereof and each of the end terminals thereof. Conductors 96 and 98 extend from the terminals of the secondary winding 90 to supply one hundred and twenty volts A.C., and conductors 100 and 102 extend from the terminals of the secondary winding 92 to provide forty-five volts A.C. A diode 110 has the anode thereof connected to one of the end terminals of the center-tapped secondary winding 94 by a conductor 104, and a diode 112 has the anode thereof connected to the other end terminal of that center-tapped secondary winding by a conductor 108; and the cathodes of those diodes are connected together by a junction 114. The center-tap of the center-tapped secondary winding 94 is connected to the conductor 106, and the junction 114 is connected to the conductor 116. Those two conductors extend to the relay coil 50 in FIG. 1; and they also extend to other components of the control system.

Figure 4:
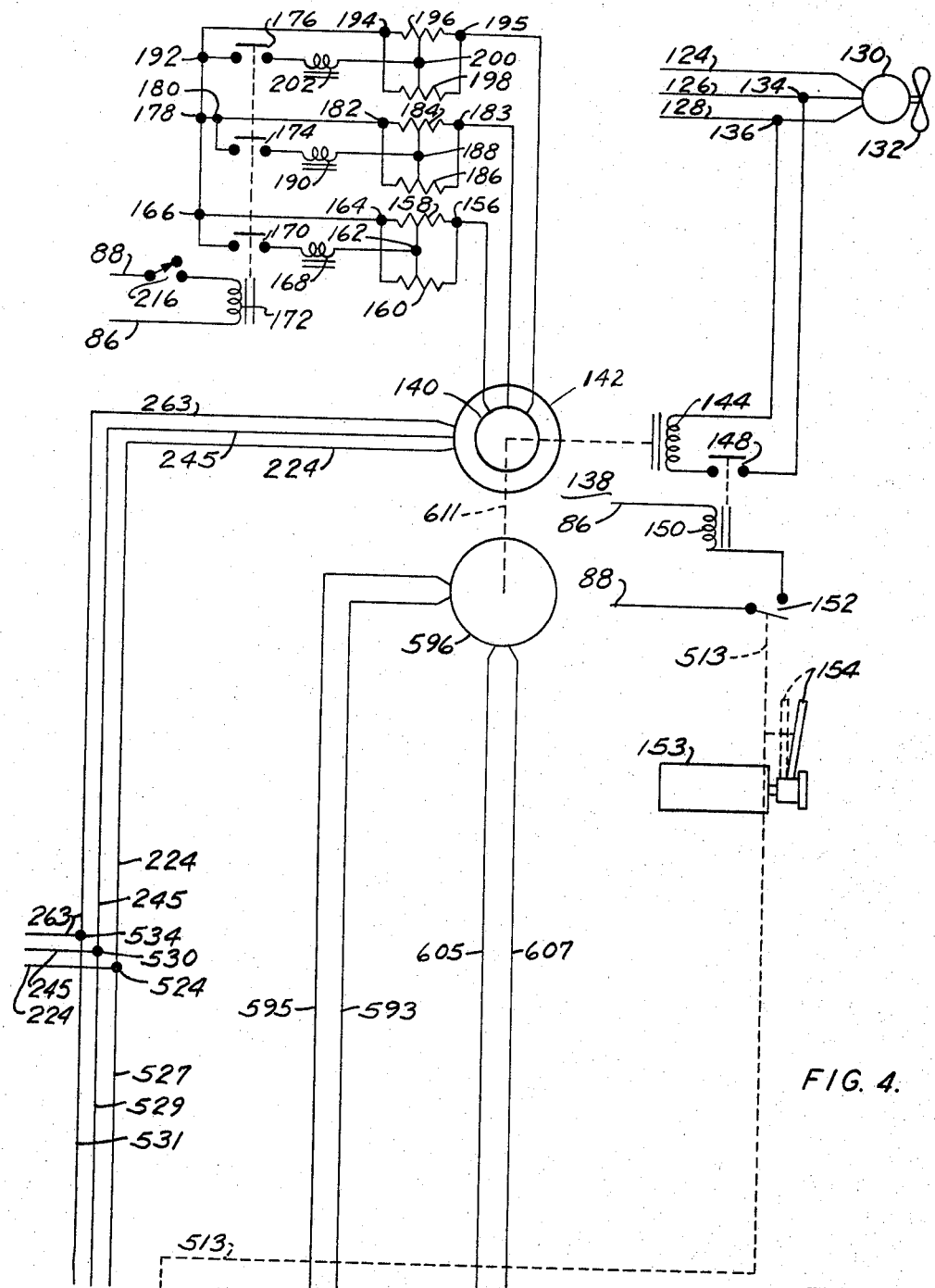

The numeral 118 in FIG. 1 denotes a junction in the conductor 24; and a conductor 124 extends from that junction to one of the terminals of the fan or blower motor 130 shown in FIG. 4. A junction 120 is provided in the conductor 22; and a conductor 126 extends from that junction to a second terminal of the fan or blower motor 130. A junction 122 is provided in the conductor 20; and a conductor 128 extends from that junction to the third terminal of the fan or blower motor 130. The junctions 118, 120, and 122 and the conductors 124, 126 and 128 coact with the conductors 24, 22 and 20 to directly connect the fan or blower motor 130 to the relay contacts 32, 30 and 28. As a result, whenever those relay contacts are closed, the fan or blower motor 130 will operate to rotate the fan or blower 132.

A junction 134 is provided in the conductor 126, as shown by FIG. 4; and that junction is connectable to one terminal of the braking coil 144 of the motor 138 by relay contacts 148. The other terminal of that braking coil is connected to the conductor 128 by a junction 136. The relay contacts 148 are controlled by a relay coil 150; and one terminal of that relay coil is connected to the conductor 20 by conductor 86, junction 75, fuse 74, and junction 72. The other terminal of that relay coil is connectable to conductor 24 by a switch 152, conductor 88, junction 80, fuse 82, and junction 84. The switch 152 is located within the housing 153 which is shown in FIG. 4; and a handle 154 is provided for movement relative to that housing. Whenever the handle 154 is in the solid-line position of FIG. 4, the switch 152 will be open; and hence the relay coil 150 will be de-energized. Whenever that relay coil is de-energized, the relay contacts 148 will be open, and the braking coil 144 of the motor 138 will be de-energized; and, whenever that braking coil is de-energized, the brake of that motor will be applied and will prevent rotation of the output shaft of that motor. However, when the handle 154 is moved to the dotted-line position of FIG. 4 and the relay contacts 28, 30 and 32 of FIG. 1 are closed, the relay coil 150 will be energized and will close the relay contacts 148. At such time, the braking coil 144 will be energized and will hold the brake of the motor 138 in released position and will thereby free the output shaft of that motor for rotation. By having the brake of the motor 138 released only when the braking coil 144 is energized, that motor will "fail-safe"; and such an arrangement is very desirable.

The handle 154 is biased for movement to the solid-line position shown in FIG. 4; but it can be manually moved to and held in its dotted-line position by the operator of the control system provided by the present invention. That handle also can be rotated about an axis which is parallel to the plane of the paper of FIG. 4; and it will be rotated forwardly of that plane whenever the motor 138 is to permit the winch to lower cargo, and it will be rotated rearwardly of that plane whenever the motor 138 is to cause that winch to hoist cargo or to maintain a constant tension on the cable secured to that winch. A guide, not shown, on the housing 153 automatically forces the handle 154 to move into its dotted-line position whenever that handle is rotated into its hoisting or lowering position. This means that the switch 152 will be open only when the handle 154 is in its neutral position and is permitted to move to its solid-line position.

The motor 138 is a wound rotor, induction motor; and the windings for the rotor thereof are denoted by the numeral 140 while the windings for the stator thereof are denoted by the numeral 142. In one preferred embodiment of the present invention, the motor 138 is a three phase, four hundred and forty volt, four pole, lap wound, sixty-five horsepower motor that has a synchronous, no-load speed of eighteen hundred revolutions per minute for the output shaft thereof at sixty cycles per second.

The numeral 156 denotes a junction which is connected to one of the terminals of the rotor windings 140 of the motor 138; and the right-hand terminals of potentiometers 158 and 160 are connected to that junction. The left-hand terminals of those potentiometers are connected together by a junction 164; and the movable contacts of those potentiometers are connected together by a junction 162. A junction 166 is directly connected to the junction 164; and it is connected to the junction 162 by relay contacts 170 and an inductor 168. A junction 183 connects another terminal of the rotor windings 140 to the right-hand terminals of potentiometers 184 and 186. The left-hand terminals of those potentiometers are connected together by a junction 182; and the movable contacts of those potentiometers are connected together by a junction 188. A junction 180 is directly connected to the junction 182; and it is connected to the junction 188 by relay contacts 174 and an inductor 190.

The numeral 195 denotes a junction which is connected to the third terminal of the rotor windings 140 of the motor 138, and that junction is connected to the right-hand terminals of potentiometers 196 and 198. The left-hand terminals of those potentiometers are connected together by a junction 194; and the movable contacts of those potentiometers are connected together by a junction 200. A junction 192 is directly connected to the junction 194; and it is connected to the junction 200 by relay contacts 176 and an inductor 202. The junctions 166, 180 and 192 are all connected together by a junction 178.

The relay contacts 170, 174 and 176 are controlled by a relay coil 172; and one terminal of that relay coil is connected to the conductor 20 by the conductor 86, junction 75, fuse 74, and junction 72. The other terminal of that relay coil is connectable to the conductor 24 by contacts 216, conductor 88, junction 80, fuse 82, and junction 84. This means that whenever the contacts 216 are closed and the relay contacts 28 and 32 also are closed, the relay contacts 170, 174 and 176 in FIG. 4 will be closed. Whenever the latter three relay contacts are closed, the inductor 168 will be connected in parallel relation with the left-hand portions of the parallel-connected potentiometers 158 and 160, the inductor 190 will be connected in parallel relation with the left-hand portions of the parallel-connected potentiometers 184 and 186, and the inductor 202 will be connected in parallel relation with the left-hand portions of the parallel-connected potentiometers 196 and 198. However, whenever the contacts 216 are open, the relay coil 172 will be de-energized and the relay contacts 170, 174 and 176 will be open; and, at such time, no current will flow through the inductors 168, 190 and 202. As a result, whenever the contacts 216 are open, the load on the rotor windings 140 of the motor 138 will be dominantly resistive; whereas whenever those contacts are closed, the load on those rotor windings will be inductive as well as resistive. In the said preferred embodiment of the present invention, the inductive value of each of the inductors 168, 190 and 202 was forty-two microhenries. The resistive value of each of the potentiometers 158, 160, 184, 186, 196 and 198 is forty-five hundredths of an ohm; and each of those potentiometers has an ampere rating of one hundred and twenty-seven.

Three potentiometers could, if desired, be used instead of the potentiometers 158, 160, 184, 186, 196 and 198. However, the use of the six potentiometers minimizes the problem of heat dissipation. The settings of the movable contacts of the potentiometers 158, 160, 184, 186, 196 and 198 will be made by the manufacturer of the control system; and will then be suitably protected against accidental changes.

Figure 5:
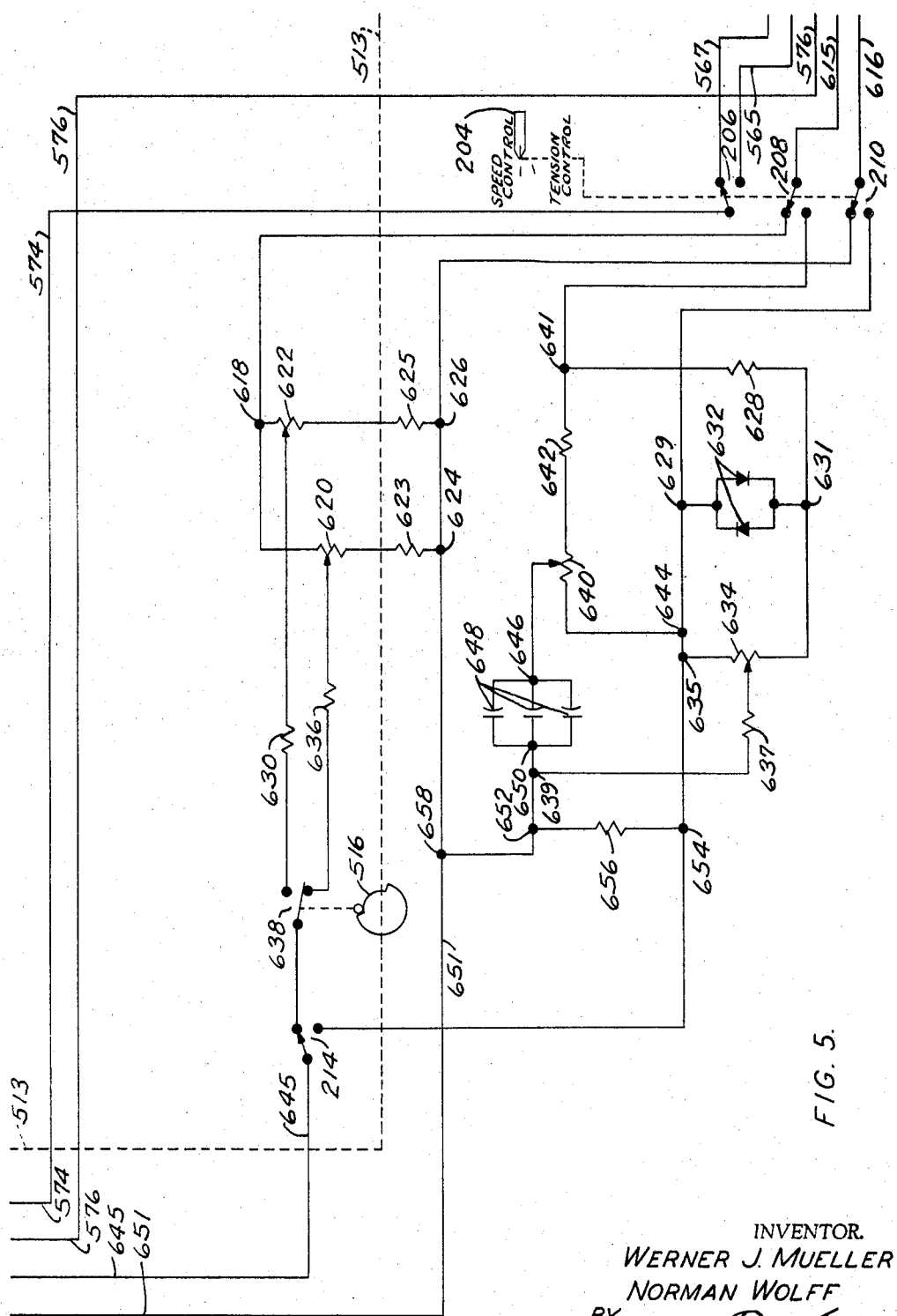

The numeral 204 denotes the knob of a manually-operated switch that has contacts 206, 208 and 210 shown in FIG. 5, that has contacts 212 shown in FIG. 1, that has contacts 214 shown in FIG. 5, and that has contacts 216 which are connected to the left-hand terminal of the relay coil 172 in FIG. 4. The movable contacts of the various switch contacts 206, 208, 210, 212, 214, and 216 will be in their upper positions whenever the switch knob 204 is in the upper position shown by FIG. 5; and those movable contacts will be in their lower positions whenever that switch knob is moved to its lower position. The switch knob 204 will be in its upper position whenever the motor 138 is to be used to cause the winch to raise and lower cargo in port; and that switch knob will be in its lower position whenever that motor is intended to maintain a constant tension on a cable extending between vessels at sea and some cargo is to be transferred between those vessels. The switch knob 204 will be mounted on, and the contacts 206, 208, 210, 212, 214 and 216 will be disposed within, the housing 153 of FIG. 4; and that housing will protect those contacts against the elements.

Figure 3:
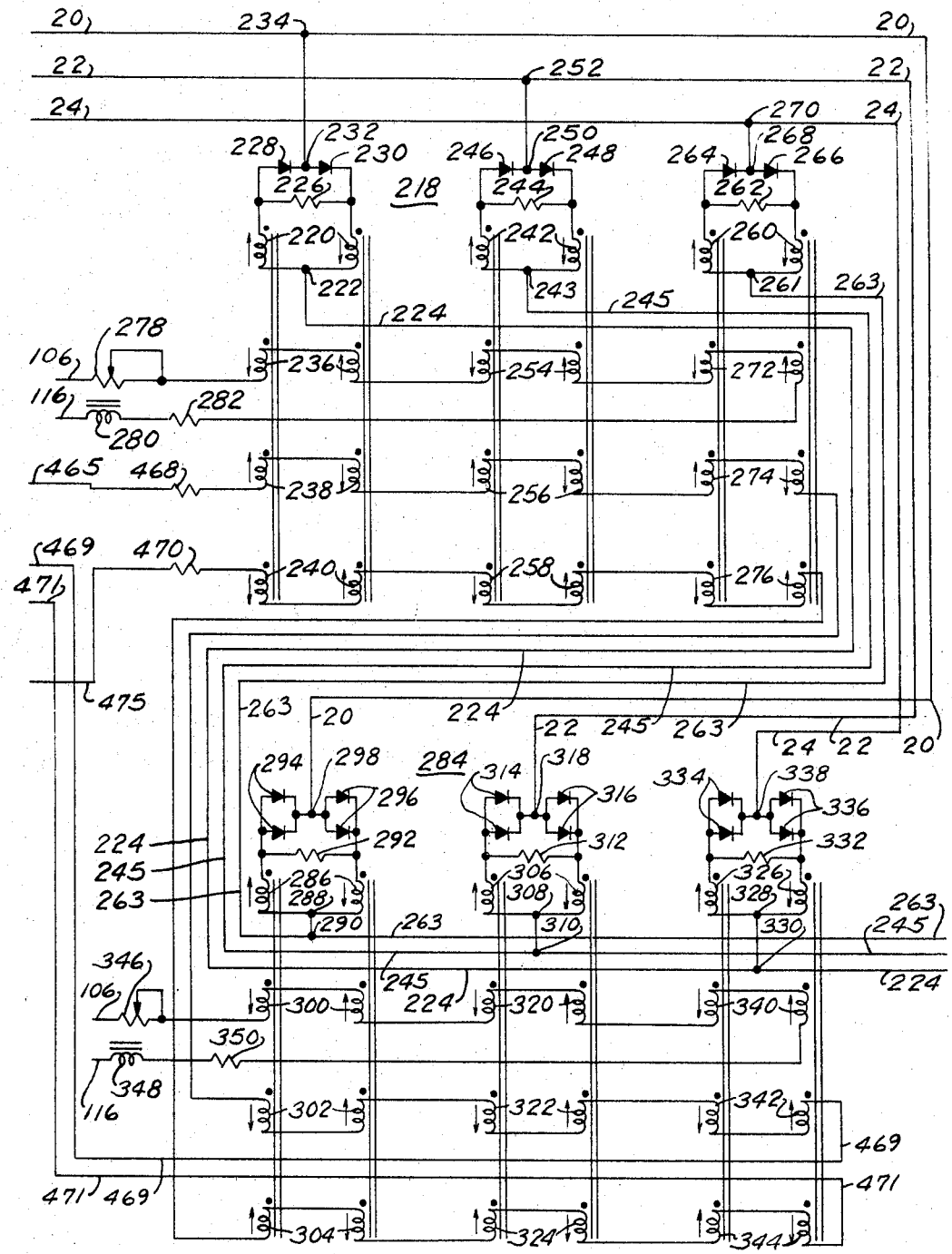

Referring to FIG. 3, the numeral 218 generally denotes a three phase, magnetic amplifier that has an A.C. output and a D.C. control. That magnetic amplifier is of standard and usual construction; and it is similar to the magnetic amplifier disclosed on page 25 of Bulletin 1105–1 of Vickers Incorporated Electric Products Division. The magnetic amplifier 218 differs from said magnetic amplifier in the said bulletin in having resistors connected across the output windings thereof, in having an additional control winding in each section thereof, and in not having a full wave, bridge rectifier connected to the output thereof.

The left-hand section of the magnetic amplifier 218 has output windings 220; and the lower ends of those output windings are connected together by a junction 222. The upper end of the left-hand output winding 220 is connected to the anode of a diode 228, while the upper end of the right-hand output winding 220 is connected to the cathode of a diode 230. The cathode of the diode 228 is connected to the anode of the diode 230 by a junction 232; and that junction is connected to the conductor 20 by a junction 234. A resistor 226 is connected between the anode of the diode 228 and the cathode of the diode 230. The junction 222 is connected to one of the terminals of the stator windings 142 of the motor 138 by a conductor 224. The numeral 236 deontes the bias windings for the left-hand section of the magnetic amplifier 218, the numeral 238 denotes control windings of a first set of control windings for that left-hand section, and the numeral 240 denotes control windings of a second set of control windings for that left-hand section.

The other two sections of the magnetic amplifier 218 are identical to the first section. Specifically, the middle section has output windings 242 that have the lower ends thereof connected together by a junction 243; and the upper terminals of those output windings are connected to diodes 246 and 248. A junction 250 is provided between the cathode of the diode 246 and the anode of the diode 248; and that junction is connected to the conductor 22 by a junction 252. A resistor 244 is connected between the anode of the diode 246 and the cathode of the diode 248. The junction 243 is connected to a second terminal of the stator windings 142 of the motor 138 by a conductor 245. The middle section of the magnetic amplifier 218 has bias windings 254, has control windings 256 of a first set of control windings, and has control windings 258 of a second set of control windings.

The right-hand section of the magnetic amplifier 218 has output windings 260 which have the lower ends thereof connected together by a junction 261; and the upper terminals of those output windings are connected to diodes 264 and 266. The cathode of the diode 264 is connected to the anode of the diode 266 by a junction 268; and that junction is connected to the conductor 24 by a junction 270. A resistor 262 is connected between the anode of the diode 264 and the cathode of the diode 266. The junction 261 is connected to the third terminal of the stator windings 142 of the motor 138 by a conductor 263. The right-hand section of the magnetic amplifier 218 has bias windings 272, has control windings 274 of a first set of control windings, and has control windings 276 of a second set of control windings.

The bias windings 236, 254 and 272 of the magnetic amplifier 218 are connected in series; and they are connected to the conductors 106 and 116 by an adjustable resistor 278 and by a serially-connected resistor 282 and an inductor 280. Adjustment of the movable contact of the adjustable resistor 178 will determine the value of the current flowing through the bias windings 236, 254 and 272.

The resistors 226, 344 and 262 of the magnetic amplifier 218 are important in protecting the diodes 228, 230, 246, 248, 264 and 266 against injury. Specifically, those resistors provide discharge paths which can keep large reverse voltages from being applied to those diodes. Those resistors also are important in avoiding premature and undesirable "firing" of the various sections of the magnetic amplifier 218.

The numeral 284 denotes a second three phase, magnetic amplifier; and that magnetic amplifier is similar to the magnetic amplifier 218. The left-hand section of the magnetic amplifier 284 has output windings 286; and the lower terminals of those output windings are connected together by a junction 288 which, in turn, is connected to the third terminal of the stator windings 142 of the motor 138 by junction 290 and conductor 263. The upper terminal of the left-hand output winding 286 is connected to the anodes of parallel-connected diodes 294; and the upper terminal of the right-hand output winding 286 is connected to the cathodes of parallel-connected diodes 296. The cathodes of the diodes 294 are connected to the anodes of the diodes 296 by a junction 298; and that junction is connected to the conductor 20. A resistor 292 is connected to the anodes of the diodes 294 and to the cathodes of the diodes 296.

The left-hand section of the magnetic amplifier 284 has bias windings 300, has control windings 302 of a first set of control windings, and has control windings 304 of a second set of control windings.

The other two sections of the magnetic amplifier 284 are similar to the left-hand section of that magnetic amplifier. Specifically, the middle section has output windings 306 which have the lower terminals thereof connected together by the junction 308; and that junction, in turn, is connected to the second terminal of the stator windings 142 of the motor 138 by junction 310 and conductor 245. The upper terminals of the output windings 306 are connected to parallel-connected diodes 314 and to parallel-connected diodes 316. The cathodes of the diodes 314 are connected to the anodes of the diodes 316 by a junction 318; and that junction is connected to the conductor 22. A resistor 312 is connected between the anodes of the diodes 314 and the cathodes of the diodes 316. The middle section of the magnetic amplifier 284 has bias windings 320, control windings 322 of a first set of control windings, and control windings 324 of a second set of control windings.

The right-hand section of the magnetic amplifier 284 has output windings 326 which have the lower terminals thereof connected together by a junction 328; and that junction, in turn, is connected to the said one terminal of the stator windings 142 of the motor 138 by a junction 330 and the conductor 224. The upper terminals of the output windings 326 are connected to parallel-connected diodes 334 and to parallel-connected diodes 336; and the cathodes of the diodes 334 are connected to the anodes of the diodes 336 by a junction 338. That junction, in turn, is connected to the conductor 24. A resistor 332 is connected to the anodes of the diodes 334 and to the cathodes of the diodes 336. The right-hand section of the magnetic amplifier 284 has bias windings 340, control windings 342 of a first set of control windings, and control windings 344 of a second set of control windings.

The bias windings 300, 320 and 340 of the three sections of the magnetic amplifier 284 are connected in series, and are connected to the conductors 106 and 116 by an adjustable resistor 346 and by a serially-connected resistor 350 and an inductor 348. Adjustment of the movable contact of the adjustable resistor 346 will determine the value of the current flowing through the bias windings 300, 320 and 340.

The resistors 292, 312 and 332 of the magnetic amplifier 284 are important in protecting the diodes 294, 296, 314, 316, 334 and 336. Specifically, those resistors provide discharge paths which can keep large reverse voltages from being applied to those diodes. Those resistors also are important in avoiding premature and undesirable "firing" of the various sections of the magnetic amplifier 284.

The bias windings 236, 254 and 272 of the three sections of the magnetic amplifier 218 are wound so current flowing through them will provide a negative effect and will hold the output of that magnetic amplifier down. Similarly, the bias windings 300, 320 and 340 of the three sections of the magnetic amplifier 284 are wound so current flowing through them will provide a negative effect and will hold the output of that magnetic amplifier down. The movable contacts of the adjustable resistors 278 and 346 will be set so the magnetic amplifiers 218 and 284 will provide zero output until signals are applied to the control windings thereof.

The control windings 302, 322 and 342 of the magnetic amplifier 284 are connected in series with each other and also are connected in series with the control windings 238, 256 and 274 of the magnetic amplifier 218. However, the control windings 302, 322 and 342 of the magnetic amplifier 284 are connected so current flowing through them will have a negative effect and will hold the output of that magnetic amplifier down; whereas the control windings 238, 256 and 274 of the magnetic amplifier 218 are connected so current flowing through them will have a positive effect and will drive the output of that magnetic amplifier up. This means that current flowing through the first sets of control windings of the magnetic amplifiers 218 and 284 will increase the output of the magnetic amplifier 218 while simultaneously holding down the output of the magnetic amplifier 284.

The control windings 304, 324 and 344 of the magnetic amplifier 284 are connected in series with each other and also are connected in series with the control windings 240, 258 and 276 of the magnetic amplifier 218. However, the control windings 304, 324 and 344 of the magnetic amplifier 284 are wound so current flowing through them will provide a positive effect and will drive the output of that magnetic amplifier up; whereas the control windings 240, 258 and 276 of the magnetic amplifier 218 are wound so current flowing through them will provide a negative effect and will hold the output of that magnetic amplifier down. This means that current flowing through the second sets of control windings of the magnetic amplifier 218 and 284 will hold the output of the magnetic amplifier 218 down while simultaneously driving the output of the magnetic amplifier 284 up.

It should also be noted that the magnetic amplifiers 218 and 284 can connect the conductors 20 and 24 to different terminals of the motor 138. Specifically, the magnetic amplifier 218 can connect the conductor 24 to the uppermost terminal of the stator windings 142 of the motor 138, whereas the magnetic amplifier 284 can connect the conductor 24 to that terminal. Similarly, the magnetic amplifier 218 can connect the conductor 24 to the uppermost terminal of the stator windings 142 of the motor 138, whereas the magnetic amplifier 284 can connect the conductor 20 to that terminal. As a result, the magnetic amplifiers 218 and 284 can cause the rotor of the motor 138 to rotate in opposite directions. Those magnetic amplifiers and that motor are so connected that the magnetic amplifier 218 will drive the rotor of the motor 138 in the lowering direction whereas the magnetic amplifier 284 will drive that rotor in the hoisting direction. Because more power is needed to hoist cargo than to lower cargo, the capacity of the magnetic amplifier 284 is greater than that of the magnetic amplifier 218. The parallel-connected diodes 294, 296, 314, 316, 334 and 336 are provided to enable them to safely pass the large amounts of power supplied by the output windings 286, 306, and 326 of the magnetic amplifier 284.

Referring to FIG. 2, the numeral 352 generally denotes a single phase, magnetic amplifier which has an A.C. output and a D.C. control. That magnetic amplifier is of standard and usual construction; and it is similar to the magnetic amplifier disclosed on page 22 of the said Bulletin 1105–1. However, the magentic amplifier 352 has just one bias winding, has three control windings, and has different connections for the output windings thereof. Specifically, the output winding 354 of the magnetic amplifier 352 has the lower terminal thereof connected to one terminal of a secondary winding 400 of a transformer 396, and has the upper terminal thereof connected to the anode of a diode 358. The lower terminal of an output winding 356 of the magnetic amplifier 352 is connected to one terminal of the secondary winding 402 of the transformer 396, and has the upper terminal thereof connected to the anode of a diode 360. The bias winding of the magnetic amplifier 352 is denoted by the numeral 362, one of the control windings of that magnetic amplifier is denoted by the numeral 364, a second of those control windings is denoted by the numeral 366, and the third of those control windings is denoted by the numeral 368.

The numeral 370 generally denotes a magnetic amplifier which is similar to the magnetic amplifier 352. An output winding 372 of the magnetic amplifier 370 has the lower terminal thereof connected to one terminal of a secondary winding 438 of a transformer 434, and has the upper terminal thereof connected to the anode of a diode 376. The lower terminal of output winding 374 of the magnetic amplifier 370 is connected to one terminal of a secondary winding 440 of the transformer 434, and the upper terminal of that output winding is connected to the anode of a diode 378. The bias winding of the magnetic amplifier 370 is denoted by the numeral 380, and the three control windings of that magnetic amplifier are denoted by the numerals 382, 384 and 386.

The upper terminals of the bias windings 362 and 380, respectively, of the magnetic amplifiers 352 and 370 are connected to the lower and upper terminals of a potentiometer 390; and the lower terminals of those bias windings are connected together by a junction 392. The movable contact of the potentiometer 390 is connected to the conductor 106 by an adjustable resistor 388; and the junction 392 is connected to the conductor 116 by a resistor 394. Adjustment of the movable contact of the adjustable resistor 388 will determine the total amount of current flowing through the bias windings 362 and 380, and adjustment of the movable contact of the potentiometer 390 will adjust the value of the current flowing through each of those bias windings.

The bias windings 362 and 380 of the magnetic amplifiers 352 and 370 are connected in parallel with each other. Further, those bias windings are connected so currents passing through them will provide negative effects and will hold the outputs of the magnetic amplifiers 352 and 370 down. The adjustable contact of the adjustable resistor 388 will be set so the magnetic amplifiers 352 and 370 will provide zero output until signals are applied to the control windings thereof.

The control windings 364 and 382 of the magnetic amplifiers 352 and 370 are connected in series; but those windings are so connected that when current flows through the control winding 364 it will provide an effect upon the output of the magnetic amplifier 352 which is opposite to the effect which will be provided upon the output of the magnetic amplifier 370 when that current flows through the control winding 382. Specifically, if current flows through the control winding 364 in a direction which will enable that winding to provide a negative effect on the output of the magnetic amplifier 352, that current will cause the control winding 382 to provide a positive effect on the output of the magnetic amplifier 370. Conversely, if current flows through the control winding 364 in a direction which will enable that winding to provide a positive effect on the output of the magnetic amplifier 352, that current will cause the control winding 382 to provide a negative effect on the output of the magnetic amplifier 370.

The control windings 366 and 384 of the magnetic amplifiers 352 and 370 are connected in series; but those windings are so connected that when current flows through the control winding 366 it will provide an effect upon the output of the magnetic amplifier 352 which is opposite to the effect which will be provided upon the output of the magnetic amplifier 370 when that current flows through the control winding 384. Specifically, if current flows through the control winding 366 in a direction which will enable that winding to provide a negative effect on the output of the magnetic amplifier 352, that current will cause the control winding 384 to provide a positive effect on the output of the magnetic amplifier 370. Conversely, if current flows through the control winding 366 in a direction which will enable that winding to provide a positive effect on the output of the magnetic amplifier 352, that current will cause the control winding 384 to provide a negative effect on the output of the magnetic amplifier 370.

The control winding 368 of the magnetic amplifier 352 is not used; and it could be deleted. However, the control winding 386 of the magnetic amplifier 370 is used; and that winding is wound so current flowing through it will provide a negative effect on the output of the magnetic amplifier 370.

The transformer 396 has a primary winding 398; and the terminals of that winding are connected to the secondary winding 90 of the transformer 76 by conductors 96 and 98. As a result, approximately one hundred and twenty volts will be applied to the primary winding 398. The secondary windings 400 and 402 of the transformer 396 are wound so each of them will develop approximately eighteen volts. A junction 426, a resistor 428, and a junction 404 connect the cathode of the diode 358 to the right-hand terminal of the secondary winding 400. A junction 430, a resistor 432, and a junction 416 connect the cathode of the diode 360 to the left-hand terminal of the secondary winding 402. The junction 404 is connected to the cathode of a controlled rectifier 422, preferably a silicon controlled rectifier, by a junction 406. The junction 426 is directly connected to the gate of that controlled rectifier. The junction 416 is connected to the cathode of a controlled rectifier 424, preferably a silicon controlled rectifier, by junctions 418 and 420. The junction 430 is directly connected to the gate of that controlled rectifier. The cathode of the controlled rectifier 422 is connected to the secondary winding 92 of the transformer 76 by junctions 406, 408 and 410 and by conductor 100; and the anode of the controlled rectifier 424 is connected to that secondary winding by the junctions 408 and 410 and by the conductor 100. The anode of the controlled rectifier 422 is connected to one of the input terminals of a full wave, bridge rectifier 414 by junctions 418 and 420; and the cathode of the controlled rectifier 424 is connected to that input terminal by the junction 420. The other input terminal of the full wave, bridge rectifier 414 is connected to the other terminal of the secondary winding 92 of the transformer 76 by a junction 412 and by the conductor 102.

The transformer 434 has a primary winding 436; and the terminals of that winding are connected to the secondary winding 90 of the transformer 76 by conductors 96 and 98. As a result, approximately one hundred and twenty volts will be applied to the primary winding 436. The secondary windings 438 and 440 of the transformer 434 are wound so each of them will develop approximately eighteen volts. A junction 442, a resistor 458, and a junction 456 connect the right-hand terminal of the secondary winding 438 of transformer 434 to the cathode of diode 376. A junction 450, a resistor 462, and a junction 460 connect the left-hand terminal of the secondary winding 440 of transformer 434 to the cathode of diode 378. A junction 444 connects the junction 442 to the cathode of a controlled rectifier 464, preferably a silicon controlled rectifier; and the junction 456 is directly connected to the gate of that controlled rectifier. Junctions 452 and 454 connect the junction 450 to the cathode of a controlled rectifier 466, preferably a silicon controlled rectifier; and the junction 460 is directly connected to the gate of that controlled rectifier. The cathode of the controlled rectifier 464 is connected to the secondary winding 92 of the transformer 76 by junctions 444, 446 and 410 and by conductor 100; and the anode of the controlled rectifier 466 is connected to that secondary winding by the junctions 446 and 410 and by conductor 100. The anode of the controlled rectifier 464 is connected to one of the input terminals of a full wave, bridge rectifier 448 by the junctions 452 and 454; and the cathode of the controlled rectifier 466 is connected to that input terminal by the junction 454. The other input terminal of the full wave, bridge rectifier 448 is connected to the other terminal of the secondary winding 92 of transformer 76 by junction 412 and by conductor 102.

The controlled rectifiers 422 and 424, the transformer 396, and the magnetic amplifier 352 to coact to constitute a preamplifier and an amplifier. The magnetic amplifier 352 provides the preamplification, and the controlled rectifiers 422 and 424 provide the further amplification. Similarly, the magnetic amplifier 370, the transformer 434, and the controlled rectifiers 464 and 466 coact to constitute a preamplifier and an amplifier. The magnetic amplifier 370 provides the preamplification, and the controlled rectifiers 464 and 466 provide the further amplification.

Specifically, the transformer 396 can, during one half cycle of the alternating current applied to the primary winding 398 thereof, cause current to flow through the secondary winding 400 thereof, through the output winding 354 of magnetic amplifier 352, through the diode 358, and then through the resistor 428. On the next half cycle of that alternating current, that transformer will cause current to flow through the secondary winding 402, through the output winding 356 of magnetic amplifier 352, through the diode 360, and then through the resistor 432. In flowing through the resistors 428 and 432, the current will develop voltage drops across those resistors which will be applied to the gates and cathodes of the controlled rectifiers 422 and 424. Until the magnetic amplifier 352 "fires," the voltage drops across the resistors 428 and 432 will not be great enough to cause the controlled rectifiers 422 and 424 to become conductive. However, when the magnetic amplifier 352 does "fire," the voltage drops across the resistors 428 and 432 will be great enough to cause the controlled rectifiers 422 and 424 to become conductive; and, thereupon, current will flow from conductor 100 via junctions 410 and 408, controlled rectifier 424, junction 420, the lower right-hand diode of full wave bridge rectifier 414, conductor 465, resistor 468, control windings 238 of the left-hand section of magnetic amplifier 218, control windings 256 of the middle section of that magnetic amplifier, control windings 274 of the right-hand section of that magnetic amplifier, control windings 302 of the left-hand section of magnetic amplifier 284, control windings 322 of the middle section of that magnetic amplifier, control windings 342 of the right-hand section of that magnetic amplifier, conductor 469, the upper left-hand diode of that full wave bridge rectifier, and junction 412 to conductor 102 during one half cycle of the alternating current provided by the secondary winding 92 of transformer 76. On the next half cycle of that alternating current, current will flow from conductor 102 via junction 412, the upper right-hand diode of full wave bridge rectifier 414, conductor 465, resistor 468, control windings 238, 256 and 274 of magnetic amplifier 218, control windings 302, 322 and 342 of magnetic amplifier 284, conductor 469, the lower left-hand diode of that full wave bridge rectifier, junctions 420 and 418, controlled rectifier 422, and junctions 406, 408 and 410 to conductor 100.

The value of current which is needed to "fire" the magnetic amplifier 352 is quite small, but the value of the current that can be passed through the output windings 354 and 356 of that magnetic amplifier is large. As a result, the magnetic amplifier 352 can provide a substantial preamplification. The controlled rectifiers 422 and 424 can respond to relatively small voltages across the resistors 428 and 432 to pass substantial quantities of current; and hence those controlled rectifiers can provide substantial further amplification.

The operation of the magnetic amplifier 370 is similar to that of the magnetic amplifier 352, the operation of the transformer 434 is similar to that of the transformer 396, and the operation of the controlled rectifiers 464 and 466 is similar to that of the controlled rectifiers 422 and 424. As a result, the magnetic amplifier 370 can provide a substantial preamplification; and the controlled rectifiers 464 and 466 can provide substantial further amplification.

A conductor 475 and a resistor 470 connect the positive terminal of the full wave, bridge rectifier 448 to the upper terminal of the left-hand control winding 240 of the left-hand section of the magnetic amplifier 218. A conductor 471 connects the negative terminal of that full wave, bridge rectifier to the lower terminal of the right-hand control winding 344 of the right-hand section of the magnetic amplifier 284. As a result, the control windings 240, 258 and 276 of magnetic amplifier 218 and the control windings 304, 324 and 344 of magnetic amplifier 284 are connected in series across the output of the full wave, bridge rectifier 448; and that full wave bridge rectifier will cause direct current to flow through those control windings whenever the controlled rectifiers 464 and 466 become conductive. However, as pointed out hereinbefore, the control windings 240, 258 and 276 are wound to provide a negative effect and will, therefore, hold the output of the magnetic amplifier 218 down, whereas the control windings 304, 324 and 344 are wound to provide a positive effect and will, therefore, drive the output of magnetic amplifier 284 up.

The numeral 472 in FIG. 1 denotes a transformer which has a primary winding 474 and a center-tapped secondary winding 476. The end terminals of the center-tapped secondary winding 476 are connected to two opposed terminals of a ring 478 which has a serially-connected resistor and diode in each of the four legs thereof. The numeral 480 denotes a transformer which has a primary winding 482 and a center-tapped secondary winding 484. The end terminals of the center-tapped winding 484 are connected to the remaining two terminals of the ring 478. The transformers 472 and 480 coact with the ring 478 to constitute a magnetic demodulator, and the nature and operation of such a demodulator are explained in detail in Bulletin 1815-1 of Vickers Incorporated Electric Products Division. The magnetic demodulator which is constituted by the ring 478 and the transformers 472 and 480 is desirable because it can convert a reversible phase A.C. signal to a reversible polarity D.C. signal with a minimum of power loss.

The center-tap of the center-tapped secondary winding 476 of the transformer 472 is connected to the lower terminal of the control winding 364 of the magnetic amplifier 352 by a conductor 486, an adjustable resistor 488, and an inductor 490. The center-tap of the center-tapped secondary winding 484 of the transformer 480 is connected to the movable contact of the contacts 212 by back-to-back diodes 491 and a conductor 492. The lower terminal of the control winding 382 of the magnetic amplifier 370 is connected to the upper fixed contact of the contacts 212 by a junction 494 and a conductor 495; and it is connected to the lower fixed contact of those contacts by the junction 494, a diode 496, and a conductor 497.

The primary winding 474 of the transformer 472 is connected to the secondary winding 90 of the transformer 76 by junctions 500 and 498 and conductor 98, and by junctions 504 and 502 and conductor 96. An indicator lamp 506 is connected between the junctions 498 and 502; and that lamp will indicate whenever power is being supplied to the primary winding 474.

The numeral 508 in FIG. 1 generally denotes a synchro transmitter of standard and usual form; and the winding of the rotor of that synchro transmitter has the terminals thereof connected to the junctions 500 and 504. As a result, the winding of the rotor of the synchro transmitter 508 will have one hundred and twenty volts A.C. impressed upon it whenever the relay contacts 28, 30 and 32 are closed. An indicator lamp 510 is connected in parallel with that rotor winding; and that lamp will indicate when power is being supplied to that winding.

The handle 154 in FIG. 4 is connected to the rotor of the synchro transmitter 508 by a shaft 513; and that handle can rotate that rotor about ninety degrees in either direction from its normal, neutral position. The shaft 513 also supports a cam 514 in FIG. 1, a cam 516 in FIG. 5, and a cam 518 in FIG. 6. The cam 514 is associated with the switch 46 in FIG. 1; and it permits that switch to be closed only when the handle 154 is in its neutral position. Whenever the handle 154 is in its lowering position or is in its hoisting position, the switch 46 will be open; and this is desirable because it prevents starting of the control system of the present invention at a time when the handle 154 is calling for a lowering or a hoisting movement of the winch. While the synchro transmitter 508, the signal lamp 510, and the cam 514 are shown in FIG. 1, that synchro transmitter, lamp, and cam will be disposed within the water-tight housing 153 in FIG. 4. Similarly, while the cam 516 and contacts 638 controlled thereby are shown in FIG. 5, that cam and those contacts will be disposed within the housing 153. Also, while the cam 518 and contacts 590 controlled thereby are shown in FIG. 6, that cam and those contacts will be disposed within the housing 153.

The stator windings of the synchro transmitter 508 are Y-connected; but one of those windings is not used. The outer terminals of the other two stator windings of that synchro transmitter are connected to the terminals of the primary winding 482 of the transformer 480. The rotor of the synchro transmitter 508 is mounted on the shaft 513 in such a way that the said other two stator windings provide zero A.C. output whenever the handle 154 is in its neutral position.

Figure 6:
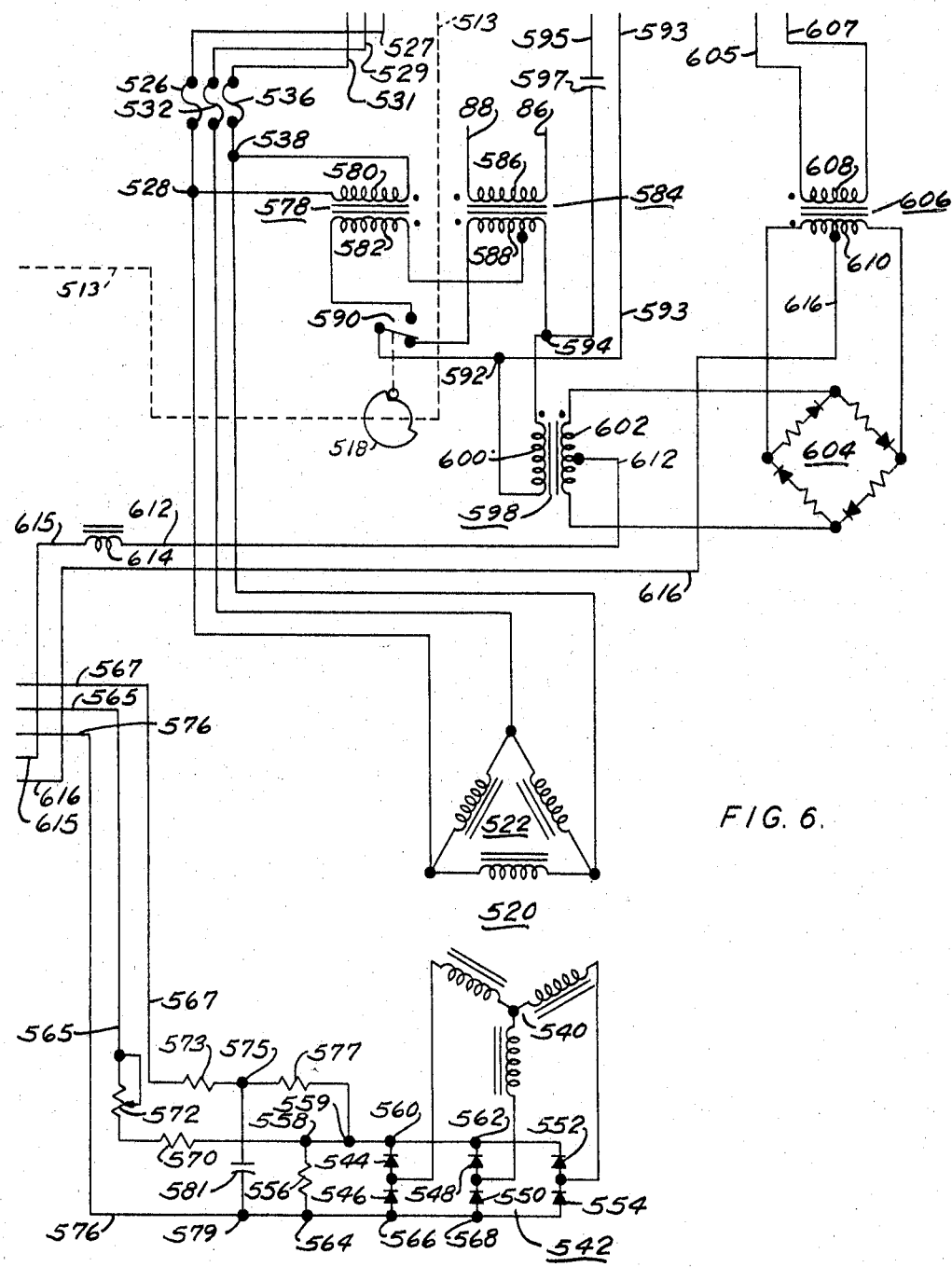

Referring to FIG. 6, the numeral 520 generally denotes a three phase transformer which has a primary winding 522 and has a secondary winding 540. The primary winding 522 happens to be shown as being delta-connected and the secondary winding 540 happens to be shown as being Y-connected; but either winding could be delta-connected and either winding could be Y-connected. One terminal of the primary winding 522 is connected to the conductor 224 in FIG. 4 by a junction 528, a fuse 526, a conductor 527, and a junction 524. A second terminal of the primary winding 522 is connected to the conductor 245 in FIG. 4 by a fuse 532, a conductor 529, and a junction 530; and the remaining terminal of the primary winding 522 is connected to the conductor 263 in FIG. 4 by a junction 538, a fuse 536, a conductor 531, and a junction 534.

The three terminals of the secondary winding 540 of the transformer 520 are connected to the input terminals of a full wave rectifier 542 which includes diodes 544, 546, 548, 550, 552, and 554. Specifically, one of the terminals of the secondary winding 540 is connected intermediate the anode and cathode of the diodes 544 and 546, a second terminal of that secondary winding is connected intermediate the anode and cathode of the diodes 548 and 550, and the remaining terminal of that winding is connected intermediate the anode and cathode of the diodes 552 and 554. A resistor 556 has the upper terminal thereof connected to the cathodes of the diodes 544, 548 and 552 by junctions 558, 559, 560 and 562; and that resistor has the lower terminal thereof connected to the anodes of the diodes 546, 550 and 554 by junctions 564, 566 and 568. As a result, that resistor is connected across the output of the full wave rectifier 542, and will develop a voltage across it which is proportional to the current flowing through that full wave rectifier. The amount of current flowing through the full wave rectifier 542 will be proportional to the voltages applied to the primary winding 522 of the transformer 520, and will thus be proportional to the voltages applied to the stator windings 142 of the motor 138.

A resistor 570, an adjustable resistor 572, and a conductor 565 connect the junction 558 with the lower fixed contact 206 in FIG. 5. The movable contact 206 is connected to the lower terminal of the control winding 386 of the magnetic amplifier 370 by a conductor 574. The upper contact 206 is connected to the junction 559 by a conductor 567, a resistor 573, a junction 575, and a resistor 577. The junction 564 is connected to the upper terminal of the control winding 386 of the magnetic amplifier 352 by a junction 579 and a conductor 576. As a result, the voltage across the resistor 556 can be applied to the control winding 386 of the magnetic amplifier 370, and can cause current to flow through that control winding, when the movable contact 206 is in either of its positions. A capacitor 581 is connected between the junctions 575 and 579.

Referring to FIG. 6, the numeral 578 denotes a transformer which has a primary winding 580; and the left-hand terminal of that winding is connected to the junction 528 while the right-hand terminal of that winding is connected to the junction 538. The transformer 578 has a secondary winding 582. The numeral 584 denotes a transformer which has a primary winding 586 and a tapped secondary winding 588. The terminals of the primary winding 586 are connected to the conductors 24 and 20 by conductor 88, junction 80, fuse 82 and junction 84 and by conductor 86, junction 75, fuse 74 and junction 72.

The tap of the secondary winding 588 of the transformer 584 is connected to the right-hand terminal of the secondary winding 582 of the transformer 578; and the left-hand terminal of the secondary winding 588 is connected to the lower fixed contact of the single pole, double throw switch 590 controlled by the cam 518. The upper fixed contact of that switch is connected to the left-hand terminal of the secondary winding 582 of the transformer 578.

A junction 592 and a conductor 593 connect the movable contact of the switch 590 with one terminal of the input winding of a servo motor 596 which is being used as a tachometer. The right-hand terminal of the secondary winding 588 of transformer 584 is connected to the other terminal of that servo motor winding by a junction 594, a capacitor 597, and a conductor 595. The movable contact of the switch 590 also is connected by the junction 592 to the lower terminal of the primary winding 600 of a transformer 598. The upper terminal of that primary winding is connected, by the junction 594, to the right-hand terminal of the secondary winding 588 of the transformer 584. The transformer 598 has a center-tapped secondary winding 602; and the end terminals of that winding are connected to two opposed terminals of a ring 604 which has a serially-connected resistor and diode in each of the four legs thereof. The numeral 606 denotes a transformer which has a primary winding 608 and which has a center-tapped, secondary winding 610. The end terminals of the center-tapped secondary winding 610 are connected to the other two terminals of the ring 604. The transformer 598, the transformer 606, and the ring 604 constitute a magnetic demodulator which is similar to the magnetic demodulator constituted by the ring 478 and the transformers 472 and 480 in FIG. 1. The terminals of the primary winding 608 of the transformer 606 are connected to the output winding of the servo motor 596 by conductors 605 and 607. The rotor of that servo motor will be connected to the rotor of the motor 138, as indicated by the dotted line 611 in FIG. 4; and the said output winding of that servo motor will develop a voltage which will be applied to the primary winding 608 of the transformer 606. That voltage will be of one phase when the motor 138 is driving the winch in the hoisting direction and will be of the opposite phase when that motor is driving that winch in the lowering direction.

A conductor 612, an inductor 614, and a conductor 615 connect the center-tap of the secondary winding 602 of the transformer 598 with the movable contact 208; and a conductor 616 directly connects the center-tap of the secondary winding 610 of the transformer 606 with the movable contact 210. The upper fixed contact 208 is connected to the upper terminals of potentiometers 620 and 622 by a junction 618. The upper fixed contact 210 is connected to the lower terminals of the potentiometers 620 and 622 by junctions 624 and 626 and resistors 623 and 625. As a result, whenever the movable contacts 208 and 210 are in their upper positions, the parallel-connected potentiometers 620 and 622 will be connected to the center-taps of the secondary windings 602 and 610, respectively, of the transformers 598 and 606.

The movable contact of the potentiometer 622 is connected to the upper contact of the contacts 638 by a resistor 630; and the movable contact of the potentiometer 620 is connected to the lower contact of the contacts 638 by a resistor 636. The movable contact of the contacts 638 is directly connected to the upper contact of the contacts 214; and the movable contact of the latter contacts is connected to the lower terminal of the control winding 384 of the magnetic amplifier 370 by a conductor 645. A junction 658 and a conductor 651 connect the junctions 624 and 626 with the lower terminal of the control winding 366 of the magnetic amplifier 352. As a result, whenever the movable contact 214 is in its upper position, any voltage developed across the lower part of the potentiometer 620 and across the resistor 623, or any voltage developed across the lower part of the potentiometer 622 and across the resistor 625, will be applied to the serially-connected control windings 366 and 384 of the magnetic amplifiers 352 and 370; and such voltage can cause current to flow through those control windings.

The numeral 640 in FIG. 5 denotes a potentiometer which has the left-hand terminal thereof connected to the lower contact 210 by a junction 644 and 629. The right-hand terminal of that potentiometer is connected to the lower contact 208 by a resistor 642 and a junction 641. A resistor 656 has the lower terminal thereof connected to the left-hand terminal of the potentiometer 640 by junctions 654, 635 and 644; and the upper end of that resistor is connected to the movable contact of that potentiometer by junctions 652, 639 and 650, three parallel-connected capacitors 648, and a junction 646. If desired, one large capacitor could be used instead of the three parallel-connected capacitor 648; but those parallel-connected capacitor are economical and are very satisfactory. The upper terminal of the resistor 656 is connected to the lower terminal of the control winding 366 of the magnetic amplifier 352 by the junction 652 and 658 and by the conductor 651. The lower terminal of that resistor is connectable to the lower terminal of the control winding 384 of the magnetic amplifier 370 by junction 654, the lower and removable contacts 214, and the conductor 645. As a result, whenever the movable contact 214 is in its lower position, any voltage across the resistor 656 will be applied to the serially-connected control windings 366 and 384 of the magnetic amplifiers 352 and 370; and such voltage can cause current to flow through those control windings.

A resistor 628 has the upper terminal thereof connected to the junction 641; and the lower terminal of that resistor is connected to the lower terminal of a potentiometer 634 by a junction 631. The upper terminal of that potentiometer is connected to the terminal 635; and the movable contact of that potentiometer is connected to the junction 639 by a resistor 637. Back-to-back diodes 632 are connected intermediate junctions 629 and 631; and those back-to-back diodes are connected in parallel with the potentiometer 634. Those back-to-back diodes will limit the value of the voltage across that potentiometer to a value of about one-half of a volt, regardless of the polarity of that voltage.

The back-to-back diodes 491 in FIG. 1 materially limit the amount of current that can flow through the control windings 364 and 382 of the magnetic amplifiers 352 and 370 until the voltage across those diodes reaches and exceeds about one-half of a volt in one direction or the other. This arrangement is desirable; because it provides a "dead" area on each side of the point where the combination of the synchro transmitter 508 and the magnetic demodulator, which includes ring 478 and transformers 472 and 480, reverses the polarity of the signals which it supplies to the control windings 364 and 382. As a result, the handle 154 can be moved a few degrees in either direction from its neutral position without causing a hoisting signal or a lowering signal to be supplied to the control windings of the magnetic amplifiers 352 and 370. This is desirable because it keeps the setting of that handle from being critical.

The cams 514, 516 and 518 and the movable contacts 46, 638 and 590 are shown in the positions which they occupy whenever the handle 154 is in its neutral position. When that handle is shifted to its lowering position, the cams 514, 516 and 518 will rotate in the counter clockwise direction; and, thereupon, the movable contact 46 will move to open position but the movable contacts 638 and 590 will be unaffected—remaining in their lower positions. However, whenever the handle 154 is shifted to its hoisting position, the cams 514, 516 and 518 will rotate in the clockwise direction; and, thereupon, the movable contact 46 will again move to open position and the movable contacts 638 and 590 will shift into their upper positions.

VOLTAGE FEEDBACK

The transformer 520 in FIG. 6 has the primary winding 522 thereof connected to the conductors 224, 245 and 263 which supply power to the stator windings 142 of the motor 138; and that transformer has the secondary winding 540 thereof connected to the full wave rectifier 542. The resistor 556 is connected to the output of that rectifier; and current from that rectifier will develop a voltage drop across that resistor. As the voltage applied to the stator windings 142 of the motor 138 changes, the voltage applied to the primary winding 522 will change; and the transformer 520 will respond to that change in voltage to change the voltage drop across the resistor 556. This means that as the voltage supplied to the stator windings 142 changes, the voltage across the resistor 556 also will change.

Whenever the movable contact 206 in FIG. 5 is in its upper position—as will be the case when the winch is hoisting cargo—the voltage across resistor 556 will be applied to control winding 386 of magnetic amplifier 370; and current will flow from the upper terminal of resistor 556 through resistors 577 and 573 and control winding 386 and then to the lower terminal of resistor 556. That current will have a negative effect and will tend to drive the output of magnetic amplifier 370 down. This means that if the voltage applied to the stator windings 142 tends to increase, the voltage across resistor 556 will tend to increase, and the value of the current flowing through the control winding 386 will tend to increase; and, thereupon, the output of magnetic amplifier 370 will tend to decrease.

The capacitor 581 will coact with the resistor 577 to constitute an RC network; and that network will retard the rate at which the current flowing through the control winding 386 will be able to increase. That retardation is desirable because it will help stabilize the controlling of the motor 138 when that motor is being used to hoist cargo at low speeds. If the voltage applied to the stator windings 142 tends to decrease, the voltage across the resistor 556 will tend to decrease, and the value of the current flowing through the control winding 386 will tend to decrease; and, thereupon, the output of the magnetic amplifier 370 will tend to increase.

Whenever the movable contact 206 in FIGURE 5 is in its lower position—as will be the case when the motor 138 is applying a constant tension to the cable—current will flow from the upper terminal of resistor 556 through resistor 570 and adjustable resistor 572 and control winding 386 and then to the lower terminal of resistor 556. That current will have a negative effect and will tend to drive the output of magnetic amplifier 370 down. If the voltage applied to the stator windings 142 tends to increase, the voltage across resistor 556 will tend to increase, and the value of the current flowing through control winding 386 will tend to increase; and, thereupon, the output of magnetic amplifier 370 will tend to decrease. If the voltage applied to the stator windings 142 tends to decrease, the voltage across resistor 556 will tend to decrease, and the value of the current flowing through control winding 386 will tend to decrease; and, thereupon, the output of magnetic amplifier 370 will tend to increase.

The sum of the resistances of resistors 573 and 577 is many times larger than the sum of the resistance of resistor 570 and of the effective resistance of adjustable resistor 572. As a result, with a given voltage across resistor 556, much more current will flow through control winding 386 of magnetic amplifier 370 when movable contact 206 is in its lower position than will flow through that control winding when that movable contact is in its upper position. This is important; because enough voltage feedback must be provided when the motor 138 is used to maintain a constant tension on the cable, to keep the steady-state voltage applied to the stator windings 142 substantially constant.

It will be noted that the control winding 368 of the magnetic amplifier 352 is not connected to the resistor 556. As a result, the voltage feedback provided by the transformer 520 is not applied to the magnetic amplifier 352. However, since that magnetic amplifier is active only when the motor 138 is being used to lower cargo, that magnetic amplifier does not need the voltage which is fed back by the transformer 520.

SPEED FEEDBACK

The transformer 584 in FIGURE 6 will, whenever the movable contact 590 is in its lower position—as will be the case when cargo is being lowered—supply a predetermined, substantially fixed, A.C. voltage to the input winding of the servo 596 and to the primary winding 600 of the transformer 598. Because the capacitor 597 is connected intermediate the junction 594 and the input winding of that servo motor, the voltage supplied to that input winding will be shifted about ninety degrees out of phase with the voltage supplied to that primary winding. The output winding of the servo motor 596 will supply a voltage to the primary winding 608 of the transformer 606; and that voltage will be shifted about ninety degrees out of phase with the voltage supplied to the input winding of the servo motor 596. As a result, the voltage which is supplied to the primary winding 608 of the transformer 606 will be substantially in phase with the voltage supplied to the primary winding 600 of the transformer 598. The instantaneous voltage across the output winding of the servo motor 596 will be equal to the instantaneous voltage across the input winding of that servo motor multiplied by the speed of the rotor of that servo motor and then multiplied by a constant; and hence the value of the instantaneous voltage across that output winding will be a function of the speed of the rotor of the servo motor 596, and hence of the speed of the rotor of the motor 138. Further, the polarity of that instantaneous voltage will be a function of the direction of rotation of those rotors.

The magnetic demodulator, which includes the transformers 598 and 606 and the ring 604, will respond to the substantially fixed, A.C. voltage supplied by the transformer 584 and to the variable value, reversible phase, A.C. voltage supplied by the servo motor 596 to provide a variable value, reversible polarity, D.C. voltage. When the movable contacts 208, 210 and 214 are in their upper positions and the movable contact 638 is in its lower position, as will be the case whenever the motor 138 is being used to lower cargo, the variable value, reversible polarity, D.C. voltage provided by the magnetic demodulator of FIGURE 6 will be applied to serially-connected potentiometer 620 and resistor 623 and also to serially-connected potentiometer 622 and resistor 625. Further the junctions 624 and 626 will be positive relative to the junction 618. The resulting voltage drop between the junction 626 and the movable contact of the potentiometer 622 will not be significant at this time because the movable contact 638 is in its lower position. However, the voltage drop between the junction 624 and the movable contact of the potentiometer 620 will cause current to flow through the control windings 366 and 384 of the magnetic amplifiers 352 and 370. As that current flows through the control winding 366 it will provide a negative effect and will tend to drive the output of the magnetic amplifier 352 down; and that negative effect will help stabilize the speed at which the motor 138 will lower the cargo. Specifically, if the speed of the rotor of the motor 138, and hence of the servo motor 596, tends to increase, the value of the current flowing through the control winding 366 will tend to increase and will tend to reduce the output of the magnetic amplifier 352. Conversely, if the speed of the rotor of the motor 138, and hence of the servo motor 596, tends to decrease, the value of the current flowing through the control winding 366 will tend to decrease and will tend to increase the output of the magnetic amplifier 352.

As the current flows through the control winding 384 it will provide a positive effect. However, when the motor 138 is being used to lower cargo, the magnetic amplifier 370 will be biased "off" to such an extent that the positive effect of the current flowing through the control winding 384 will be unable to "fire" that magnetic amplifier unless and until the cargo tends to overhaul the winch. If and when the cargo tends to overhaul the winch, the resulting higher speed of the rotor of the motor 138, and hence of the rotor of the servo motor 596, will increase the value of the current flowing through the control windings 366 and 384. The increased value of the current flowing through the control winding 366 will keep the magnetic amplifier 352 from "firing" and hence the control system will stop supplying lowering voltage to the stator windings 142 of the motor 138. The increased value of the current flowing through the control winding 384 will cause the magnetic amplifier 370 to "fire"; and, thereupon, the control system will apply hoisting voltage to the stator windings 142 of the motor 138. This is an important and desirable result because it will enable the control system to apply a hoisting voltage to the motor 138 and thereby keep the cargo from overhauling the winch.

When the movable contacts 208, 210 and 214 are in their upper positions and the movable contact 638 is in its upper position, as will be the case when the motor 138 is being used to hoist cargo, the movable contact 590 in FIGURE 6 will be in its upper position. At such time, the transformers 578 and 584 will coact to supply voltage to the input winding of the servo motor 596 and to the primary winding 600 of the transformer 598. Specifically, the moveable contact 590 will, whenever it is in its upper position, connect the secondary winding 582 of the transformer 578 in series with the right-hand section of the secondary winding 588 of the transformer 584; and the voltages of the secondary winding 582 and of the right-hand section of the secondary winding 588 will add together and will be applied to the input winding of the servo motor 596 and to the primary winding 600.

The overall secondary winding 588 will develop a voltage of one hundred and twenty volts, and the right-hand section of that winding will develop a voltage of forty volts. The secondary winding 582 will, whenever three hundred and fifty-two volts are applied to the primary winding 580, develop a voltage of eighty volts. This means that when the movable contact 590 is in its lower position, a substantially fixed voltage of one hundred and twenty volts will be applied to the input winding of the servo motor 596 and to the primary winding 600 of transformer 598. Also, it means that when the movable contact 590 is in its upper position, the input winding of the servo motor 596 and the primary winding 600 will be subjected to a voltage which is about one hundred and twenty volts and which is, in part, a function of the voltage applied to the stator windings 142 of the motor 138. Changes in the voltage applied to the input winding of the servo motor 596 will vary the gain of that servo motor, and thus will cause that servo motor to provide voltage-modified speed-responsive negative feedback.

As pointed out hereinbefore, the instantaneous voltage across the output winding of the servo motor 596 will be equal to the instantaneous voltage across the input winding of that servo motor multiplied by the speed of the rotor of that servo motor and then multiplied by a constant; and hence the value of the instantaneous voltage across that output winding will be a function of the instantaneous voltage across that input winding. Since the transformer 572 makes the instantaneous voltage across the input winding of the servo motor 596 a function of the voltage applied to the stator windings 142 of the motor 138, the instantaneous voltage across the output winding of that servo motor will be a function of the voltage applied to the stator windings 142 of the motor 138. This means that the voltage applied to the primary winding 600 of the transformer 598 will be a function of the voltage applied to the stator windings 142 of the motor 138, and that the voltage applied to the primary winding 608 of the transformer 606 will be a function of the voltage applied to the stator windings 142 of the motor 138 as well as being a function of the speed of the rotor of that motor.

The magnetic demodulator of FIG. 6 will respond to the voltages applied to the primary windings 600 and 608 of the transformers 598 and 606 thereof to provide a variable value, D.C. voltage and to apply that voltage to serially-connected potentiometer 620 and resistor 623 and also to serially-connected potentiometer 622 and resistor 625. Further, the junction 618 will be positive relative to the junctions 624 and 626 because the rotor of the motor 138, and hence the rotor of the servo motor 596, will be rotating in the opposite direction. The resulting voltage drop between the movable contact of the potentiometer 620 and the junction 624 will not be significant at this time because the movable contact 638 is in its upper position. However, the voltage drop between the movable contact of the potentiometer 622 and the junction 626 will cause current to flow through the control windings 384 and 366 of the magnetic amplifiers 370 and 352. At this time, current will flow in a direction which is opposite to the direction in which it flowed through those control windings when the rotor of the motor 138, and hence the rotor of the servo motor 596, was rotating in the cargo-lowering direction. As that current flows through the control winding 384 it will provide a negative effect and will tend to drive the output of the magnetic amplifier 370 down; and that negative effect will help stabilize the speed at which the motor 138 will hoist the cargo. Specifically, if the speed of the rotor of the motor 138, and hence of the servo motor 596, tends to increase, the value of the curernt flowing through the control winding 384 will tend to increase and will tend to reduce the output of the magnetic amplifier 370. Conversely, if the speed of the rotor of the motor 138, and hence of the servo motor 596, tends to decrease, the value of the current flowing through the control winding 384 will tend to decrease and will tend to increase the output of the magnetic amplifier 370.

As the current flows through the control winding 366 it will provide a positive effect. However, when the motor 138 is being used to hoist cargo, the magnetic amplifier 352 will be biased "off" to such an extent that the positive effect of the current flowing through the control winding 366 will be unable to "fire" that magnetic amplifier.

The secondary winding 582 of transformer 578 can coact with the right-hand portion of the secondary winding 588 of transformer 584 to provide about the same voltage that the overall secondary winding 588 can provide. However, the resistance of the resistor 630 is much less than that of the resistor 636; and hence, more speed-responsive feedback will be supplied to control windings 366 and 384, respectively, of the magnetic amplifiers 352 and 370 when the motor is hoisting cargo at a given speed than when that motor is lowering cargo at that speed. The resistance values of the resistors 630 and 636 will preferably be selected so about the same speed-responsive feedback will be supplied to the control windings 366 and 384 when cargo is being hoisted at a given speed or is being lowered at almost twice that speed.

When the movable contacts 208, 210 and 214 are in their lower positions and the movable contact 590 in FIG. 6 is in its upper position—as will be the case when the winch is used to maintain an approximately constant tension on a cable that is transferring cargo or personnel between vessels at sea—the voltage for the primary winding 600 and for the input winding of the servo motor 596 will be supplied by the secondary winding 582 of transformer 578 and by the right-hand section of the secondary winding 588 of transformer 584. As pointed out hereinbefore, that voltage will, in part, be a function of the voltage applied to the stator windings 142 of the motor 138. Also, as pointed out hereinbefore, the voltage across the output winding of the servo motor 596 will be a function of the voltage applied to the stator windings 142 of the motor 138 and of the speed of the rotor of that motor. This means that the voltage applied to the primary winding 600 of the transformer 598 will, in part, be a function of the voltage applied to the stator windings 142 of the motor 138, and that the voltage applied to the primary winding 608 of the transformer 606 will be a function of the voltage applied to the stator windings 142 of the motor 138 as well as being a function of the speed of the rotor of that motor. However, the large amount of negative voltage feedback that is provided by the transformer 520, whenever the motor 138 is used to maintain an approximately constant tension on the cable, limits the changes in the voltage supplied to the stator windings 142 to such an extent that the speed responsive feedback due to changes in the voltage across the secondary winding 582 of transformer 578 is quite small. In fact, the speed-responsive feedback which is due to changes in the voltage across the secondary winding 582 of transformer 578 can be ignored when the motor 138 is being used to maintain an approximately constant tension on the cable.

The magnetic demodulator of FIG. 6 will respond to the voltages applied to the primary windings 600 and 608 of the transformers 598 and 606 thereof to provide a variable value, D.C. voltage and to apply that voltage to serially-connected resistor 628 and potentiometer 634 and to serially-connected resistor 642 and potentiometer 640. The handle 154 will be in its hoisting position; and hence the stator windings 142 of the motor 138 will be receiving hoisting voltage. If the relative movement of the vessels, or if the winch on the other vessel, causes the winch to pay out cable, the rotors of motor 138 and servo motor 596 will rotate in the lowering direction; and that servo motor will make the voltages at the junctions 635 and 644 positive relative to the voltages at the movable contacts of the potentiometers 634 and 640. On the other hand, if the relative movement of the vessels, or the winch on that other vessel, permits the winch to pull in cable, the rotors of motor 138 and servo motor 596 will rotate in the hoisting direction; and that servo motor will make the voltages at the movable contacts of the potentiometers 634 and 640 positive relative to the voltages at the junctions 635 and 644.

For purposes of illustration, it will be assumed that the winch is pulling in cable at a given speed and that the relative movement of the vessels tends to reduce tension on the cable. The rotor of the motor 138 will respond to any lessening of the tension on the cable to rotate more rapidly in the hoisting direction. The resulting increase in the speed of rotation of the rotor of the motor 138 will cause the rotor of the servo motor 596 to speed up; and, as it does so, the voltage across the output winding of that servo motor will increase. The magnetic demodulator of FIG. 6 will respond to that voltage to provide an increasing voltage between the movable contact of the potentiometer 640 and the junction 644. Thereupon, current will flow from that movable contact via junction 646, the parallel-connected capacitors 648, junctions 650, 639, 652 and 658, conductor 651, control winding 366 of magnetic amplifier 352, control winding 384 of magnetic amplifier 370, conductor 645, the movable and lower contacts 214, and junctions 654 and 635 to the junction 644. Simultaneously, because of the voltage between the movable contact of the potentiometer 634 and the junction 635, current will flow from that movable via resistor 637, junctions 639, 652 and 658, conductor 651, control winding 366 of magnetic amplifier 352, control winding 384 of magnetic amplifier 370, conductor 645, the movable and lower contacts 214, and junction 654 to the junction 635. The resulting flow of current through the control winding 366 of magnetic amplifier 352 will provide a negative effect; but that effect will not be significant because that magnetic amplifier will be biased beyond its "firing" point. However, the flow of that current through the control winding 384 will provide a positive effect and will tend to drive the output of the magnetic amplifier 370 up. The resulting increased output of that magnetic amplifier will cause the control system to increase the value of the voltage supplied to the stator winding 142 of the motor 138 and to the primary winding 580 of the transformer 578. The motor 138 will respond to that increased voltage to speed up its rotor; and the rotor of the servo motor 596 will respond to that increased speed to increase the voltage supplied to the primary winding 608 of the transformer 606. The magnetic demodulator of FIG. 6 will respond to the increased voltage across the primary winding 608 of transformer 606 to additionally increase the voltage between the movable contact of the potentiometer 640 and the junction 644; and that increased voltage will increase the current flowing through the control winding 384. Thereupon a further increase will occur in the output of the magnetic amplifier 370; and that increased output will cause the voltage supplied to the stator windings 142 of the motor 138 and to the primary winding 580 of the transformer 578 to increase still further. This positive feedback will cause the rotor of the motor 138 to accelerate rapidly; and rapid acceleration is desirable because it will enable the winch to pull the cable in so quickly that very little slack can be created in that cable.

As the cable becomes taut, the winch will have to slow down; and, as that winch slows down, the voltage across the output winding of the servo motor 596 will start decreasing. The magnetic demoduulator of FIG. 6 will respond to that decrease in voltage to decrease the voltage between the movable contact of potentiometer 640 and the junction 644. This means that the value of the current flowing through the control winding 384 of magnetic amplifier 370 will decrease, with a consequent decrease in the output of that magnetic amplifier. The output of the magnetic amplifier 284 also will decrease; and hence the voltage supplied to the stator windings 142 of motor 138 will decrease.

The rotor of that motor will respond to that decrease in voltage to slow down; and the servo motor 596 will respond to the consequent slowing down of its rotor to further decrease the voltage across the output winding thereof. That further decrease in voltage will cause the outputs of the magnetic amplifiers 370 and 284 to continue to decrease; and, very quickly, the speed of the winch will decrease to its intended value. At such time, the output winding of the servo motor 596 will be supplying a voltage to the primary winding 608 of the transformer 606; and the magnetic demodulator of FIG. 6 will be developing a voltage between the movable contact of potentiometer 640 and the junction 644. However, that voltage will not, because of resistor 656 and capacitors 648, be able to cause current to flow through the control windings 366 and 384.

As pointed out hereinbefore, the parallel-connected capacitors 648 and the resistor 656 constitute a rate network; and that network will permit the voltage, between the movable contact of the potentiometer 640 and the junction 644, to cause current to flow through the control winding 384 of the magnetic amplifier 370 only if that voltage is changing. This is desirable because it will keep the magnetic demodulator of FIG. 6 from supplying substantial positive feedback to the magnetic amplifier 370 when that feedback is neither needed nor desired.

The left-hand diode 632 in FIG. 5 will limit the voltage across the potentiometer 634 to about one-half of a volt, regardless of the voltage provided by the magnetic demodultaor of FIG. 6; and the movable contact of that potentiometer can be set to select any voltage between the zero and one-half of a volt. As a result, the potentiometer 634 will be able to provide only a limited amount of current flow through the control winding 384. However, the current will flow whenever the rotor of the motor 138 is rotating in the hoisting direction; and it will compensate for the frictional forces of the motor 138, for the frictional forces of the winch, for the frictional forces of the gearing, and for the resistance of the cable to bending.

To further illustrate the operation of the control system, when the motor 138 is being used to maintain an approximately constant tension on the cable, it will be assumed that the winch is pulling in the cable at a given rate and that the relative motion of the vessels tends to increase the tension on that cable. The rotor of the motor 138 will respond to any increase in the tension on the cable to slow down; and the resulting decrease in the speed of rotation of that rotor will cause the rotor of the servo motor 596 to slow down. Thereupon the voltage across the output winding of that servo motor will decrease; and the magnetic demodulator of FIG. 6 will respond to that decreased voltage to cause the magnetic amplifier 370 to decrease its output. The output of the magnetic amplifier 284 will then reduce the voltage supplied to the the stator windings 142 of the motor 138; and this will cause the rotor of the motor 138 to decelerate rapidly. Such rapid deceleration is desirable because it will quickly reduce the tension on the cable.

When the relative motion of the vessels subsequently eases the force on the cable, the rotor of the motor 138 will begin to rotate faster. The resulting increased voltage across the output winding of the servo motor 596 will increase the outputs of the magnetic amplifiers 370 and 284; and, thereupon, the rotor of the motor 138 will rotate still faster. The voltage across the output winding of the servo motor 596 will increase again; and will cause the magnetic amplifiers 370 and 284 to increase the voltage supplied to the stator windings 142. The overall result is that the rotor of the motor 138 will rapidly accelerate and will return to its intended speed of rotation.

To additionally illustrate the operation of the control system, when the motor 138 is being used to maintain an approximately constant tension on the cable, it will be assumed that the winch is pulling in the cable at a given rate and that the relative motion of the vessels forces the winch to pay out cable. As the winch is forced to come to rest and then to start rotating in the opposite direction to pay out cable, the rotor of the motor 138 will stop rotating in the hoisting direction and will start rotating in the lowering direction. The resulting rotation of the rotor of the servo motor 596 in the lowering direction will develop a voltage across the output winding of that servo motor; and the magnetic demodulator of FIG. 6 will respond to that voltage to provide an increasing voltage between the junction 644 and the movable contact of the potentiometer 640. Thereupon, current will flow from that junction via junctions 635 and 654, the lower and movable contact 214, conductor 645, control winding 384 of magnetic amplifier 370, control winding 366 of magnetic amplifier 352, conductor 651, junctions 658, 652, 639 and 650, parallel-connected capacitors 648, and junction 646 to the movable contact of potentiometer 640. Simultaneously, that magnetic demodulator will provide an increasing voltage between the junction 635 and the movable contact of the potentiometer 634. Thereupon, current will flow from that junction via junction 654, the lower and movable contacts 214, conductor 645, control winding 384 of magnetic amplifier 370, control winding 366 of magnetic amplifier 352, conductor 651, junctions 658, 652 and 639, and resistor 637 to the movable contact of potentiometer 634. The resulting flow of current through the control winding 366 of the magentic amplifier 352 will provide a positive effect; but that effect will not be significant because that magnetic amplifier will be biased beyond its "firing" point. However the flow of that current through the control winding 384 will provide a negative effect; and that effect will drive the output of the magentic amplifier 370 down. The resulting decreased output of that magnetic amplifier will cause the voltages supplied to the stator windings 142 of the motor 138 and to the primary winding 580 of the transformer 578 to decrease. That decrease in voltage will reduce the value of the hoisting force which the motor 138 applies to the winch; and a reduction in that force will cause the rotor of the motor 138 to decelerate rapidly. Such rapid deceleration is desirable because it will quickly reduce the tension on the cable.

The right-hand diode 632 in FIG. 5 will limit the voltage across the potentiometer 634 to about one-half of a volt, regardless of the voltage provided by the magnetic demodulator of FIG. 6; and the movable contact of that potentiometer can be set to select any voltage between zero and one-half of a volt. As a result, the potentiometer 634 will provide only a limited current flow through the control winding 384. However, that current will flow whenever the rotor of the motor 138 is rotating in the lowering direction; and it will compensate for the frictional forces of the motor 138, for the frictional forces of the winch, for the frictional forces of the gearing, and for the resistance of the cable to bending.

As the relative motion of the vessels permits the winch to stop paying out cable, the voltage across the output winding of the servo motor 596, and hence the voltage supplied by the magnetic demodulator of FIG. 6, will become zero. At such time, the magnetic amplifier 370 will respond to the setting of the handle 154 in the hoisting position to start the rotor of the motor 138 rotating in the hoisting direction. That rotation will enable the servo motor 596 and the magnetic demodulator of FIG. 6 to supply positive feedback to the control winding 384 of the magnetic amplifier 370; and the control system will respond to that positive feedback to rapidly and progressively accelerate the rotor of the motor 138, until the cable again becomes taut, all as pointed out hereinbefore.

In further illustration of the operation of the control system, when the motor 138 is being used to maintain an approximately constant tension on the cable, it will be assumed that the winch is being forced to pay out cable at a given rate and that the relative motion of the vessels forces that winch to pay out that cable at a more rapid rate. The rotor of the motor 138 will be caused to rotate faster in the lowering direction and will cause the rotor of the servo motor 596 to rotate faster in that direction. Thereupon the voltage across the output winding of that servo motor will increase; and the magnetic demodulator of FIG. 6 will respond to that increased voltage to cause the magnetic amplifier 370 to decrease its output. The output of the magnetic amplifier 284 will then reduce the voltage supplied to the stator windings 142 of the motor 138; and this will cause the rotor of the motor 138 to accelerate rapidly in the lowering direction. Such rapid acceleration is desirable because it will quickly reduce the tension on the cable.

When the relative motion of the vessels subsequently eases the forces which pulled the cable out at a more rapid rate, the rotor of the motor 138 and hence the rotor of the servo motor 596 will rotate less rapidly. The resulting decreased voltage across the output of servo motor 596 will permit the outputs of magnetic amplifiers 370 and 284 to increase; and, thereupon, the rotor of motor 138 will slow down. The output voltage of servo motor 596 will decrease again; and again permit those magnetic amplifiers to increase the voltage supplied to stator windings 142. Consequently, the rotor of motor 138 will rapidly decelerate until it resumes its intended rate of rotation.

To additionally illustrate the operation of the control system, when motor 138 is used to maintain an approximately constant tension on the cable, it will be assumed that the winch is forced to pay out cable at a given rate and that the relative motion of the vessels eases the forces which force that winch to pay out the cable. The rotors of motor 138 and servo motor 596 will respond to the easing of those forces to rotate less rapidly in the lowering direction. Thereupon the output voltage of that servo motor will decrease; and the magnetic demodulator of FIG. 6 will cause magnetic amplifier 370 to increase its output. The output of magnetic amplifier 284 will then increase the voltage supplied to the stator windings 142 of motor 138; and this will cause the rotor of the motor 138 to rapidly decelerate in the lowering direction. Such rapid deceleration is desirable because it will quickly increase the tension on the cable.

To complete the illustration of the operation of the control system, when motor 138 is used to maintain an approximately constant tension on the cable, it will be assumed that the winch is forced to pay out cable at a given rate and that the relative motion of the vessels temporarily nullifies the forces which make that winch pay out cable. The rotor of motor 138 will respond to the hoisting voltage supplied to the stator windings 142 to start rotating in the hoisting direction. Thereupon the voltage across the output winding of servo motor 596 will increase; and the magnetic demodulator of FIG. 6, the magnetic amplifier 370, and the magnetic amplifier 284 will cause the rotor of motor 138 to rapidly and progressively accelerate in the hoisting direction. Such rapid acceleration is desirable because it will quickly increase the tension on the cable.

These various illustrations show that the control system provided by the present invention can respond to changes in the direction or rate of movement of the cable to change the forces which the motor applies to the winch and can thereby cause that motor to continue to apply approximately the same tension to the cable. Further, these illustrations show that motor 138 will, as soon as it can, re-establish the intended rate and direction of movement of that cable; and will do so while maintaining approximately constant tension on that cable.

The inductor 614 in FIG. 6 will provide a filtering action for feedback which the magnetic demodulator of FIG. 6 supplies to the magnetic amplifiers 352 and 370. That filtering action will be provided whether that feedback is positive or negative; and that filtering action will help smooth out that feedback.

ADJUSTMENTS FOR COMPONENTS OF CONTROL SYSTEM

In addition to the adjustment of the movable contacts of potentiometers 158, 160, 184, 186, 196 and 198, a number of other adjustments are made to components of the control system of the present invention. For example, the rotor of synchro transmitter 508 is set so the output voltage of that synchro transmitter will be zero when ever the handle 154 is in its neutral position, and so that output voltage will cause current to flow from the center-tap of center-tapped secondary winding 476 of transformer 472 toward the center-tap of center-tapped secondary winding 484 of transformer 480 whenever that handle is in its hoisting position.

The adjustable resistor 388 in FIG. 2 is set to provide the total amount of current needed by the bias windings 362 and 380 of magnetic amplifiers 352 and 370. The potentiometer 390 will divide that total amount current between those two bias windings. That adjustable resistor and potentiometer will be adjusted to bias both of those magnetic amplifiers beyond their "firing" points. As a result, those magnetic amplifiers will not be able to "fire" until the control windings thereof receive signals which provide positive effects.

The adjustable resistor 488 in FIG. 2 is adjusted to set the desired amount of current flowing through the control windings 364 and 382, respectively, of the magnetic amplifiers 352 and 370. The adjustment of that adjustable resistor is made with particular care, because that adjustment determines the gain of the control system.

The adjustable resistor 278 in FIG. 3 determines the value of the current flowing through the bias windings 236, 254, and 272 of the magnetic amplifier 218. Similarly, the adjustable resistor 346 determines the value of the current flowing through the bias windings 300, 320 and 340 of the magnetic amplifier 284. Those adjustable resistors will be set so enough current will flow through those bias windings to bias those magnetic amplifiers beyond their "firing" points. As a result, those magnetic amplifiers will not be able to "fire" until the control windings thereof receive signals which provide positive effects.

The potentiometers 620 and 622 in FIG. 5 determine the amount of feedback which the magnetic demodulator of FIG. 6 can supply to the control windings 366 and 384 respectively, of the magnetic amplifiers 352 and 370. The movable contacts of those potentiometers are set so the feedback which the magnetic demodulator of FIG. 6 normally supplies to those control windings will not overcome the signal which is applied to the control windings 364 and 382, respectively, of those magnetic amplifiers by the magnetic demodulator of FIG. 1. However, those moveable contacts are set so the current flowing through the control winding 384 of magnetic amplifier 370 will be able to "fire" that magnetic amplifier when and if cargo ever tends to overhaul the winch during the lowering of that cargo.

The movable contact of potentiometer 634 determines the amount of current which that potentiometer will supply to the control windings 366 and 384, respectively, of magnetic amplifiers 352 and 370 whenever the rotor of the motor 138 is rotating and the voltage across the back-to-back diodes 632 exceeds about one-half of a volt. That movable contact is set so that current supplied by that potentiometer will increase the power supplied to the motor 138 during hoisting operations sufficiently to overcome the frictional forces of that motor, the frictional forces of the winch, the frictional forces of the gearing between that motor and winch, and the resistance of the cable to bending. That setting of that movable contact also will determine the amount by which the value of the power supplied to that motor during paying out of cable is reduced to compensate for the frictional forces of the motor 138, the frictional forces of the winch, the frictional forces of the gearing, and the resistance of the cable to bending.

The movable contact of potentiometer 640 determines the percentage of feedback voltage, supplied by the magnetic demodulator of FIG. 6, that will be applied to the rate network which includes the parallel-connected capacitors 648 and the resistor 656. The setting of that movable contact will coact with the values of resistor 656 and of capacitors 648 to determine the amount of feedback which that magnetic demodulator will supply to the control windings 366 and 384 for any given change in the speed of the rotor of the motor 138.

The adjustable resistor 572 in FIG. 6 determines the amount of voltage feedback which the transformer 520 will be able to supply to the control winding 386 of magnetic amplifier 370 when the motor 138 is being used to maintain an approximately constant tension in a cable between two vessels. The sum of the resistance of resistor 570 and the effective resistance of adjustable resistor 572 will be considerably smaller than the sum of the resistances of resistors 573 and 577. This is desirable because a substantial amount of voltage feedback is required when the motor 138 is used to maintain an approximately constant tension on a cable between two vessels, whereas only a small amount of voltage feedback is required when the motor 138 is used to raise and lower cargo.

TURNING CONTROL SYSTEM ON

To turn the control system on, the operator will set the handle 154 in its neutral position so the cam 514 will permit the switch 46 to close and so the switch 152 in FIG. 4 will be open, will set the switch knob 65 in its lower position so the switch 64 will close, and will then press the push button 44 for a short period of time. Thereupon, current will flow from conductor 16 via junction 38, fuse 40, junction 42, push button 44, switch 46, junction 48, push button 56, junction 58, temperature-responsive switch 60, junction 62, switch 64, relay coil 26, fuse 66 and junction 68 to the conductor 14. The resulting energization of the relay coil 26 will close the relay contacts 28, 30, 32 and 36; and thereupon, current will flow from conductors 20, 22 and 24 via junction 122 and conductor 128, junction 120 and conductor 126, and junction 118 and conductor 124 to the motor 130 which drives the fan or blower 132. Also, four hundred and forty volts A.C. will be applied to the junctions 232, 250 and 268 adjacent the magnetic amplifier 218 and to the junctions 298, 318 and 338 adjacent the magnetic amplifier 284 by the conductors 20, 22 and 24. In addition, current will flow from conductor 20 via junction 72 in FIG. 2, fuse 74, junction 75, primary winding 78 of transformer 76, junction 80, fuse 82 and junction 84 to conductor 24. That flow of current will enable the center-tapped secondary winding 94 of that transformer and the diodes 110 and 112 to cause direct current to flow from conductor 116 through the relay coil 50 to the conductor 106; and that direct current will enable that relay coil to close the relay contacts 52 and 54.

At such time, the operator can release the push button 44; because a holding circuit will have been established which extends from conductor 16 via junction 38, fuse 40, junction 42, relay contacts 54 and 52, relay contacts 36, junction 48, push button 56, junction 58, temperature-responsive switch 60, junction 62, switch 64, relay coil 26, fuse 66, and junction 68 to conductor 14. If a switch, that is responsive to air velocity or air pressure, had been provided between junction 42 and the relay contact 54, the operator of the control system would have had to hold the push button 44 closed long enough to enable the fan or blower 132 to establish the required air flow or air pressure. Also, if interlock switches for the doors of the housing for the control system had been provided between junction 42 and the relay contacts 54, those doors would have had to be closed before the control system was energized.

The current flowing through the primary winding 78 of transformer 76 will cause the secondary winding 90 to develop a voltage of one hundred and twenty volts; and that voltage will be applied to the primary winding 474 of transformer 472 in FIG. 1 by conductors 96 and 98, and will also be applied to the rotor of the synchro transmitter 508 in FIG. 1 by conductors 98 and 96 and junctions 500 and 504. Further, that voltage will be applied to the primary winding 398 of transformer 396 and to the primary winding 436 of transformer 434 in FIG. 2 by conductors 96 and 98. The secondary winding 92 of transformer 76 will respond to the flow of current through the primary winding 78 to develop a voltage of forty-five volts; and that voltage will be applied to the junctions 410 and 412 in FIG. 2 by the conductors 100 and 102. In addition to supplying direct current to the relay coil 50, the center-tapped secondary winding 94 and the diodes 110 and 112 will supply twenty-four volts D.C. to the left-hand terminals of adjustable resistor 388 and resistor 394 in FIG. 2, to the left-hand terminals of the adjustable resistor 278 and the inductor 280 in FIG. 3, and to the left-hand terminals of the adjustable resistor 346 and the inductor 348 in FIG. 3. The conductors 86 and 88 will supply four hundred and forty volts A.C. to the movable contact 216 and to the right-hand terminal of the relay coil 172 in FIG. 4, to the movable contact 152 and to the left-hand terminal of the relay coil 150 in FIG. 4, and to the terminals of the primary winding 586 of transformer 584 in FIG. 6. Because the switch 152 is open, the relay coil 150 will be de-energized and the relay contacts 148 will be open; and because those relay contacts are open the brake winding 144 will be de-energized and the brake will hold the rotor of the motor 138 against rotation.

As long as the operator leaves the handle 154 in its neutral position, the stator coils of the synchro transmitter 508 will not supply any voltage to the primary winding 482 of transformer 480. Also, the switch 46 will be closed, the movable contact 638 in FIG. 5 will be in its lower position, and the movable contact 590 in FIG. 6 will be in its lower position. The adjustable resistor 388 and the potentiometer 390 in FIG. 2 will cause enough current to flow through the bias windings 362 and 380 respectively, of magnetic amplifiers 352 and 370 to keep those magnetic amplifiers from "firing" until a signal is received by one or more of the control windings 364, 382 or 384 of those magnetic amplifiers. The adjustable resistors 278 and 346 in FIG. 3 will cause enough current to flow through the bias windings 236, 254 and 272 of magnetic amplifier 218 and to flow through the bias windings 300, 320 and 340 of magnetic amplifier 284 to keep those magnetic amplifiers from "firing" until the control wind-

31 ings 238, 256, and 274 of the former magnetic amplifier or the control windings 304, 324 and 344 of the latter magnetic amplifier receive a signal.

CARGO LOWERING OPERATION

To prepare the control system of the present invention for a cargo lowering operation, the operator need only make sure that the knob 204 in FIG. 5 is in its upper position; and, at such time, the movable contacts 206, 208, 210, 212, 214 and 216 will be in their upper positions. Because the movable contact 216 is in its upper position, the relay coil 172 will be de-energized; and hence the relay contacts 170, 174 and 176 will be open. As a result the pairs of potentiometers 158 and 160, 184 and 186, and 196 and 198 will constitute the only external load for the rotor windings 140 of the motor 138; and that load will be almost wholly resistive.

To start lowering cargo, the operator will rotate the handle 154 forwardly of the plane of the paper on which FIG. 4 appears; and that rotation will rotate the cams 514, 516 and 518 in the counter clockwise direction. The rotation of the cam 514 will open the switch 46 in FIG. 1; but the opening of that switch will not be significant at this time because the relay contacts 54 and 52 and the relay contacts 36 will continue to supply current to the relay coil 26. The counter clockwise rotation of the cams 516 and 518 will not affect the movable contacts 638 and 590; and hence those movable contacts will remain in their lower positions.

As the handle 154 rotates, the rotor of the synchro transmitter 508 also will rotate and will cause the stator coils of that synchro transmitter to supply an A.C. voltage to the primary winding 482 of transformer 480. The value of that voltage will be determined by the extent to which the handle 154 is rotated; but the phase of that voltage will be such that the magnetic demodulator of FIG. 1 will cause current to flow from the center tap of the center-tapped secondary winding 484 of transformer 480 via the left-hand diode 491, conductor 492, the movable and upper contacts 212, conductor 495, junction 494, control winding 382 of magnetic amplifier 370, control winding 364 of magnetic amplifier 352, inductor 490, adjustable resistor 488, and conductor 486 to the center tap of the center-tapped secondary winding 476 of transformer 472. The inductor 490 will tend to smooth out the current flow through those control windings. The left-hand diode 491 will keep current from flowing until the voltage across that diode exceeds about one-half of a volt; but that voltage will exceed one-half of a volt after the handle 154 has been rotated just a few degrees.

The current flowing through the control winding 382 of magnetic amplifier 370 will provide a negative effect; but that effect will not be significant because that magnetic amplifier will be biased well beyond its "firing" point. The current flowing through the control winding 364 of magnetic amplifier 352 will provide a positive effect; and, there upon, that magnetic amplifier will "fire," and will coact with transformer 396 to render the controlled rectifiers 422 and 424 conductive. Current from the secondary winding 92 of transformer 76 will then flow through those controlled rectifiers on alternate half-cycles of the A.C. voltage applied to the primary winding 78 of that transformer; and those controlled rectifiers will supply an A.C. voltage to the full wave bridge rectifier 414. Direct current from the positive terminal of that full wave bridge rectifier will flow via conductor 465, resistor 468, the control windings 238, 256 and 274 of magnetic amplifier 218, the control windings 302, 322 and 342 of magnetic amplifier 284, and conductor 469 to the negative teminal of that full wave bridge rectifier. The current flowing through the control windings 302, 322 and 342 of magnetic amplifier 284 will provide a negative effect; but that effect will not be significant because that magnetic amplifier will be biased well beyond its "firing" point. The current flowing through the control windings 238, 256

32 and 274 of magnetic amplifier 218 will provide a positive effect; and, thereupon, that magnetic amplifier will "fire," and the output windings 220, 242 and 260 will cause the conductors 224, 245 and 263 to apply A.C. voltage to the terminals of the stator windings 142 of the motor 138. That motor will respond to that voltage to start rotating in the lowering direction, and will thus cause the winch to pay out cable. The magnetic amplifier 352 will provide pre-amplification of the signal supplied by the synchro transmitter 508, the controlled rectifiers 422 and 424 will provide further amplification of that signal, and the magnetic amplifier 218 will provide the final amplification of that signal.

As the output windings 220, 242 and 260 of magnetic amplifier 218 supply A.C. voltage to the stator windings 142 of motor 138, those output windings also supply that voltage to the primary winding 522 of transformer 520 via junction 222, conductor 224, junctions 330 and 524, conductor 527, fuse 526 and junction 528, junction 243, conductor 245, junctions 310 and 530, conductor 529 and fuse 532, and junction 261, conductor 263, junctions 290 and 534, conductor 531, fuse 536 and junction 538. In addition, those output windings also supply that voltage to the primary winding 580 of transformer 578 via junction 222, conductor 224, junctions 330 and 524, conductor 577, fuse 526 and junction 528, and juncton 261, conductor 263, junctions 290 and 534, conductor 531, fuse 536 and junction 538. The application of that voltage to the primary winding 522 will not be significant at this time because the secondary winding 540 of the transformer 520 is not connected to the control winding 368 of magnetic amplifier 352. The application of that voltage to the primary winding 580 of transformer 578 will not be significant at this time because the movable contact 590 is out of engagement with the upper contact 590.

As the rotor of the motor 138 rotates in the lowering direction, it will rotate the rotor of the servo motor 596 in the same direction; and that servo motor will cause the magnetic demodulator of FIG. 6 to develop a D.C. voltage between the center taps of the center-tapped secondary windings 602 and 610. The center tap of the center-tapped secondary winding 602 will be connected to the junction 618 via conductor 612, inductor 614, conductor 615 and the movable and upper contacts 208; while the center tap of the center-tapped secondary winding 610 will be connected to the junction 624 via conductor 616, the movable and upper contacts 210, and junction 626. As a result, that magnetic demodulator will apply a D.C. voltage across serially-connected potentiometer 620 and resistor 623 and across serially-connected potentiometer 622 and resistor 625.

The voltage between junction 626 and the movable contact of potentiometer 622 will not be significant at this time because the movable contact 638 is out of engagement with the upper contact 638. However, the voltage between junction 624 and the movable contact of potentiometer 620 will cause current to flow via junctions 624 and 658, conductor 651, control winding 366 of magnetic amplifier 352, control winding 384 of magnetic amplifier 370, conductor 645, the movable and upper contacts 214, the movable and lower contacts 638, and resistor 636 to the movable contact of potentiometer 620. The current flowing through the control winding 366 will provide a negative effect; and that effect will normally be small and will normally be just sufficient to stabilize the operation of the motor 138 at low speeds. The current flowing through the control winding 384 of magnetic amplifier 370 will provide a positive effect; but that effect will not normally be significant, because that magnetic amplifier is biased well beyond its "firing" point. However, if the cargo should ever tend to overhaul the winch, the rotor of the servo motor 596 would rotate fast enough to increase the value of the current flowing through the control windings 366 and 384 to the point where the output of the magnetic amplifier 352 would become zero and the magnetic amplifier 370 would "fire." At such time, the controlled rectifiers 422 and 424 would become non-conductive, and the output of the magnetic amplifier 218 would become zero. Also, at such time, the transformer 434 would apply "firing" signals to the controlled rectifiers 464 and 466; and those controlled rectifiers would supply an A.C. voltage to the full wave bridge rectifier 448. Current would then flow from the positive terminal of that full wave bridge rectifier via conductor 475, resistor 470, the control windings 240, 258 and 276 of magnetic amplifier 218, the control windings 304, 324 and 344 of magnetic amplifier 284, and conductor 471 to the negative terminal of that full wave bridge rectifier. The flow of current through the control windings 240, 258 and 276 of magnetic amplifier 218 would provide a negative effect; but that effect would not be significant because that magnetic amplifier would then be biased well beyond its "firing" point. The current flowing through the control windings 304, 324 and 344 of magnetic amplifier 284 would cause that magnetic amplifier to "fire"; and thereupon the output windings 286, 306 and 326 of that magnetic amplifier would supply an A.C. voltage to the stator windings 142 of the motor 138 which would urge the rotor of that motor to rotate in the hoisting direction. The value of that voltage would be a function of the speed of that rotor, and that value would never be great enough to halt the paying out of the cable; but that value would be great enough to slow down the paying out of the cable to the desired rate.

As the operator rotated the handle 154 in the lowering direction, that handle automatically moved into the dotted-line position shown in FIG. 4; and, as that handle so moved, the switch 152 closed. Thereupon, current flowed through the relay coil 150; and that coil caused the relay contacts 148 to close. The resulting energization of the braking coil 144 of the motor 138 caused the brake to move to and remain in released position; and hence the rotor of the motor 138 was free to respond to the lowering voltage supplied to the stator windings 142 of that motor.

After the cargo has been lowered, the operator will return the handle 154 to its neutral position. At such time the switch 152 will reopen and thereby de-energize the relay coil 150. The resulting reopening of the relay contacts 148 will de-energize the braking coil 144; and hence the brake will hold the rotor of the motor 138 against further rotation. As the handle 154 returns to its neutral position, the rotor of the synchro transmitter 508 will return to its neutral position; and the stator coils of that synchro transmitter will not supply a signal to the primary winding 482 of transformer 480. This means that the output of magnetic amplifier 352, and hence of magnetic amplifier 218, will be zero.

CARGO HOISTING OPERATION

To prepare the control system of the present invention for a cargo hoisting operation, the operator need only make sure that the knob 204 in FIG. 5 is in its upper position. At such time, the movable contacts 206, 208, 210, 212, 214 and 216 will be in their upper positions. Because the movable contact 216 is in its upper position, the relay coil 172 will be de-energized; and hence the relay contacts 170, 174 and 176 will be open. As a result the pairs of potentiometers 158 and 160, 184 and 186, and 196 and 198 will constitute the only external load for the rotor windings 140 of the motor 138; and that load will be almost wholly resistive.

To start hoisting cargo, the operator will rotate the handle 154 rearwardly of the plane of the paper on which FIG. 4 appears; and that rotation will rotate the cams 514, 516 and 518 in the clockwise direction. The rotation of the cam 514 will open the switch 46 in FIG. 1; but the opening of that switch will not be significant at this time because the relay contacts 54 and 52 and the relay contacts 36 will keep the relay coil 26 energized. The clockwise rotation of the cam 516 will shift the movable contact 638 into its upper position, and the clockwise rotation of the cam 518 will shift the movable contact 590 into its upper position.

As the handle 154 rotates, the rotor of the synchro transmitter 508 also will rotate and will cause the stator coils of that synchro transmitter to supply an A.C. voltage to the primary winding 482 of transformer 480. The value of that voltage will be determined by the extent to which the handle 154 is rotated; but the phase of that voltage will be such that the magnetic demodulator of FIG. 1 will cause current to flow from the center tap of the center-tapped secondary winding 476 of transformer 472 via conductor 486, adjustable resistor 488, inductor 490, control winding 364 of magnetic amplifier 352, control winding 382 of magnetic amplifier 370, junction 494, conductor 495, the upper and movable contacts 212, conductor 492, and the right-hand diode 491 to the center tap of the center tapped secondary winding 484 of transformer 480. The inductor 490 will tend to smooth out the current flow through those control windings. The right-hand diode 491 will keep current from flowing until the voltage across that diode exceeds about one-half of a volt; but that voltage will exceed one half of a volt after the handle 154 has been rotated just a few degrees.

The current flowing through the control winding 364 of magnetic amplifier 352 will provide a negative effect; but that effect will not be significant because that magnetic amplifier will be biased well beyond its "firing" point. The current flowing through the control winding 382 of magnetic amplifier 370 will provide a positive effect; and, thereupon, that magnetic amplifier will "fire," and will coact with transformer 434 to render the controlled rectifiers 464 and 466 conductive. Current from the secondary winding 92 of transformer 76 will then flow through those controlled rectifiers on alternate half-cycles of the A.C. voltage applied to the primary winding 78 of that transformer; and those controlled rectifiers will supply an A.C. voltage to the full wave bridge rectifier 448. Direct current from the positive terminal of that full wave bridge rectifier will flow via conductor 475, resistor 470, the control windings 240, 258 and 276 of magnetic amplifier 218, the control windings 304, 324 and 344 of magnetic amplifier 284, and the conductor 471 to the negative terminal of that full wave bridge rectifier. The current flowing through the control windings 240, 258 and 276 of magnetic amplifier 218 will provide a negative effect; but that effect will not be significant because that magnetic amplifier will be biased well beyond its "firing" point. The current flowing through the control windings 304, 324 and 344 of magnetic amplifier 284 will provide a positive effect; and, thereupon, that magnetic amplifier will "fire," and the output windings 286, 306 and 326 will cause the conductors 263, 245 and 224 to supply A.C. voltage to the stator windings 142 of the motor 138. That motor will respond to that voltage to start rotating its rotor in the hoisting direction, and will thus cause the winch to start pulling in cable. The magnetic amplifier 370 will provide preamplification of the signal supplied by the synchro transmitter 508, the controlled rectifiers 464 and 466 will provide further amplification of that signal, and the magnetic amplifier 284 will provide the final amplification of that signal.

As the output windings 286, 306 and 326 supply A.C. voltage to the stator windings 142 of motor 138, those output windings also supply that voltage to the primary winding 522 of transformer 520 via junctions 288 and 290, conductor 263, junction 534, conductor 531, fuse 536 and junction 538, junctions 308 and 310, conductor 245, junction 530, conductor 529 and fuse 532, and junctions 328 and 330, conductor 224, junction 524, conductor 527, fuse 526 and junction 528. In addition, those output windings also supply that voltage to the primary winding 580 of transformer 578 via junctions 288 and 290, conductor 263, junction 534, conductor 531, fuse 536 and junction 538, and junctions 328 and 330, conductor 224, junction 524, conductor 577, fuse 526 and junction 528. The application of that voltage to the primary winding 522 of transformer 520 will enable that transformer to supply negative voltage feedback to the control winding 386 of magnetic amplifier 370, all as pointed out hereinbefore; and that negative voltage feedback will help stabilize the operation of the motor 138 at low speeds. The application of that voltage to the primary winding 580 of transformer 578 will enable that transformer to coact with the transformer 584 to develop a composite voltage that is, in part, a function of the voltage applied to the stator windings 142 of motor 138. That composite voltage is applied to the primary winding 600 of transformer 598 and to the input winding of the servo motor 596 by the upper and movable contacts 590.

As the rotor of the motor 138 rotates in the hoisting direction, it will rotate the rotor of the servo motor 596 in that same direction; and that servo motor will cause the magnetic demodulator of FIG. 6 to develop a D.C. voltage between the center taps of the center-tapped secondary windings 602 and 610. The center tap of the center-tapped secondary winding 602 will be connected to the junction 618 via conductor 612, inductor 614, conductor 615, and the movable and upper contacts 208; while the center tap of the center-tapped secondary winding 610 will be connected to the junction 624 via conductor 616, the movable and upper contacts 210, and junction 626. As a result, that magnetic demodulator will apply a D.C. voltage across serially-connected potentiometer 620 and resistor 623 and across serially-connected potentiometer 622 and resistor 625. The voltage between the movable contact of potentiometer 620 and junction 624 will not be significant at this time because the movable contact 638 is out of engagement with the lower contact 638. However, the voltage between the movable contact of potentiometer 622 and junction 626 will cause current to flow via the movable contact of potentiometer 622, resistor 630, the upper and movable contacts 638, the upper and movable contacts 214, conductor 645, control winding 384 of magnetic amplifier 370, control winding 366 of magnetic amplifier 352, conductor 651, and junctions 658 and 624 to the junction 626. The current flowing through the control winding 384 will provide a negative effect; and that effect will be a function of the voltage supplied to the stator windings 142 of the motor 138 and will also be a function of the speed of the rotor of that motor. The current flowing through the control winding 366 of magnetic amplifier 352 will provide a positive effect; but that effect will not be significant, because that magnetic amplifier is biased well beyond its "firing" point.

As the operator rotated the handle 154 in the hoisting direction, that handle automatically moved into the dotted-line position shown in FIG. 4; and, as that handle so moved, the switch 152 closed. Thereupon, current flowed through the relay coil 150; and that coil caused the relay contacts 148 to close. The resulting energization of the braking coil 144 of the motor 138 caused the brake to move to and remain in released position; and hence the rotor of the motor 138 was free to respond to the hoisting voltage supplied to the stator windings 142 of that motor.

After the cargo has been hoisted, the operater will return the handle 154 to its neutral positions. At such time the switch 152 will re-open and thereby de-energize the relay coil 150. The resulting re-opening of the relay contacts 148 will de-energize the braking coil 144; and hence the brake will hold the rotor of the motor 138 against further rotation. As the handle 154 returns to its neutral position, the rotor of the synchro transmitter 508 will return to its neutral position; and the stator coils of that synchro transmitter will not supply a signal to the primary winding 482 of transformer 480. This means that the output of magnetic amplifier 370, hence of magnetic amplifier 284, will be zero.

CABLE TENSIONING OPERATION

To prepare the control system of the present invention for a cable tensioning operation, the operator need only make sure that the knob 204 in FIG. 5 is in its lower position; and, at such time, the movable contacts 206, 208, 210, 212, 214 and 216 will be in their lower positions. Because the movable contact 216 will be in its lower position, the relay coil 172 will be energized and the relay contacts 170, 174 and 176 will be closed. As a result, the inductor 168 will be connected in parallel with the lefthand sections of the potentiometers 158 and 160, the inductor 190 will be connected in parallel with the lefthand sections of the potentiometers 184 and 186, and the inductor 202 will be connected in parallel with the lefthand sections of the potentiometers 196 and 198. This means that the external load for the rotor windings 140 of the motor 138 will be both inductive and resistive.

To start tensioning the cable, the operator will rotate the handle 154 in the hoisting direction; namely, he will rotate that handle rearwardly of the plane of the paper on which FIG. 4 appears. That rotation will rotate the cams 514, 516 and 518 in the clockwise direction; and the rotation of the cam 514 will open the switch 46 in FIG. 1; but the opening of that switch will not be significant at this time because the relay contacts 54 and 52 and the relay contacts 36 will keep the relay coil 26 energized. The clockwise rotation of the cam 516 will shift the movable contact 638 into its upper position; and the clockwise rotation of the cam 518 will shift the movable contact 590 into its upper position.

As the handle 154 rotates, the rotor of the synchro transmitter 508 will also rotate and will cause the stator coils of that synchro transmitter to supply an A.C. voltage to the primary winding 482 of transformer 480. The value of that voltage will be determined by the extent to which the handle 154 is rotated; but the phase of tha voltage will be such that the magnetic demodulator of FIG. 1 will cause current to flow from the center tap of the center-tapped secondary winding 476 of transformer 472 via conductor 486, adjustable resistor 488, inductor 490, control winding 364 of magnetic amplifier 352, control winding 382 of magnetic amplifier 370, junction 494, diode 496, conductor 497, the lower and movable contacts 212, conductor 492, and the right-hand diode 491 to the center tap of the center-tapped secondary winding 484 of transformer 480. The inductor 490 will tend to smooth out the current flow through those control windings. The right-hand diode 491 will keep current from flowing until the voltage across that diode exceeds about one-half of a volt; but that voltage will exceed one-half of a volt after the handle 154 has been rotated just a few degrees.

The current flowing through the control winding 364 of magnetic amplifier 352 will provide a negative effect; but that effect will not be significant because that magnetic amplifier will be biased well beyond its "firing" point. The current flowing through the control winding 382 of magnetic amplifier 370 will provide a positive effect; and, thereupon, that magnetic amplifier will "first," and will coact with transformer 434 to render the controlled rectifiers 464 and 466 conductive. Current from the secondary winding 92 of transformer 76 will then flow through those controlled rectifiers on alternate half-cycles of the A.C. voltage applied to the primary winding 78 of that transformer; and those controlled rectifiers will supply an A.C. voltage to the full wave bridge rectifier 448. Direct current from the positive terminal of that full wave bridge rectifier will flow via conductor 475, resistor 470, the control windings 240, 258 and 276 of magnetic amplifier 218, the control windings 304, 324 and 344 of magnetic amplifier 284, and the conductor 471 to the negative terminal of that full wave bridge rectifier. The current flowing through the control windings 240, 258 and 276 of magnetic amplifier 218 will provide a negative effect; but that effect will not be significant because that magnetic amplifier will be biased well beyond its "firing" point. The current flowing through the control winding 304, 324 and 344 of magnetic amplifier 284 will provide a positive effect; and, thereupon, that magnetic amplifier will "fire," and the output windings 286, 306 and 326 will cause the conductors 263, 245 and 224 to supply A.C. voltage to the stator windings 142 of the motor 138. That motor will respond to that voltage to start rotating its rotor in the hoisting direction, and will thus cause the winch to start pulling in cable. The magnetic amplifier 370 will provide preamplification of the signal supplied by the synchro transmitter 508, the controlled rectifiers 464 and 466 will provide further amplification of that signal, and the magnetic amplifier 284 will provide the final amplification of that signal.

As the output windings 286, 306 and 326 supply A.C. voltage to the stator windings 142 of motor 138, those output windings also supply that voltage to the primary winding 522 of transformer 520 via junction 288 and 290, conductor 263, junction 534, conductor 531, fuse 536 and junctions 308 and 310, conductor 245, junction 530, conductor 529 and fuse 532, and junctions 328 and 330, conductor 224, junction 524, conductor 527, fuse 526 and junction 528. In addition, those output windings also supply that voltage to the primary winding 580 of transformer 578 via junctions 288 and 290, conductor 263, junction 534, conductor 531, fuse 536 and junction 538, and junctions 328 and 330, conductor 224, junction 524, conductor 527, fuse 526 and junction 528. The application of that voltage to the primary winding 522 of transformer 520 will enable that transformer to supply negative voltage feedback to the control winding 386 of magnetic amplifier 370, all as pointed out herein-before; and the value of that negative voltage feedback will be large. The application of that voltage to the primary winding 580 of transformer 578 will enable that transformer to coact with the transformer 584 to develop a composite voltage that is, in part, a function of the voltage applied to the stator windings 142 of motor 138. That composite voltage is applied to the primary winding 600 of transformer 598 and to the input winding of the servo motor 596 by the upper and movable contacts 590.

As the rotor of the motor 138 rotates in the hoisting direction, it will rotate the rotor of the servo motor 596 in that same direction; and that servo motor will cause the magnetic demodulator of FIG. 6 to develop a D.C. voltage between the center taps of the center-tapped secondary windings 602 and 610. The center tap of the center-tapped secondary winding 602 will be connected to the junction 641 via conductor 612, inductor 614, conductor 615, and the movable and lower contacts 208, while the center tap of the center-tapped secondary winding 610 will be connected to the junction 635 via conductor 616, the movable and lower contacts 210, and junctions 629 and 644. As a result, that magnetic demodulator will apply a D.C. voltage across serially-connected resistor 642 and potentiometer 640 and across serially-connected resistor 628 and potentiometer 634.

The voltage between the movable contact of potentiometer 634 and junction 635 will cause current to flow through the control windings 366 and 384, respectively, of the magnetic amplifiers 352 and 370. The current flowing through the control winding 366 will provide a negative effect; and that effect will be a function of the voltage supplied to the stator windings 142 of the motor 138 and will also be a function of the speed of the rotor of that motor. However, the effect of the current flowing through the control winding 366 of magnetic amplifier 352 will not be significant; because that magnetic amplifier will be biased well beyond its "firing" point. The current flowing through the control winding 384 will provide a positive effect; and that effect will be a function of the voltage supplied to the stator windings 142 of the motor 138 and will also be a function of the speed of the rotor of that motor. The effect provided by that current will compensate for the frictional forces of the motor, of the gearing, and of the winch and for the bending-resistance of the cable; all as pointed out hereinbefore. The voltage between the movable contact of potentiometer 640 and junction 644 will, whenever the speed of the rotor of the motor 138 is changing, cause current to flow through the control windings 366 and 384, respectively, of the magnetic amplifiers 352 and 370. The current flowing through the control winding 384 will provide a positive effect; and that effect will be a function of the voltage supplied to the stator windings 142 of the motor 138 and will also be a function of the speed of the rotor of that motor. The effect provided by that current will cause the rotor of the motor 138 to accelerate rapidly and progressively as it starts rotating in the hoisting direction, all as pointed out hereinbefore. The overall result is that the said rotor will continue to accelerate until the cable becomes taut and causes the winch to rotate at its intended speed. Thereafter, the hoisting voltage applied to the stator windings 142 of the motor 138 will tend to keep that cable taut.

If, subsequently, the relative motion of the vessels forces the winch to pay out extra cable, the rotor of motor 138 will be rotated in the lowering direction; and, thereupon, the servo motor 596 will cause current to flow from the junction 635 via junction 654, the lower and movable contacts 214, conductor 645, control winding 384 of magnetic amplifier 370, control winding 366 of magnetic amplifier 352, conductor 651, junctions 658, 652 and 639, and resistor 637 to the movable contact of potentiometer 634. That servo motor also will cause current to flow from the junction 644 via junctions 635 and 654, the lower and movable contacts 214, conductor 645, control winding 384 of magnetic amplifier 370, control winding 366 of magnetic amplifier 352, conductor 651, junctions 658, 652, 639 and 650, parallel-connected capacitors 648, and junction 646 to the movable contact of the potentiometer 640. The current flowing through the control winding 384 of magnetic amplifier 370 will provide a negative effect and will drive the output of that magnetic amplifier down; and the controlled rectifiers 464 and 466 will respond to the resulting decrease in output of the magnetic amplifier 370 to reduce their output. The control windings 304, 324 and 344 of magnetic amplifier 284 will respond to the decreased output from the controlled rectifiers 464 and 466 to cause that magnetic amplifier to reduce the hoisting voltage supplied to the stator windings 142 of the motor 138; and this is desirable because it will permit the relative motion of the vessels to cause the winch to pay out the required length of cable rather than permit that motion to break that cable. The portion of the feedback provided by the current which flows through the upper section of the potentiometer 634 will compensate for the frictional forces of the motor, of the gearing, and of the winch and for the bending-resistance of the cable; all as pointed out hereinbefore.

As the hoisting voltage supplied to the stator windings 142 of motor 138 decreased, the voltage supplied to the primary winding 522 of transformer 520 decreased; and, as a result, the negative voltage feedback provided by the transformer 520 was reduced and acted to reduce the negative effect provided by the control winding 384 of magnetic amplifier 370. Also, as the hoisting voltage supplied to the stator windings 142 of motor 138 decreased, the voltage supplied to the primary winding 580 of transformer 578 decreased; and, as a result, the gain provided by the servo motor 596 was decreased. The valve of the negative voltage feedback is so large, when the motor 138 is being used to maintain an approximately constant tension on the cable, that the change in gain of the servo motor 596, due to the change in voltage supplied to the stator windings 142 of motor 138, can largely be ignored.

Although the relative motion of the vessels can cause the winch to rotate the rotor of the motor 138 in the lowering direction, the magnetic amplifier 370, the controlled rectifiers 464 and 466, and the magnetic amplifier 284 will continue to supply hoisting voltage to the stator windings 142 of that motor. This is desirable because it will enable that motor to keep the cable under tension while that cable is being pulled out.

As the relative motion of the vessels causes the cable to be pulled from the winch at a lesser rate, the feedback provided by the servo motor 596 will decrease; and hence the hoisting voltage that is supplied to the stator windings 142 of motor 138 will increase. As the relative motion of the vessels permits the pull on the cable to decrease to the point where it is less than the pull applied by the motor 138, the winch will start pulling that cable back in. Thereupon, the rotor of the servo motor 596 will cause the magnetic demodulator of FIG. 6 to reverse the polarity of the signal supplied to the control winding 384 of the magnetic amplifier 370; and that servo motor will coact with that magnetic demodulator to provide positive feedback. That positive feedback will cause the magnetic amplifier 370, the controlled rectifiers 464 and 466, and the magnetic amplifier 284 to increase the voltage supplied to the stator windings 142 of motor 138. The resulting increased voltage will cause the rotor of the motor 138 to speed up, and will also cause the transformers 578 and 584 to coact with the servo motor 596 and the magnetic demodulator of FIG. 6 to provide increased positive feedback for the control winding 384 of magnetic amplifier 370. The overall result is that the rotor of the motor 138 will promptly and progressively accelerate and quickly pull in the cable until that cable is taut once again. In this way, the control system of the present invention causes the motor 138 to keep tension on the cable whether that cable is being pulled out or is being pulled in.

When the motor 138 is being used to maintain an approximately constant tension on a cable which is transferring cargo or personnel between vessels at sea, the handle 154 should not be set in its lowering position. However, even if the operator accidentally set that handle in its lowering position, the magnetic amplifier 352 would not cause a lowering voltage to be supplied to the stator windings 142 of the motor 138. Specifically, the diode 496 in FIG. 2 would keep current from flowing through the control winding 364 of the magnetic amplifier 352 in such a direction as to cause that magnetic amplifier to "fire."

TURNING CONTROL SYSTEM OFF

At the conclusion of one or more cargo-hoisting or cargo-lowering operations, or at the conclusion of an operation wherein cargo or personnel is transferred between vessels, the control system can be turned off. That control system can be turned off by shifting the knob 65 from its lower position to its upper position to open switch 64, or by pressing the push button 56. In either event, the holding circuit for the relay coil 26 will be interrupted; and, thereupon, the relay contacts 28, 30, 32 and 36 will move to their open positions. The opening of the relay contacts 36 will keep the holding circuit of the relay coil 26 open when the knob 65 is returned to its lower position or the push button 56 is released. The opening of the relay contacts 28, 30 and 32 will de-energize the overall control system. In this simple and easy way, the control system provided by the present invention can be turned off.

CONTROL SYSTEM CAN PROVIDE APPROXIMATELY CONSTANT HORSE POWER CHARACTERISTIC FOR MOTOR

If the speed-responsive feedback that is normally supplied by the servo motor 596 were eliminated, as by cutting the conductors 612 and 616, the motor 138 would have an approximately linear torque versus speed or slip characteristic when that motor was used to hoist or lower cargo. Specifically, if the handle 154 was set to provide maximum stator voltage in the hoisting direction and a progressively-increasing load was applied to the rotor of that motor, the speed of that rotor would decrease and the torque applied by that rotor would increase according to the right-hand portion of the curve 660 in FIG. 8. When that handle was set to provide maximum stator voltage in the lowering direction and still heavier loads were progressively applied to the rotor of that motor, the speed of that rotor would increase and the torque applied by that rotor would increase according to the left-hand portion of the curve 660 in FIG. 8. When the handle 154 was set to provide seventy percent of maximum stator voltage in the hoisting direction and a progressively-increasing load was applied to the rotor of that motor, the speed of that rotor would decrease and the torque applied by that rotor would increase according to the right-hand portion of the curve 662 in FIG 8. When that handle was set to provide seventy percent of maximum stator voltage in the lowering direction and still heavier loads were progressively applied to the rotor of that motor, the speed of that rotor would increase and the torque applied by that rotor would increase according to the left-hand portion of the curve 662 in FIG. 8. When the handle 154 was set to provide fifty percent of maximum stator voltage in the hoisting direction and a progressively-increasing load was applied to the rotor of that motor, the speed of that rotor would decrease and the torque applied by that rotor would increase according to the right-hand portion of the curve 664 in FIG. 8. When that handle was set to provide fifty percent of maximum stator voltage in the lowering direction and still heavier loads were progressively applied to the rotor of that motor, the speed of that rotor would increase and the torque applied by that rotor would increase according to the left-hand portion of the curve 664 in FIG. 8.

The resistive load, for the rotor windings 140, which is constituted by the pairs of potentiometers 158 and 160, 184 and 186, and 196 and 198 makes it possible for the motor 138 to have the approximately linear torque versus speed of slip characteristic indicated by FIG. 8. That characteristic causes the curves 660, 662 and 664 to be convex and to incline downwardly from high torque zero speed areas to zero torque high speed areas.

However, when the motor 138 is used to hoist cargo, a substantial amount of speed-responsive feedback is supplied to the magnetic amplifier 370. Further, that speed-responsive feedback is modified by causing the voltage supplied to the stator windings 142 of the motor 138 to vary the gain of the servo motor 596. The resistive load supplied by the pairs of potentiometers 158 and 160, 184 and 186, and 196 and 198 coacts with the substantial speed-responsive feedback supplied to the magnetic amplifier 370 and with the said modification of that speed-responsive feedback to provide an approximately constant horse power characteristic for the motor 138, all as shown by FIG. 9. Specifically, if the handle 154 was set to provide maximum control voltage in the hoisting direction and a progressively-increasing load was applied to the rotor of that motor, the speed of that motor would follow the curve 666 in FIG. 9. If the handle 154 was set to provide seventy percent of maximum control voltage in the hoisting direction and a progressively-increasing load was applied to the rotor of that motor, the speed of that motor would follow the curve 668 in FIG. 9. If the handle 154 was set to provide fifty percent of maximum control voltage in the hoisting direction and a progressively-increasing load was applied to the rotor of that motor, the speed of that motor would follow the curve 670 in FIG. 9.

The curves 666, 668 and 670 are not true constant horse power curves; but the central and right-hand portions of the curve 670 are almost coincident with the central and right-hand portions of the corresponding constant horse power curve. The central and right-hand portions of the curve 668 depart slightly from the central and right-hand portions of the corresponding constant horse power curve; and the central and right-hand portions of the curve 666 depart even more from the corresponding constant horse power curve. However, all of the curves 666, 668 and 670 incline downwardly from high torque and low speed areas to low torque and high speed areas while being concave throughout the greatest portions of their lengths; and hence those curves satisfactorily approach the corresponding constant horse power curves.

CONTROL SYSTEM CAN PROVIDE APPROXIMATELY CONSTANT TENSION CHARACTERISTIC FOR MOTOR

When the motor 138 is used to transfer cargo or personnel between vessels at sea, the inductors 168, 190 and 202, are respectively, connected in parallel with the left-hand sections of the pairs of potentiometers 158 and 160, 184 and 186, and 196 and 198. Also, transformer 520 provides such large values of negative voltage feedback for the control winding 386 of magnetic amplifier 370 that the steady-state voltage applied to the stator windings 142 is substantially constant. That substantially constant voltage will coact with the combination inductive and resistive load for the rotor windings 140 of the motor 138 to provide an approximately constant tension characteristic for that motor, all as shown by FIG. 10. Specifically, if the handle 154 was set to provide maximum stator voltage in the hoisting direction and the slip of the motor 138 was caused to change from a value of one to a value of one and one-half, the torque supplied by that motor would follow the left-hand portion of the curve 672 in FIG. 10. If, while that handle was still set to provide maximum stator voltage in the hoisting direction, the slip of the motor 138 was caused to change from a value of one to a value of one-half, the torque supplied by that motor would follow the right-hand portion of the curve 672 in FIG. 10. If the handle 154 was set to provide seventy percent of maximum stator voltage in the hoisting direction and the slip of the motor 138 was caused to change from a value of one to a value of one and one-half, the torque supplied by that motor would follow the left-hand portion of the curve 674 in FIG. 10. If, while that handle was still set to provide seventy percent of maximum stator voltage in the hoisting direction, the slip of the motor 138 was caused to change from a value of one to a value of one-half, the torque supplied by that motor would follow the right-hand portion of the curve 674. If the handle 154 was set to provide fifty percent maximum stator voltage in the hoisting direction and the slip of the motor 138 was caused to change from a value of one to a value of one and one-half, the torque supplied by that motor would follow the left-hand portion of the curve 676 in FIG. 10. If, while that handle was still set to provide fifty percent of maximum stator voltage in the hoisting direction, the slip of the motor 138 was caused to change from a value of one to a value of one-half, the torque supplied by that motor would follow the right-hand portion of the curve 676 in FIG. 10.

The curves 672, 674 and 676 in FIG. 10 are not true constant torque curves; but the central portions of those curves closely approximate constant torque curves. For example, those portions of the curves 672, 674 and 676 which are in the range of five-tenths to one and five-tenths slip will be within plus or minus ten percent of a true constant torque curve. Such motor characteristic is extremely desirable for a motor used to transfer cargo or personnel between vessels at sea.

PROTECTIVE FEATURES

The bias voltage for the magnetic amplifiers 352, 370, 218 and 284 is provided by the center-tapped secondary winding 94 of the transformer 76; and the energizing current for the relay coil 50 also is supplied by that center-tapped secondary winding. This means that if that center-tapped secondary winding should "open" or should fail to have a voltage developed across it, the relay coil 50 would become de-energized and permit the relay contacts 52 and 54 to reopen; and thereupon the relay coil 26 would become de-energized and permit the relay contacts 28, 30 and 32 to reopen. In this way, the control system of the present invention makes certain that if the center tapped secondary winding 94 should "open" or should fail to have a voltage developed across it, the power supplied to the magnetic amplifiers 352, 370, 218 and 284 would be cut off. This is important, because if the control system continued to supply power to those magnetic amplifiers after the source of bias voltage failed, serious injury could result to the motor 138 and to other components of the control system.

The temperature-responsive switch 60 will protect the motor 138 against injury due to overheating. Specifically, if that motor tends to become overheated, the switch 60 will open and will interrupt the holding circuit for the relay coil 26. Thereupon, the relay contacts 28, 30, 32, and 36 will reopen; and the relay contacts 28, 30 and 32 will cut off the power to the motor 138. The movable contact 36 will keep the holding circuit for the relay coil 26 open even after the temperature-responsive switch 60 recloses. This is extremely desirable because it will keep the control system from suddenly starting up when that temperature-responsive switch recloses.

In the event the temperature-responsive switch 60 opened at a time when cargo was suspended in mid air, it would be desirable to be able to lower that cargo onto a dock or onto the deck. The control system of the present invention enables the operator to cause the motor 138 to lower that cargo onto a dock or onto the deck, even though the temperature-responsive switch 60 is open. First, the operator will return the handle 154 to its neutral position; and then he will simultaneously press and hold the push buttons 44 and 70. As those push buttons are held, current will flow from conductor 22 via junction 38, fuse 40, junction 42, push button 44, switch 46, junction 48, push button 56, junction 58, push button 70, junction 62, switch 64, relay coil 26, fuse 66, and junction 68 to the conductor 20. The resulting energization of the relay coil 26 will close the relay contacts 28, 30 and 32 and supply power to the control system. Also, the relay contacts, 38 will close; and hence the operator can release the push button 44. While the push button 70 is held by the operator, the handle 154 can be shifted into is lowering position to cause the motor 138 to cause the winch to lower the cargo onto a dock or onto the deck. Thereafter, that handle can be permitted to return to its neutral position, and he push button 60 can be released.

It should also be noted that if the temperature-responsive switch 60 ever opens, the brake for the rotor of motor 138 will automatically be applied to prevent rotation of that rotor. Specifically, that brake will be applied whenever the braking coil 144 is de-energized; and that braking coil will automatically become de-energized if the temperature-responsive switch 60 opens—the opening of that switch causing the relay contacts 28, 30 and 32 to reopen.

Whenever the handle 154 is in its neutral position, it tends to move to the solid-line position shown in FIG. 4; and, in that position, that handle permits the switch 152 to open and thereby permits the brake to be applied. If it becomes desirable to free the rotor of the motor 138, while the handle 154 is in its neutral position, the operator can push that handle into, and then hold that handle in, the dotted-line position of FIG. 4; and, at such time, the switch 152 will close and cause the relay coil 150 to become energized—with consequent energization of the braking coil 144. Such an arrangement is desirable because it frees the rotor of the motor 138 for rotation while not applying any lowering or hoisting forces to that rotor.

CONCLUSION

The servo motor 596 is used as a tachometer because servo motors can produce desirably high power outputs. However, if desired, a drag cup tachometer could be used instead of the servo motor 596. If that is done, the capacitor 597 in FIG. 6 can be eliminated; because the phase of the output of a drag cup tachometer is either in phase with or is one hundred and eighty degrees out of phase with the input of that tachometer, depending upon the direction in which the shaft of that tachometer is rotating.

If it ever becames desirable to make the curves 672, 674 and 676 of FIG. 10 approach the corresponding true constant torque curves even more closely, the servo motor 596 could be made to provide further feedback, to the magnetic amplifiers 352 and 370, which would increase the outputs of those magnetic amplifiers as the speed of the rotor of the motor 138 increased in the forward or reverse direction. That increase in output would keep the curves 672, 674 and 676 from bowing downwardly to the extent they bow downwardly in FIG. 10. That further feedback could be provided by connecting the output winding of the servo motor 596 to the input terminals of a full wave bridge rectifier, and by connecting the output terminals of that full wave bridge rectifier to an additional set of serially-connected control windings on the magnetic amplifiers 352 and 370. Those additional control windings would be connected to the full wave bridge rectifier so any current flowing through those control windings would provide a positive effect and would tend to drive the outputs of those magnetic amplifiers 352 and 370 up; and any resulting increases in the outputs of those magnetic amplifiers would increase the outputs of the magnetic amplifiers 218 and 284. The resulting increases in the outputs of the magnetic amplifiers 218 and 284 would increase the values of the torque provided by the motor 138 at increased rotor speeds, and would thus cause the curves 672, 674 and 676 to more closely approach the corresponding true constant torque curves. That further feedback would be in addition to the other feedback that is provided when the motor 138 is being used to transfer cargo or personnel between vessels at sea.

The control system provided by the present invention provides three separate and distinct torque-versus-speed characteristics for the motor 138; and those torque-versus-speed characteristics enable cargo to be handled in optimum fashion. Specifically, that control system provides an approximately constant horse power torque-versus-speed characteristic for the motor 138 whenever that motor is used to hoist cargo, that control system provides an approximately constant tension torque-versus-speed characteristic for the motor 138 whenever that motor is used to transfer cargo or personnel between vessels at sea, and that control system provides an approximately constant speed torque-versus-speed characteristic for the motor 138 whenever that motor is used to lower cargo.

Whereas the drawing and accompanying description have shown and described one preferred form of control system, it should be apparent to those skilled in the art that various changes may be made in the form of the invention without affecting the scope thereof.

What we claim is:

1. A control system that can selectively apply approximately constant horse power or approximately constant tension to a load and that comprises:
   (a) a wound rotor, induction motor,
   (b) a resistive load that is connected to the rotor windings of said motor and that can substantially reduce the speed of said rotor,
   (c) an inductive load that can be selectively connected to said rotor windings and in parallel with said resistive load,
   (d) a magnetic amplifier that is connected to the stator windings of said motor and that can supply forward voltage to said stator windings,
   (e) a second magnetic amplifier that is connected to said stator windings of said motor and that can supply reverse voltage to said stator windings,
   (f) a third magnetic amplifier that can serve as a pre-amplifier for the first said magnetic amplifier,
   (g) a fourth magnetic amplifier that can serve as a pre-amplifier for said second magnetic amplifier,
   (h) a controlled rectifier amplifier intermediate said third and the first said magnetic amplifiers,
   (i) a second controlled rectifier amplifier intermediate said fourth and said second magnetic amplifiers,
   (j) one of the control windings of said third magnetic amplifier being connected in series with one of the control windings of said fourth magnetic amplifier,
   (k) a synchro transmitter and a magnetic demodulator that can provide a variable value, reversible polarity D.C. signal which can cause current to flow through said one control windings of said third and fourth magnetic amplifiers,
   (l) a handle for said synchro transmitter that can rotate the rotor of said synchro transmitter in the forward direction to cause said third magnetic amplifier and the first said controlled rectifier amplifier and the first said magnetic amplifier to supply forward voltage to said stator windings of said motor, and that can rotate said rotor of said synchro transmitter in the reverse direction to cause said fourth magnetic amplifier and said second controlled rectifier amplifier and said second magnetic amplifier to supply reverse voltage to said stator windings of said motor,
   (m) a second control winding on said third magnetic amplifier that is connected in series with a second control winding on said fourth magnetic amplifier,
   (n) a tachometer that has the rotor thereof connected to and driven by said rotor of said motor,
   (o) a transformer that can supply a substantially constant voltage to the input winding of said tachometer,
   (p) a second transformer that has the primary winding thereof connected to terminals of said stator windings of said motor and that can have the secondary winding thereof connected to said input winding of said tachometer to make the output of said tachometer, in part, responsive to the voltage supplied to said stator windings of said motor,
   (q) a speed-responsive feedback loop that includes said tachometer and a magnetic demodulator and that can supply negative speed-responsive feedback or positive speed-responsive feedback to said second control windings of said third and fourth magnetic amplifiers,
   (r) a rate network in said speed-responsive feedback loop that supplies said positive speed-responsive feedback to said second control windings of said third and fourth magnetic amplifiers only when the speed of the rotors of said motor and said tachometer is changing and is thus changing the output voltage of said tachometer,
   (s) a compensation network in said speed-responsive feedback loop that will respond to rotation of the rotors of said motor and said tachometer in the forward direction to slightly increase the forward voltage supplied to said stator windings of said motor and that will respond to rotation of the rotors of said motor and said tachometer in the reverse direction to slightly decrease the reverse voltage supplied to said stator windings of said motor,
   (t) said compensation network including back-to-back diodes,
   (u) a third control winding on said third magnetic amplifier,
   (v) a voltage-responsive feedback loop that includes a third transformer which has the primary winding thereof connected to terminals of said stator windings of said motor and that can supply large or small amounts of negative feedback to said third control winding on said third magnetic amplifier, (w) selectively actuatable contacts, and (x) a second compensation network that keeps the first said magnetic demodulator from causing current to flow through said one control windings of said third and fourth magnetic amplifiers until said handle has been moved a short distance in the forward direction or has been moved a short distance in the reverse direction, (y) said second compensation network including back-to-back diodes, (z) said contacts being adapted to disconnect said inductive load from said rotor windings so the load on said rotor windings is substantially resistive and to cause said speed-responsive feedback loop to supply negative feedback to said second control windings of said third and fourth magnetic amplifiers which is responsive to the speed of said rotor of said motor and also to the voltage supplied to said stator windings of said motor, whereby said motor will apply approximately constant horsepower to said load, (aa) said contacts being adapted to connect said inductive load to said rotor windings and in parallel with said resistive load and to cause substantial negative voltage feedback to be supplied to said third control winding of said third magnetic amplifier, whereby said motor can supply approximately constant tension to said load, (ab) said control system providing smooth and step-less control of the rotation of said rotor of said motor in the forward and reverse directions.

2. A control system that can selectively apply approximately constant horse power or approximately constant tension to a load and that comprises:

(a) a wound rotor, induction motor, (b) a resistive load that is connected to the rotor windings of said motor and that can substantially reduce the speed of said rotor, (c) an inductive load that can be selectively connected to said rotor windings and in parallel with said resistive load, (d) a variable voltage source that is connected to the stator windings of said motor and that can supply forward voltage to said stator windings, (e) a second variable voltage source that is connected to said stator windings of said motor and that can supply reverse voltage to said stator windings, (f) the first said variable voltage source having a control winding connected in series with a control winding of said second variable voltage source, (g) a signal source that can provide variable value signals which are proportional through zero and which can cause current to flow through said control windings of said variable voltage sources, (h) a handle for said signal source that can cause the first said variable voltage source to supply forward voltage to said stator windings of said motor, and that can cause said second variable voltage source to supply reverse voltage to said stator windings of said motor, (i) the first said variable voltage source having a second control winding connected in series with a second control winding of said second variable voltage source, (j) a tachometer that has the rotor thereof connected to and driven by said rotor of said motor, (k) a transformer that can supply a substantially constant voltage to the input winding of said tachometer, (l) a second transformer that has the primary winding thereof connected to terminals of said stator windings of said motor and that can have the secondary winding thereof connected to said input winding of said tachometer to make the output of said tachometer, in part, responsive to the voltage supplied to said stator windings of said motor, (m) a speed-responsive feedback loop that includes said tachometer and that can supply negative speed-responsive feedback or positive speed-responsive feedback to said second control windings of the first said and said second variable voltage sources, (n) a rate network in said speed-responsive feedback loop that supplies said positive speed-responsive feedback to said second control windings of the first said and said second variable voltage sources only when the speed of the rotors of said motor and said tachometer is changing and is thus changing the output voltage of said tachometer, (o) a compensation network in said speed-responsive feedback loop that will respond to rotation of the rotors of said motor and said tachometer in the forward direction to slightly increase the forward voltage supplied to said stator windings of said motor and that will respond to rotation of the rotors of said motor and said tachometer in the reverse direction to slightly decrease the reverse voltage supplied to said stator windings of said motor, (p) the first said variable voltage source having a third control winding, (q) a voltage-responsive feedback loop that includes a third transformer which has the primary winding thereof connected to terminals of said stator windings of said motor and that can supply large or small amounts of negative feedback to said third control winding of the first said variable voltage source, (r) selectively actuatable contacts, and (s) a second compensation network that keeps said signal source from causing current to flow through the first said control windings of the first said and said second variable voltage sources until said handle has been moved a short distance in the forward direction or has been moved a short distance in the reverse direction, (t) said contacts being adapted to disconnect said inductive load from said rotor windings so the load on said rotor windings is substantially resistive and to cause said speed-responsive feedback loop to supply negative feedback to said second control windings of the first said and said second variable voltage sources which is responsive to the speed of said rotor of said motor and also to the voltage supplied to said stator windings of said motor, whereby said motor will apply approximately constant horse power to said load, (u) said contacts being adapted to connect said inductive load to said rotor windings and in parallel with said resistive load and to cause substantial negative voltage feedback to be supplied to said third control winding of the first said variable voltage source, whereby said motor can supply approximately constant tension to said load, (v) said control system providing smooth and step-less control of the rotation of said rotor of said motor in the forward and reverse directions.

3. A control system that can selectively apply approximately constant horse power or approximately constant tension to a load and that comprises:

(a) a wound rotor, induction motor, (b) a resistive load that is connected to the rotor windings of said motor and that can substantially reduce the speed of said rotor, (c) an inductive load that can be selectively connected to said rotor windings and in parallel with said resistive load, (d) a variable voltage source that is connected to the stator windings of said motor and that can supply forward voltage to said stator windings, (e) a second variable voltage source that is connected to said stator windings of said motor and that can supply reverse voltage to said stator windings, (f) the first said variable voltage source having a control winding connected in series with a control winding of said second variable voltage source, (g) a signal source that can provide variable value signals which can cause current to flow through said control windings of said variable voltage sources, (h) a handle for said signal source that can cause the first said variable voltage source to supply forward voltage to said statoir windings of said motor, and that can cause said second variable voltage source to supply reverse voltage to said stator windings of said motor, (i) the first said variable voltage source having a second control winding connected in series with a second control winding of said second variable voltage source, (j) a tachometer that has the rotor thereof connected to and driven by said rotor of said motor, (k) a transformer that can supply a substantially constant voltage to the input winding of said tachometer, (l) a second transformer that has the primary winding thereof connected to terminals of said stator windings of said motor and that can have the secondary winding thereof connected to said input winding of said tachometer to make the output of said tachometer, in part, responsive to the voltage supplied to said stator windings of said motor, (m) a speed-responsive feedback loop that includes said tachometer and that can supply negative speed-responsive feedback or positive speed-responsive feedback to said second control windings of the first said and said second variable voltage sources, (n) a rate network in said speed-responsive feedback loop that supplies said positive speed-responsive feedback to said second control windings of the first said and said second variable voltage sources only when the speed of the rotors of said motor and said tachometer is changing and is thus changing the output voltage of said tachometer, (o) the first said variable voltage source having a third control winding, (p) a voltage-responsive feedback loop that includes a third transformer which has the primary winding thereof connected to terminals of said stator windings of said motor and that can supply large or small amounts of negative feedback to said third control winding of the first said variable voltage source, and (q) selectively actuatable contacts, (r) said contacts being adapted to disconnect said inductive load from said rotor windings so the load on said rotor windings is substantially resistive and to cause said speed-responsive feedback loop to supply negative feedback to said second control windings of the first said and said second variable voltage sources which is responsive to the speed of said rotor of said motor and also to the voltage supplied to said stator windings of said motor, whereby said motor will apply approximately constant horse power to said load, (s) said contacts being adapted to connect said inductive load to said rotor windings and in parallel with said resistive load and to cause substantial negative voltage feedback to be supplied to said third control winding of the first said variable voltage source, whereby said motor can supply approximately constant tension to said load.

4. A control system that can selectively apply approximately constant horsepower or approximately constant tension to a load and that comprises:

(a) a wound rotor, induction motor,
(b) a resistive load that is connected to the rotor windings of said motor and that can substantially reduce the speed of said rotor, (c) an inductive load that can be selectively connected to said rotor windings and in parallel with said resistive load, (d) a variable voltage source that is connected to the stator windings of said motor and that can supply forward voltage to said stator windings, (e) a second variable voltage source that is connected to said stator windings of said motor and that can supply reverse voltage to said stator windings, (f) a signal source which can provide variable value signals for the first said and said second variable voltage sources, (g) a handle for said signal source that can cause the first said variable voltage source to supply forward voltage to said stator windings of said motor, and that can cause said second variable voltage source to supply reverse voltage to said stator windings of said motor, (h) a tachometer that has the rotor thereof connected to and driven by said rotor of said motor, (i) a transformer that can supply a substantially constant voltage to the input winding of said tachometer, (j) a second transformer that has the primary winding thereof connected to terminals of said stator windings of said motor and that can have the secondary winding thereof connected to said input winding of said tachometer to make the output of said tachometer, in part, responsive to the voltage supplied to said stator windings of said motor, (k) a speed-responsive feedback loop that includes said tachometer and that can supply negative speed-responsive feedback or positive speed-responsive feedback to the first said and said second variable voltage sources, (l) a voltage-responsive feedback loop that includes a third transformer which has the primary winding thereof connected to terminals of said stator windings of said motor and that can supply large or small amounts of negative feedback to the first said variable voltage source, and (m) selectively actuatable contacts, (n) said contacts being adapted to disconnect said inductive load from said rotor windings so the load on said rotor windings is substantially resistive and to cause said speed-responsive feedback loop to supply negative feedback to the first said and said second variable voltage sources which is responsive to the speed of said rotor of said motor and also to the voltage supplied to said stator windings of said motor, whereby said motor will apply approximately constant horse power to said load.

(o) said contacts being adapted to connect said inductive load to said rotor windings and in parallel with said resistive load and to cause substantial negative voltage feedback to be supplied to the first said variable voltage source, whereby said motor can supply approximately constant tension to said load.

5. A control system tht can apply approximately constant horse power to a load and that comprises:

(a) a wound rotor, induction motor,
(b) a resistive load that is connected to the rotor windings of said motor and that can substantially reduce the speed of said rotor, (c) a variable voltage source that is connected to the stator windings of said motor and that can supply forward voltage to said stator windings, (d) a second variable voltage source that is connected to said stator windings of said motor and that can supply reverse voltage to said stator windings, (e) a signal source which can provide variable value signals for the first said and said second voltage sources, (f) a handle for said signal source that can cause the first said variable voltage source to supply forward voltage to said stator windings of said motor, and that can cause said second variable voltage source to supply reverse voltage to said stator windings of said motor, (g) a tachometer that has the rotor thereof connected to and driven by said rotor of said motor, (h) a transformer that has the primary winding thereof connected to terminals of said stator windings of said motor and that can have the secondary winding thereof connected to said input winding of said tachometer to make the output of said tachometer, in part, responsive to the voltage supplied to said stator windings of said motor, (i) a speed-responsive feedback loop that includes said tachometer and that can supply negative speed-responsive feedback to the first said and said second variable voltage sources, and (j) selectively actuatable contacts, (k) said contacts being adapted to cause said speed-responsive feedback loop to supply negative feedback to the first said and said second variable voltage sources which is responsive to the speed of said rotor of said motor and also to the voltage supplied to said stator windings of said motor, whereby said motor will apply approximately constant horse power to said load.

6. A control system that can apply approximately constant horse power to a load and that comprises:
(a) an induction motor,
(b) the rotor of said motor having sufficient resistance to substantially reduce the speed of said rotor,
(c) a variable voltage source thta is connected to the stator windings of said motor and that can supply forward voltage to said stator windings,
(d) a signal source which can provide variable value signals for said variable voltage source,
(e) a handle for said signal source which can cause said variable voltage source to supply forward voltage to said stator windings of said motor,
(f) a tachometer that has the rotor thereof connected to and driven by said rotor of said motor,
(g) a transformer that has the primary winding thereof connected to terminals of said stator windings of said motor and that can have the secondary winding thereof connected to said input winding of said tachometer to make the output of said tachometer, in part, responsive to the voltage supplied to said stator windings of said motor,
(h) a speed-responsive feedback loop that includes said tachometer and that can supply negative speed-responsive feedback to said variable voltage source, and
(i) selectively actuatable contacts,
(j) said contacts being adapted to cause said speed-responsive feedback loop to supply negative feedback to said variable voltage source which is responsive to the speed of said rotor of said motor and also to the voltage supplied to said stator windings of said motor, whereby said motor will apply approximately constant horse power to said load.

7. A control system that can apply a force to a load and that can maintain an approximately constant tension on said load as it does so and that comprises:
(a) a variable torque induction motor,
(b) the rotor of said motor having sufficient resistance to substantially reduce the speed of said rotor at a given load,
(c) said rotor of said motor having substantial inductance,
(d) a variable voltage source that is connected to the stator windings of said motor and that can supply forward voltage to said stator windings,
(e) a signal source which can provide variable value signals for said variable voltage source to enable said variable voltage source to apply different voltages to said stator windings of said motor and thereby cause said motor to apply different values of tension to said load,
(f) a voltage feedback loop around said variable voltage source that can supply large values of negative feedback to said variable voltage source to keep the steady-state voltage supplied to said stator windings of said motor by said variable voltage source substantially constant,
(g) the resistance and the inductance of said rotor being dimensioned to coact with the substantially constant steady-state voltage supplied to said stator windings of said motor by said variable voltage source to cause said motor to apply approximately constant tension to said load throughout the major portion of the range of speeds of said rotor, and
(h) a speed-responsive feedback loop around said variable voltage source that includes a rate network and that can respond to transient changes in the rate of rotation of said rotor to supply positive feedback to said variable voltage source,
(i) said positive feedback enabling said variable voltage source to change the value of the voltage which it supplies to said stator windings of said motor during said transient changes in said rate of rotation of said rotor to shorten the duration of said transient changes and thereby minimize the effect thereof upon said approximately constant tension applied to said load.

8. A control system that can apply a force to a load and that can maintain an approximately constant tension on said load as it does so and that comprises:
(a) a variable torque induction motor,
(b) a variable voltage source that is connected to the stator windings of said motor and that can supply forward voltage to said stator windings,
(c) a signal source which can provide variable value signals for said variable voltage source,
(d) a handle for said signal source which can cause said variable voltage source to supply forward voltage to said stator windings of said motor,
(e) a tachometer that has the rotor thereof connected to and driven by said rotor of said motor,
(f) a speed-responsive feedback loop around said variable voltage source that includes said tachometer and that can supply positive speed-responsive feedback to said variable voltage source,
(g) said tachometer providing an A.C. output, and said speed-responsive feedback loop including a demodulator that receives and demodulates said A.C. output from said tachometer,
(h) a rate network in said speed-responsive feedback loop that supplies said positive feedback to said variable voltage source only when the speed of the rotors of said motor and said tachometer is changing and is thus changing the output voltage of said tachometer,
(i) a compensation network in said speed-responsive feedback loop that includes back-to-back diodes,
(j) said compensation network in said speed-responsive feedback loop responding to rotation of the rotors of said motor and said tachometer in the forward direction to develop a voltage of a predetermined polarity across one of said back-to-back diodes and thereby cause said variable voltage source to slightly increase the forward voltage supplied to said stator windings of said motor and responding to rotation of the rotors of said motor and said tachometer in the reverse direction to develop a voltage of opposite polarity across the other of said back-to-back diodes and thereby cause said variable voltage source to slightly decrease the reverse voltage supplied to said stator windings of said motor, and
(k) a voltage-responsive feedback loop around said variable voltage source that includes a transformer which has the primary winding thereof connected to terminals of said stator windings of said motor and that can supply large amounts of negative feedback to said variable voltage source.

9. A control system that can selectively apply approximately constant horsepower or approximately constant tension to a load and that comprises:
   (a) a wound rotor, induction motor,
   (b) a resistive load that is connected to the rotor of said motor and that can substantially reduce the speed of said rotor,
   (c) an inductive load that can be selectively connected to said rotor of said motor and in parallel with said resistive load,
   (d) a variable voltage source for the stator of said motor,
   (a) a voltage feedback loop that can respond to the voltage supplied to said stator of said motor to provide negative voltage feedback to said variable voltage source,
   (f) a speed-responsive feedback loop that includes a tachometer which can respond to the speed of said rotor and to the voltage supplied to said stator of said motor to supply negative feedback to said variable source of voltage, and
   (g) selectively-actuated switch contacts,
   (h) said switch contacts being adapted to disconnect said inductive load from said rotor so the load on said rotor is substantially resistive and to cause said speed-responsive feedback loop to supply negative feedback to said voltage source which is responsive to the speed of said rotor and to the voltage supplied to said stator of said motor, whereby said motor will apply approximately constant horsepower to said load,
   (i) said switch contacts being adapted to connect said inductive load to said rotor and in parallel with said resistive load and to cause substantial negative voltage feedback to be supplied to said variable voltage source, whereby said motor can apply approximately constant tension to said load.

10. A control system for an electric motor that can apply approximately constant horsepower to a load and that comprises:
    (a) a wound rotor, induction motor,
    (b) a resistive load that is connected to the rotor of said motor and that can substantially reduce the speed of said rotor,
    (c) a variable voltage source for the stator of said motor,
    (d) a voltage feedback loop that can respond to the voltage supplied to said stator of said motor to provide negative voltage feedback to said variable voltage source, and
    (e) a speed-responsive feedback loop that can respond to the speed of said rotor and that can also respond to the voltage supplied to said stator of said motor to supply voltage-modified speed-responsive negative feedback to said variable voltage source,
    (f) said voltage feedback loop supplying only a small amount of negative voltage feedback to said variable voltage source but supplying sufficient negative voltage feedback to said variable voltage source to stabilize the operation of said motor at low speeds,
    (g) said speed-responsive feedback loop supplying a voltage-modified speed-responsive negative feedback to said variable voltage source to enable said motor to apply substantially constant horsepower to said load.

11. A control system for an electric motor that can apply approximately constant horsepower to a load and that comprises:
    (a) a wound rotor, induction motor,
    (b) a resistive load that is connected to the rotor of said motor and that can substantially reduce the speed of said rotor,
    (c) a variable voltage source for the stator of said motor, and
    (d) a speed-responsive feedback loop including means that can respond to the speed of said rotor to provide speed-responsive negative feedback and that can also respond to the voltage supplied to said stator of said motor to multiply the speed-responsive feedback provided by said means by said voltage supplied to said stator of said motor, whereby said speed-responsive feedback loop can supply voltage-modified speed-responsive negative feedback to said variable voltage source,
    (e) said speed-responsive feedback loop supplying said voltage-modified speed-responsive negative feedback to said variable voltage source to enable said motor to apply substantially constant horsepower to said load.

12. A control system for an electric motor that can apply approximately constant horsepower to a load and that comprises:
    (a) an induction motor,
    (b) the rotor of said motor having substantial resistance,
    (c) a variable voltage source for the stator of said motor, and
    (d) a feedback loop that can supply voltage-modified speed-responsive negative feedback to said variable voltage source to enable said motor to apply substantially constant horsepower to said load.
    (e) said feedback loop including a variable gain tachometer that is connected to and is driven by said motor to make said negative feedback speed-responsive,
    (f) said feedback loop including an element that modifies the gain and thus modifies the output of said tachometer, as the voltage supplied to the stator of said motor varies, to make said speed-responsive negative feedback voltage-modified.

13. A control system for an electric motor that can apply a force to a load and that can maintain an approximately constant tension on said load as it does so whether the rotor of said motor is rotating in the forward direction or reverse direction and that comprises:
    (a) a wound rotor, induction motor,
    (b) a resistive load that is connected to the rotor of said motor and that can substantially reduce the speed of said rotor for a given load,
    (c) an inductive load that is connected to said rotor of said motor and in parallel with said resistive load,
    (d) a variable voltage source for the stator of said motor,
    (e) a step-less, contact-free reference source connected to said variable voltage source to apply reference signals of different values to said variable voltage source to change the voltage which said variable voltage source applies to said stator of said motor, and thereby enable said variable voltage source to cause said motor to apply different levels of tension to said load, and
    (f) a voltage feedback loop around said variable voltage source that can respond to the voltage supplied to said stator of said motor to provide negative voltage feedback to said variable voltage source,
    (g) said voltage feedback loop causing sufficient negative feedback to be supplied to said variable voltage source to maintain the steady-state voltage supplied to said stator of said motor substantially constant, throughout the major portion of the range of speeds of said motor and at a level corresponding to the reference signals supplied to said variable voltage source by said step-less, contact-free reference source,
    (h) said resistive load and said inductive load being dimensioned to coact with said substantially constant steady-state voltage, applied to said stator of said motor by said variable voltage source, to help keep any level of tension, which said variable voltage source causes said motor to apply to said load, substantially constant throughout a substantial portion of said range of speeds of said motor.

14. A control system for an electric motor that can apply a force to a load and that can maintain an approximately constant tension on said load as it does so and that comprises:
   (a) a wound rotor, induction motor,
   (b) a resistive load that is connected to the rotor of said motor and that can reduce the speed of said rotor at a given load,
   (c) an inductive load that is connected to said rotor of said motor and in parallel with said resistive load,
   (d) a variable voltage source for the stator of said motor, and
   (e) a variable reference source connected to said variable voltage source to apply reference signals of different values to said variable voltage source to change the voltage which said variable voltage source applies to said stator of said motor, and thereby enable said variable voltage source to cause said motor to apply different levels of tension to said load,
   (f) a voltage feedback loop that can provide negative feedback to said variable voltage source,
   (g) said voltage feedback loop causing sufficient negative feedback to be supplied to said variable voltage source to maintain the steady-state voltage supplied to said stator of said motor substantially constant, and
   (h) said resistive load and said inductive load being dimensioned to coact with said substantially constant steady-state voltage, applied to said stator of said motor, to help keep any level of tension, which said variable voltage source causes said motor to apply to said load, substantially constant throughout a substantial portion of the range of speeds of said motor.

15. A control system for an electric motor that can apply a force to a load and that can maintain an approximately constant tension on said load as it does so and that comprises:
   (a) an induction motor,
   (b) the rotor of said motor having substantial resistance,
   (c) said rotor having substantial inductance,
   (d) a variable voltage source for the stator of said motor that can supply different values of voltage to said stator of said motor to vary the value of tension supplied to said load by said motor,
   (e) means to maintain the steady-state voltage supplied to said stator of said motor substantially constant, whereby said motor can apply approximately constant tension to said load,
   (f) said means including a voltage feedback loop around said variable voltage source,
   (g) a step-less, contact-free reference source that is adjustable to provide A.C. reference signals of different values, and
   (h) a demodulator that receives said A.C. reference signals from said step-less, contact-free reference source and causes said variable voltage source to supply a corresponding voltage to said stator of said motor,
   (i) said substantial resistance of said rotor and said substantial inductance of said rotor being dimensioned to coact with said substantially constant steady-state voltage, applied to said stator of said motor by said variable voltage source, to help keep any level of tension, which said variable voltage source causes said motor to apply to said load, substantially constant throughout a substantial portion of the range of speeds of said motor.

16. A control system for an electric motor that can provide an approximately constant horsepower torque-versus-speed characteristic for said motor or can provide an approximately constant tension torque-versus-speed characteristic for said motor or can provide an approximately constant speed torque-versus-speed characteristic for said motor and that comprises:
   (a) an induction motor,
   (b) the rotor of said motor having substantial resistance,
   (c) said rotor having substantial inductance,
   (d) a variable voltage source for said motor,
   (e) a speed-responsive feedback loop that can supply speed-responsive feedback to said variable voltage source,
   (f) a member that can respond to the voltage supplied to the stator of said motor to modify said speed-responsive feedback,
   (g) a voltage-responsive feedback loop that can supply negative feedback to said variable voltage source, and
   (h) selectively actuatable contacts,
   (i) said contacts being adapted to disconnect said inductance of said rotor and to cause said speed-responsive feedback loop and said member to supply voltage-modified speed-responsive feedback to said variable voltage source to provide said approximately constant horsepower torque-versus-speed characteristic for said motor,
   (j) said contacts being adapted to connect said resistance and said inductance of said rotor in parallel and to cause said voltage-responsive feedback loop to supply large values of negative feedback to said variable voltage source to provide said approximately constant tension torque-versus-speed characteristic for said motor,
   (k) said contacts being adapted to disconnect said inductance of said rotor and to provide substantially no feedback to said variable voltage source to provide said approximately constant speed torque-versus speed characteristic for said motor.

17. A control system for an electric motor than can apply a force to a load and that can maintain an approximately constant tension on said load as it does so and that comprises:
   (a) a variable torque induction motor,
   (b) the rotor of said motor having substantial resistance,
   (c) said rotor having substantial inductance,
   (d) a variable voltage source for the stator of said motor,
   (e) a voltage feedback loop around said variable voltage source that can respond to the voltage supplied to said stator of said motor to provide negative voltage feedback to said variable voltage source and thereby maintain the steady-state voltage, applied to said stator of said motor, substantially constant,
   (f) a speed-responsive feedback loop around said variable voltage source that includes a rate network and that can respond to transient changes in the rate of rotation of said rotor to supply positive feedback to said variable voltage source,
   (g) said positive feedback enabling said variable voltage source to change the value of the voltage which it supplies to said stator of said motor during said transient changes in said rate of rotation of said rotor to shorten the duration of said transient changes and thereby minimize the effect thereof upon said approximately constant tension applied to said load as the speed of said rotor increases in the forward or the reverse direction,
   (h) said voltage feedback loop around said variable voltage source and said speed-responsive feedback loop around said variable voltage source coacting with said substantial resistance of said rotor and with said substantial inductance of said rotor to cause said motor to apply approximately constant tension to said load.

18. A control system for an electric motor that comprises:
(a) an induction motor,
(b) a variable voltage source for the stator of said motor, and
(c) a feedback loop that supplies feedback to said variable voltage source,
(d) said feedback loop including a tachometer which is connected to and driven by the rotor of said motor and which develops a signal that makes said feedback speed-responsive,
(e) said feedback loop including a member that can respond to the voltage supplied to said stator of said motor and that can coact with said tachometer to multiply the speed-responsive feedback signal provided by said tachometer by said voltage supplied to said stator of said motor,
(f) whereby said tachometer and said member coact to supply voltage-modified speed-responsive feedback to said variable voltage source.

19. A control system for a variable torque wound rotor induction motor that comprises:
(a) a resistive load that can be connected to the rotor of said motor,
(b) an inductive load that can be connected to the rotor of said motor so it is in parallel with said resistive load,
(c) a variable voltage source for the stator of said motor that can supply variable values of voltage to said stator to enable said motor to apply variable values of tension to a load, and
(d) a voltage feedback loop around said variable voltage source that can supply large values of negative feedback to said variable voltage source to maintain the steady-state voltage supplied to said stator of said motor substantially constant,
(e) said resistive and said inductive loads being dimensioned so that, whenever said resistive and said inductive loads are connected in parallel, they will coact with said voltage feedback loop to cause said motor to apply an approximately constant tension to said load,
(f) whereby said motor can apply a level of tension to said load which will remain substantially constant throughout a substantial portion of the range of speeds of said motor.

20. A control system for an electric motor that comprises:
(a) an induction motor,
(b) the rotor of said motor having substantial resistance,
(c) a variable voltage source for the stator of said motor,
(d) a speed-responsive feedback loop that includes a tachometer which can respond to the speed of said rotor and to the voltage supplied to said stator of said motor to supply negative feedback to said variable source of voltage, and
(e) selectively-actuated switch contacts,
(f) said switch contacts being adapted to cause said speed responsive feedback loop to supply negative feedback to said voltage source which is responsive to the speed of said rotor and to the voltage supplied to said stator of said motor, whereby said motor will apply approximately constant horsepower to said load,
(g) said switch contacts being adapted to disconnect said speed-responsive feedback loop from said variable voltage source, whereby said motor can operate at approximately constant speed.

21. A control system for an electric motor that is intended to hoist and lower loads and that comprises:
(a) a variable voltage source that can supply hoisting voltage to said motor to drive the rotor of said motor in the hoisting direction,
(b) a second variable voltage source that can supply lowering voltage to said motor to drive the rotor of said motor in the lowering direction,
(c) a tachometer that has the rotor thereof connected to and driven by said rotor of said motor and that responds to rotation of said motor rotor in the hoisting direction to develop a first feedback signal and that responds to rotation of said motor rotor in the lowering direction to develop a second feedback signal,
(d) a speed-responsive feedback loop that includes said tachometer and that can supply negative speed-responsive feedback to the first said and said second variable voltage sources, and
(e) a compensation network in said speed-responsive feedback loop that will automatically respond to the first said feedback signal during rotation of the rotors of said motor and said tachometer in the hoisting direction to slightly increase the hoisting voltage supplied to said motor and that will automatically respond to said second feedback signal during rotation of the rotors of said motor and said tachometer in the lowering direction to slightly decrease the lowering voltage supplied to said motor.

22. A control system for an electric motor that is intended to hoist and lower loads and that comprises:
(a) a variable voltage source that can drive the rotor of said motor in the hoisting direction,
(b) a second variable voltage source that can drive the rotor of said motor in the lowering direction,
(c) a tachometer that has the rotor thereof connected to and driven by said rotor of said motor, and
(d) a speed-responsive feedback loop that includes said tachometer and that can supply negative speed-responsive feedback to the first said and said second variable voltage sources,
(e) the first said variable voltage source normally supplying no power to said motor whenever said motor is being used to lower a load but being adapted to coact with said speed-responsive feedback loop to supply power to said motor and thereby limit the lowering speed of said motor in the event said load tends to overhaul said motor.

23. A control system for an electric motor that can provide an approximately constant horsepower torque-versus-speed characteristic for said motor or can provide an approximately constant tension torque-versus-speed characteristic for said motor or can provide an approximately constant speed torque-versus-speed characteristic for said motor and that comprises:
(a) an induction motor,
(b) the rotor of said motor having substantial resistance,
(c) said rotor having substantial inductance,
(d) a variable voltage source for said motor,
(e) a signal source that can supply smooth, step-less operation for said motor,
(f) a speed-responsive feedback loop that can supply speed-responsive feedback to said variable voltage source,
(g) a member that can respond to the voltage supplied to the stator of said motor to modify said speed-responsive feedback,
(h) a voltage-responsive feedback loop that can supply negative feedback to said variable voltage source, and
(i) selectively actuatable contacts,
(j) said contacts being adapted to disconnect said inductance of said rotor and to cause said speed-responsive feedback loop and said member to supply voltage-modified speed-responsive feedback to said variable voltage source to provide said approximately constant horsepower torque-versus-speed characteristic for said motor,
(k) said contacts being adapted to connect said resistance and said inductance of said rotor in parallel and to cause said voltage-responsive feedback loop to supply large values of negative feedback to said variable voltage source to provide said approximately constant tension torque-versus-speed characteristic for said motor.

24. A control system for an electric motor that can provide approximately constant tension or approximately constant horsepower to a load and that comprises:
  (a) an induction motor,
  (b) the rotor of said motor having substantial resistance,
  (c) said rotor having substantial inductance,
  (d) a variable voltage source for said motor,
  (e) a signal source that can supply smooth, step-less operation for said motor,
  (f) a speed-responsive feedback loop that can supply speed-responsive feedback to said variable voltage source,
  (g) a member that can respond to the voltage supplied to the stator of said motor to modify said speed-responsive responsive feedback,
  (h) a voltage-responsive feedback loop that can supply negative feedback to said variable voltage source, and
  (i) selectively actuatable contacts.

25. A control system that can apply a force to a load and that can maintain an approximately constant tension on said load as it does so whether the rotor of said motor is rotating in the forward direction or reverse direction and that comprises:
  (a) a variable torque induction motor,
  (b) a variable voltage source that is connected to the stator windings of said motor and that can supply forward voltage to said stator windings,
  (c) a signal source which can provide variable value signals for said variable voltage source to enable said variable voltage source to apply different voltages to said stator windings of said motor and thereby cause said motor to apply different values of tension to said load,
  (d) a speed-responsive feedback loop around said variable voltage source that includes a rate network and that can respond to transient changes in the rate of rotation of said rotor to supply positive feedback to said variable voltage source,
  (e) said positive feedback enabling said variable voltage source to change the value of the voltage which it supplies to said stator windings of said motor during said transient changes in said rate of rotation of said rotor to shorten the duration of said transient changes and thereby minimize the effect thereof upon said approximately constant tension applied to said load,
  (f) a voltage feedback loop around said variable voltage source that can respond to the voltage supplied to said stator windings of said motor to provide negative voltage feedback to said variable voltage source,
  (g) said voltage feedback loop around said variable voltage source causing sufficient negative feedback to be supplied to said variable voltage source to maintain the steady-state voltage supplied to said stator windings of said motor substantially constant throughout a substantial portion of the range of speeds of said motor and at a level corresponding to the variable value signals supplied to said variable voltage source by said signal source, and
  (h) a compensation network in said speed-responsive feedback loop that will respond to rotation of said rotor of said motor in the forward direction to cause said variable voltage source to slightly increase the voltage which it supplies to said stator windings of said motor and that will respond to rotation of said rotor of said motor in the reverse direction to cause said variable voltage source to slightly decrease the voltage which it supplies to said stator of said motor.

References Cited

UNITED STATES PATENTS

| | | | |
|---|---|---|---|
| 2,722,640 | 11/1955 | Merrill et al. | |
| 709,915 | 9/1902 | Leonard | 318—7 X |
| 2,722,643 | 11/1955 | Rhyne | 318—239 X |
| 2,793,338 | 5/1957 | Rhyne | 318—229 X |
| 2,853,666 | 5/1958 | Carl et al. | 318—513 X |
| 2,958,814 | 11/1960 | Foote | 318—513 X |
| 3,065,396 | 11/1962 | Carlson | 318—513 |
| 3,090,901 | 5/1963 | Shaw | 318—229 X |
| 3,104,350 | 9/1963 | Malick | 318—513 X |
| 3,178,626 | 4/1965 | Chapman | 318—240 |
| 3,209,226 | 9/1965 | Foote | 318—513 X |
| 820,464 | 5/1906 | Adam | 318—6 |
| 916,721 | 3/1909 | Kramer | 318—6 |
| 2,725,511 | 11/1955 | Jacobs | 318—202 |
| 3,045,162 | 7/1962 | Wickerham | 318—202 |

ORIS L. RADER, Primary Examiner

T. E. LYNCH, Assistant Examiner

U.S. Cl. X.R.
318—215, 229, 238